(12) United States Patent
Suzuki et al.

(10) Patent No.: US 8,516,265 B2
(45) Date of Patent: Aug. 20, 2013

(54) AUTHENTICATION METHOD, AUTHENTICATION DEVICE, PROGRAM AND RECORDING MEDIUM

(75) Inventors: Masato Suzuki, Kawasaki (JP); Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 12/892,588

(22) Filed: Sep. 28, 2010

(65) Prior Publication Data

US 2011/0016327 A1    Jan. 20, 2011

Related U.S. Application Data

(63) Continuation of application No. PCT/JP2008/056403, filed on Mar. 31, 2008.

(51) Int. Cl.
*G06F 21/00* (2006.01)

(52) U.S. Cl.
USPC .............. 713/186; 380/44; 380/54; 713/156; 713/182

(58) Field of Classification Search
USPC ......................................... 726/186; 713/156
See application file for complete search history.

(56) References Cited

U.S. PATENT DOCUMENTS

| 8,270,603 | B1 * | 9/2012 | Durst et al. ................ 380/54 |
| 2004/0139316 | A1 | 7/2004 | Kotani | |
| 2005/0125674 | A1 | 6/2005 | Nishiki et al. | |

FOREIGN PATENT DOCUMENTS

| EP | 1 418 485 A2 | 5/2004 |
| EP | 1 826 700 A1 | 8/2007 |
| JP | 2004-157790 | 6/2004 |
| JP | 2005-173805 | 6/2005 |
| JP | 2006-344013 | 12/2006 |

OTHER PUBLICATIONS

"Biometric Key Binding: Fuzzy Vault Based on Iris Images" Lee et al, Department of Electrical and Electronic Engineering, Yonsei University, Biometrics Engineering Research Center; Lecture Notes in Computer Science, 2007, vol. 4642, Advances in Biometrics, pp. 800-808.*
"Biometric Certificate Based Biometric Digital Key Generation with Protection Mechanism" Chung et al, Biometrics Technology Research Team Electronics and Telecommunications Research Institute, Korea; Frontiers in the Convergence of Bioscience and Information Technologies, 2007. FBIT 2007, IEEE.*
"Biometric Security Technology"; Marcos Faundez-Zanuy;IEEE A&E Systems Magazine vol. 21, No. 6 Jun. 2006.*
International Search Report for PCT/JP2008/056403, mailed Nov. 11, 2008.

* cited by examiner

*Primary Examiner* — Taghi Arani
*Assistant Examiner* — Jason Lee
(74) *Attorney, Agent, or Firm* — Staas & Halsey LLP

(57) ABSTRACT

An authentication method of performing authentication for an information processing device connected via a communication network by an authentication device, including: receiving information related to biometric authentication concerning the information processing device; receiving information related to identification information for identifying the information processing device; receiving information related to environment of the information processing device; receiving an electronic signature by a secret key which is paired with an electronic certification transmitted from the information processing device; and determining, by a control unit, a biometric level based on the received information related to biometric authentication, a device level based on the received information related to identification information and an environment level based on the received information related to environment; correcting, by the control unit, the determined level based on validity of the received electronic signature.

12 Claims, 53 Drawing Sheets

F I G. 1
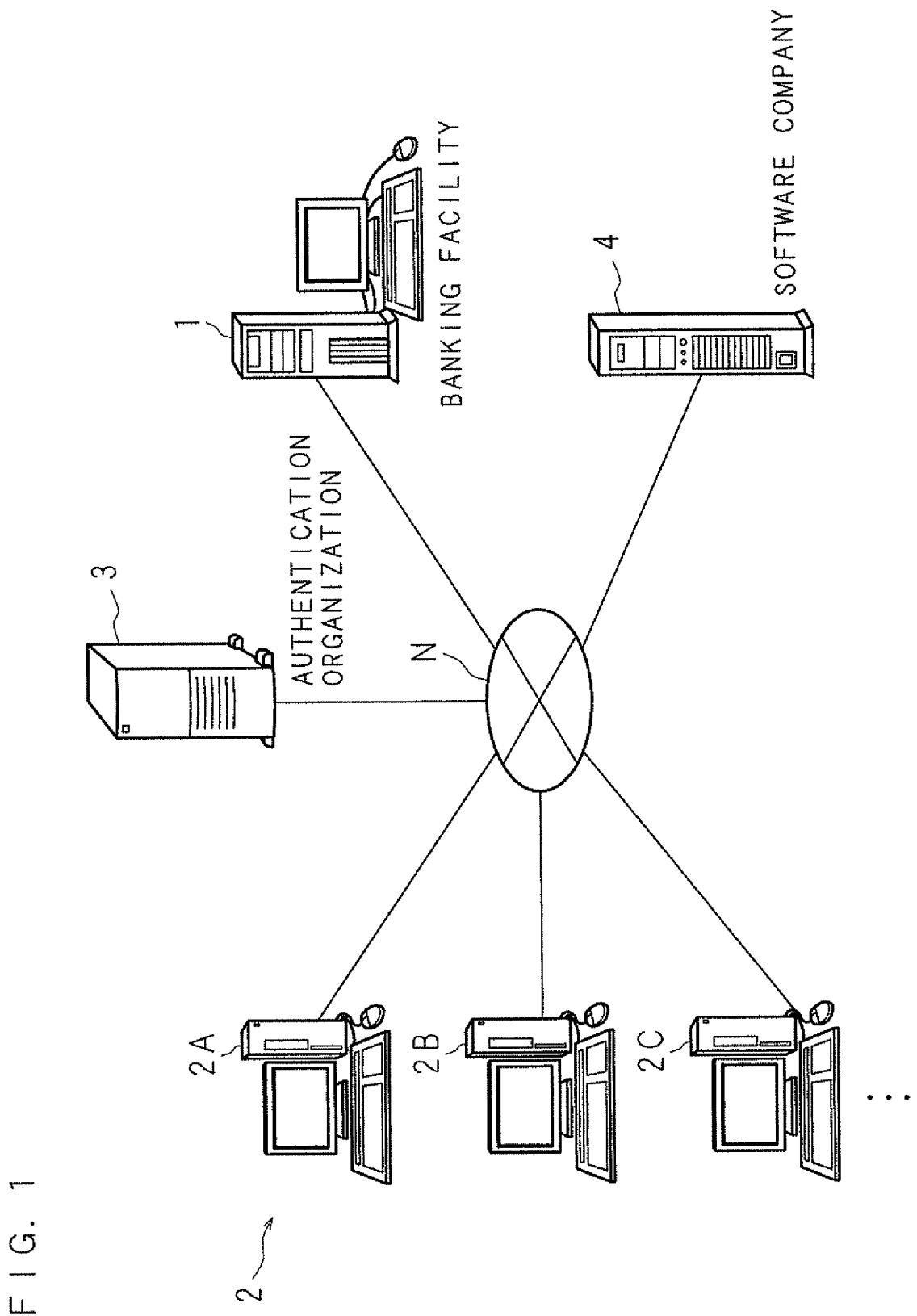

FIG. 6

SOFTWARE DB 451

| TYPE | VERSION | UPDATE TIME | CONTENTS |
|---|---|---|---|
| OS | W01 | 2007/08/01/20:00:00 | SECURITY HOLE PATCH PROGRAM·· |
| OS | W02 | 2007/08/02/02:01:00 | — |
| BROWSER | I01 | 2007/08/04/08:00:10 | — |
| OS | W03 | 2007/08/05/12:01:00 | — |
| BROWSER | I02 | 2007/08/10/18:00:10 | — |
| OS | W04 | 2007/08/15/12:01:00 | — |
| OS | W05 | 2007/09/01/20:11:00 | — |
| BROWSER | I03 | 2007/09/10/02:10:10 | — |
| BROWSER | I04 | 2007/09/14/18:15:10 | — |
| OS | W06 | 2007/09/25/12:01:00 | — |
| BROWSER | I05 | 2007/10/05/21:00:20 | — |

F I G. 8

USER DB

| ID | PASSWORD | NAME | MACHINE ID /155 | ACCOUNT NUMBER | BALANCE |
|---|---|---|---|---|---|
| 001 | *** | ... | M001 | **** | ** |
| 002 | *** | ... | M002 | **** | ** |
| 003 | *** | ... | M003 | **** | ** |
| ⋮ | ⋮ | ⋮ | ⋮ | ⋮ | ⋮ |

FIG. 9

SOFTWARE EVALUATION TABLE 153

| BROWSER \ OS | LATEST | 1 VERSION OLDER | 2-4 VERSIONS OLDER | 5 VERSIONS OLDER |
|---|---|---|---|---|
| LATEST | 3 | 2 | 2 | 1 |
| 1 VERSION OLDER | 2 | 2 | 1 | 1 |
| 2 VERSION OLDER | 2 | 1 | 1 | 1 |
| 3 OR MORE VERSIONS OLDER | 1 | 1 | 1 | 1 |

FIG. 11

POLICY TABLE  SOFTWARE LEVEL 1    154

| MACHINE LEVEL \ BIOMETRIC LEVEL | 1 HDD FACE | 2 HDD FINGERPRINT | 3 SC | 3+ SC CERTIFICATION | 3++ BIOMETRIC AUTHENTICATION PKI |
|---|---|---|---|---|---|
| 1 HDD | × | × | × | × | × |
| 2 BIOS | × | × | × | × | × |
| 3 SC | × | × | × | × | × |
| 3+ SC CERTIFICATION | × | × | × | × | × |
| 3++ MACHINE AUTHENTICATION PKI | × | × | × | × | × |

FIG. 12

POLICY TABLE  SOFTWARE LEVEL 2                                    154

| | | BIOMETRIC LEVEL | | | | |
|---|---|---|---|---|---|---|
| | | 1<br>HDD<br>FACE | 2<br>HDD<br>FINGERPRINT | 3<br>SC | 3+<br>SC<br>CERTIFICATION | 3++<br>BIOMETRIC<br>AUTHENTICATION PKI |
| MACHINE LEVEL | 1 HDD | × | × | × | × | × |
| | 2 BIOS | × | × | × | × | × |
| | 3 SC | × | × | × | × | × |
| | 3+SC CERTIFICATION | × | × | × | × | × |
| | 3++ MACHINE AUTHENTICATION PKI | × | × | × | × | ○ |

FIG. 13

POLICY TABLE SOFTWARE LEVEL 3 — 154

| MACHINE LEVEL | BIOMETRIC LEVEL | | | | |
|---|---|---|---|---|---|
| | 1 HDD FACE | 2 HDD FINGERPRINT | 3 SC SC | 3+ SC CERTIFICATION | 3++ BIOMETRIC AUTHENTICATION PKI |
| 1 HDD | X | X | X | X | X |
| 2 BIOS | X | X | X | X | X |
| 3 SC | X | X | X | X | X |
| 3+SC CERTIFICATION | X | X | X | X | O |
| 3++ MACHINE AUTHENTICATION PKI | X | X | X | O | O |

FIG. 14

POLICY TABLE SOFTWARE LEVEL 3+ 154

| MACHINE LEVEL | | BIOMETRIC LEVEL | | | | | |
|---|---|---|---|---|---|---|---|
| | | 1 HDD FACE | 2 HDD FINGERPRINT | 3 SC SC | 3+ SC SC CERTIFICATION | 3+ CERTIFICATION | 3++ BIOMETRIC AUTHENTICATION PKI |
| 1 | HDD | × | × | × | × | × | × |
| 2 | BIOS | × | × | × | × | × | × |
| 3 | SC | × | × | × | × | × | ○ |
| 3+ | SC CERTIFICATION | × | × | × | ○ | ○ | ○ |
| 3++ | MACHINE AUTHENTICATION PKI | × | × | ○ | ○ | ○ | ○ |

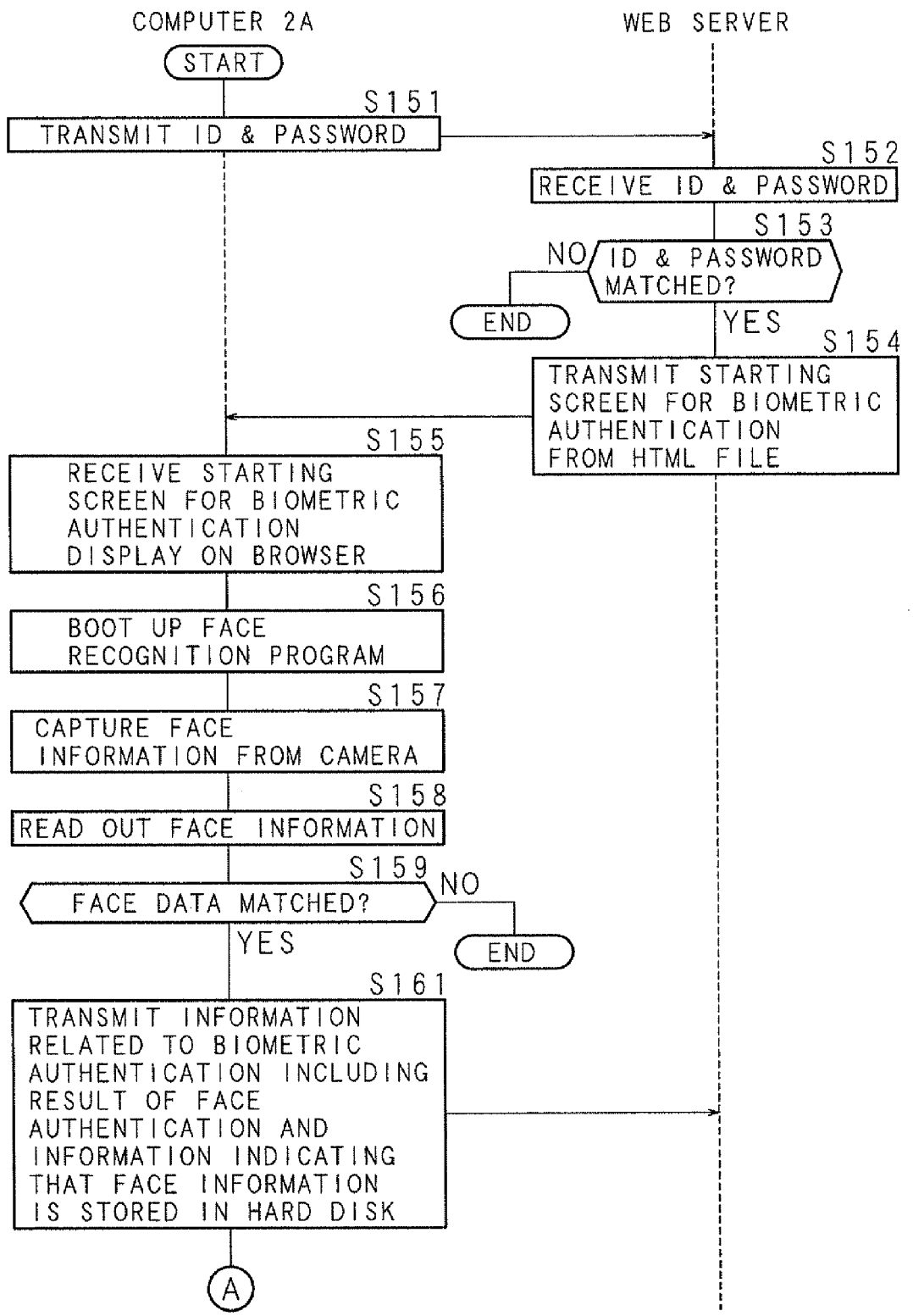

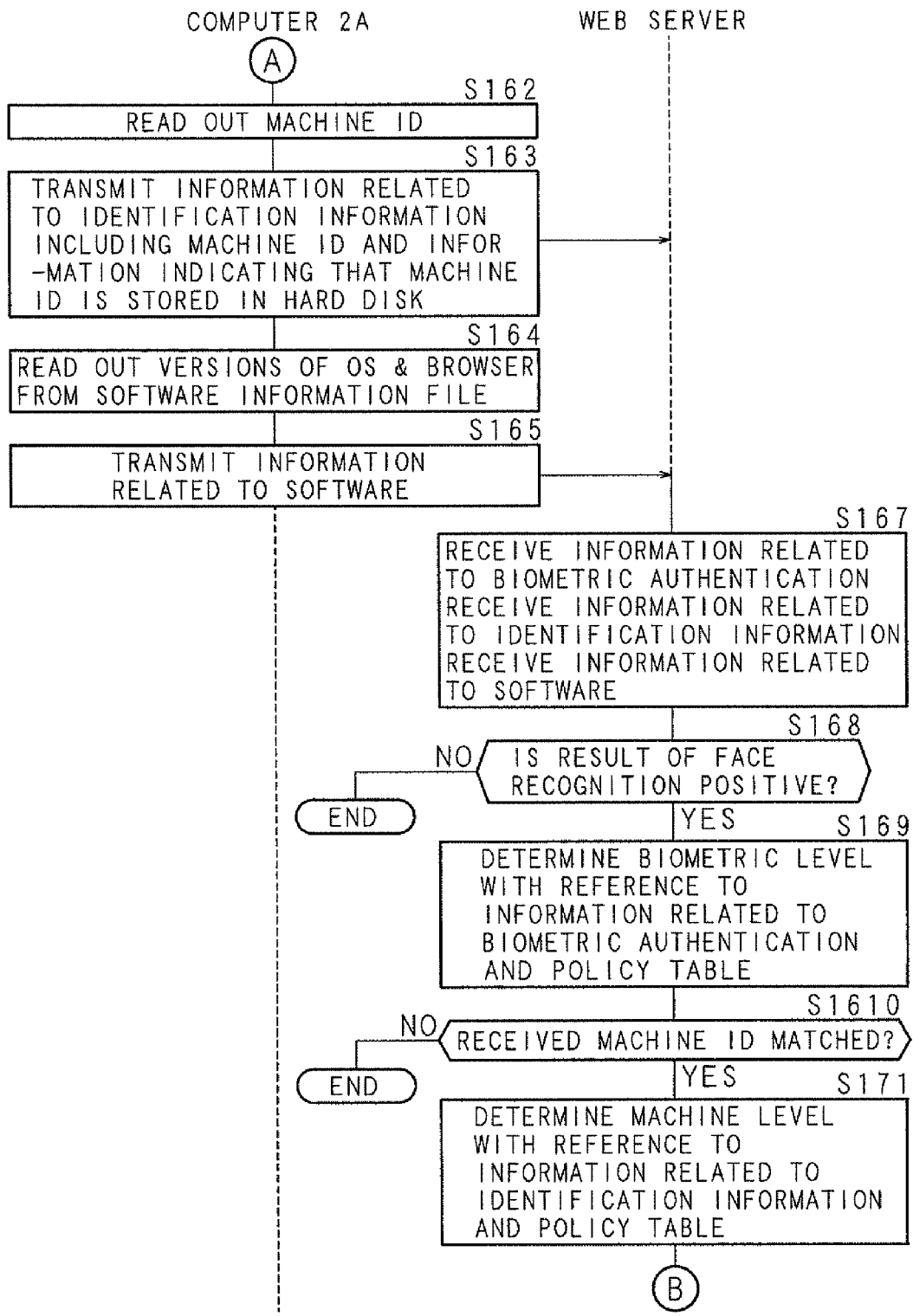

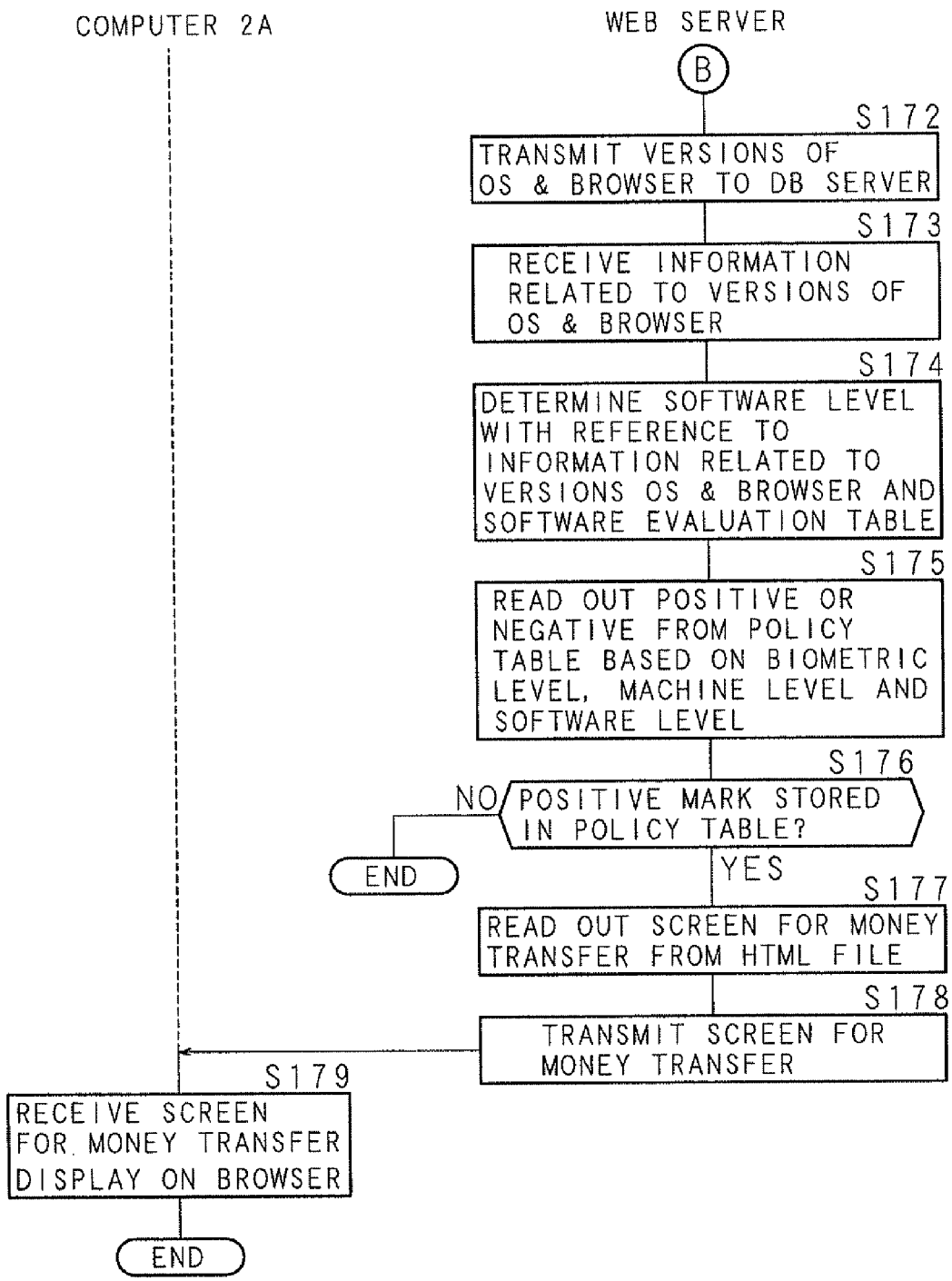

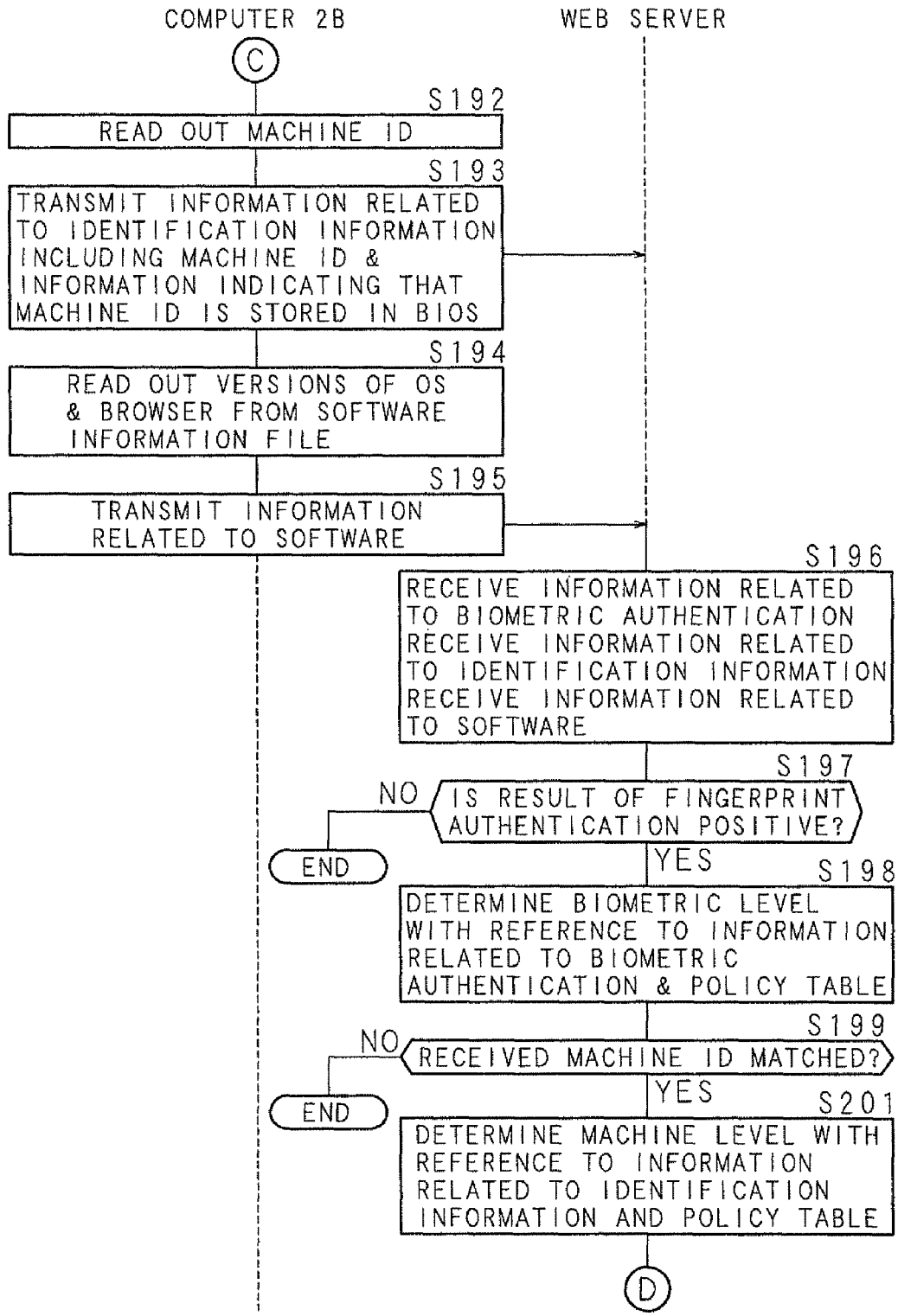

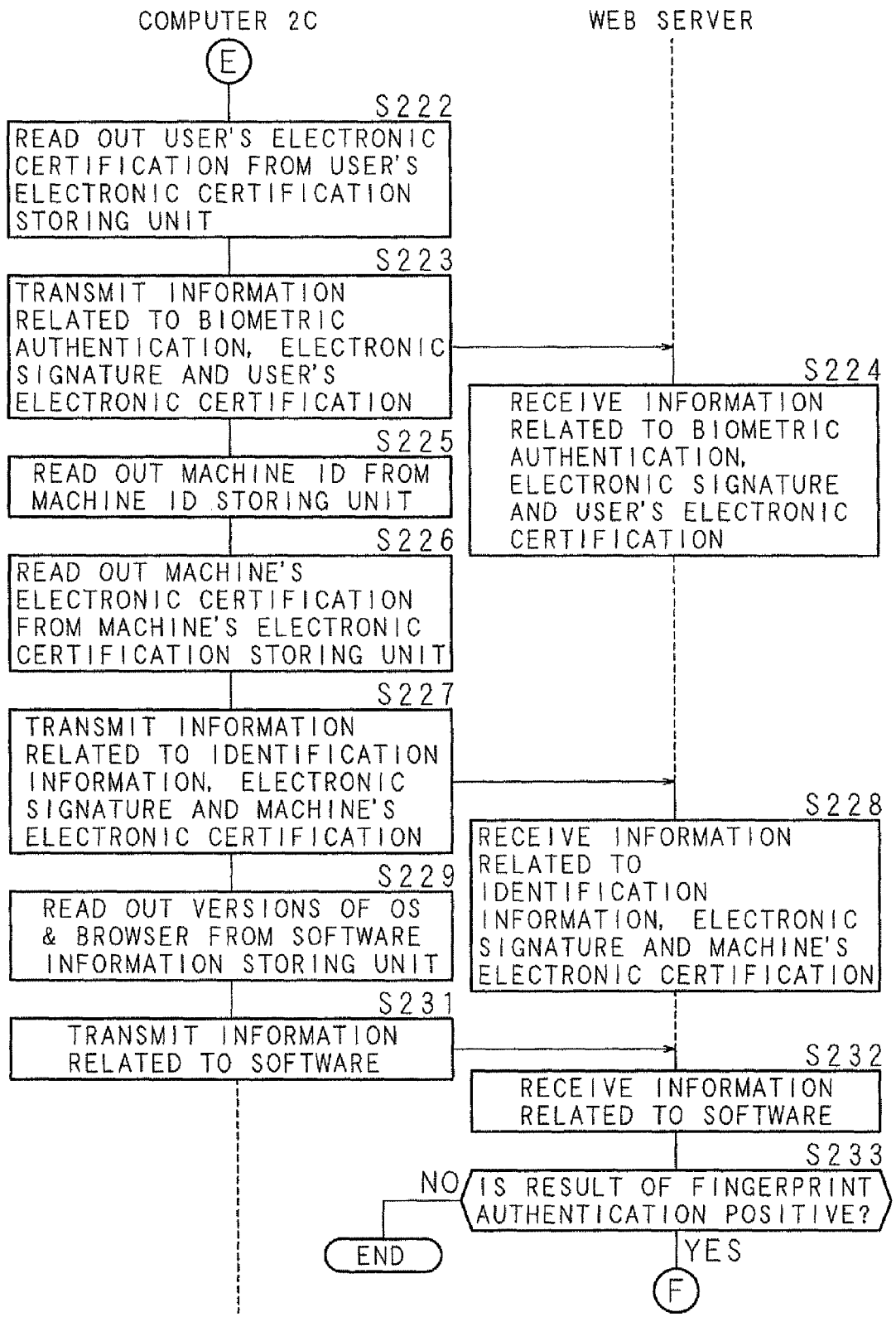

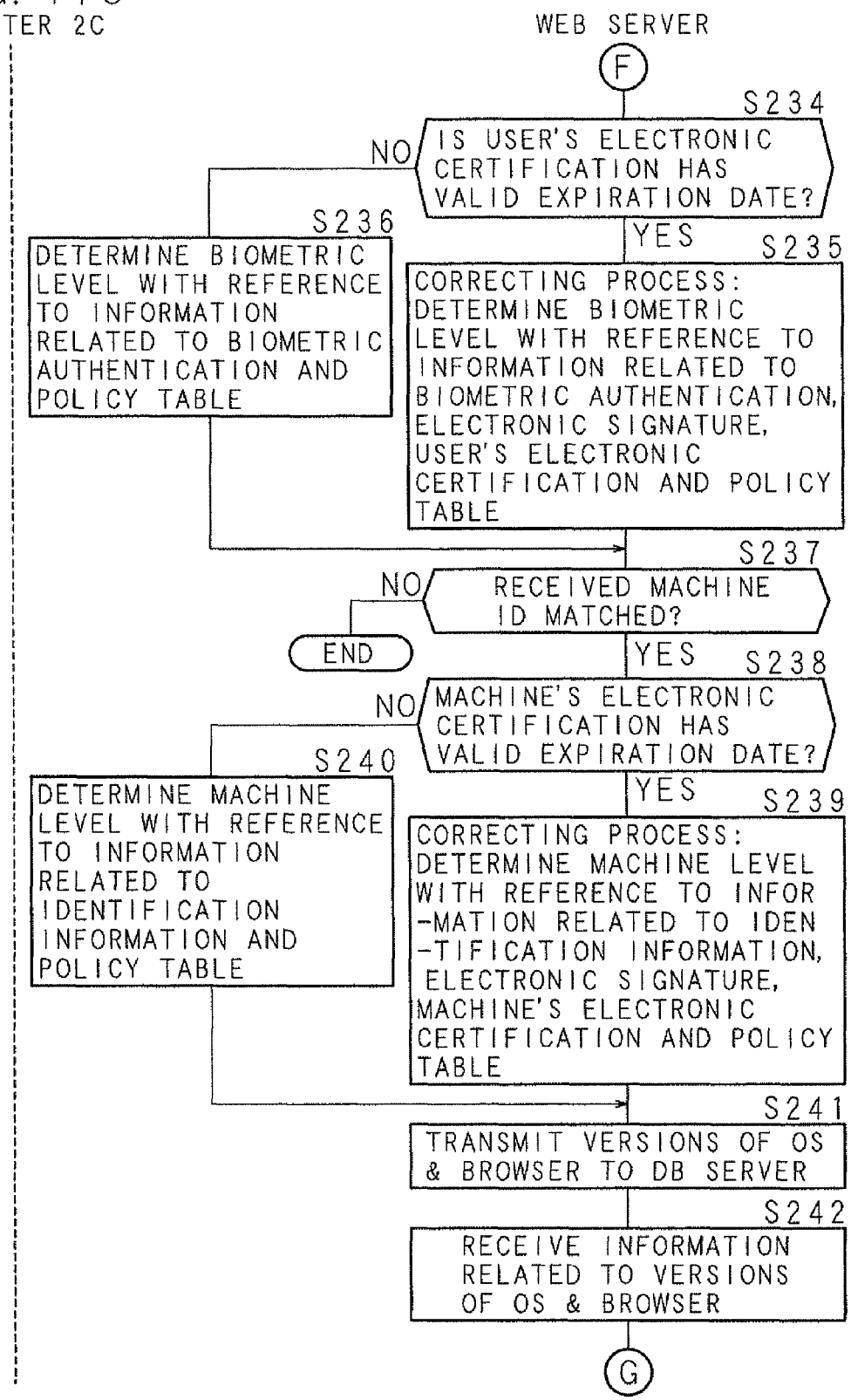

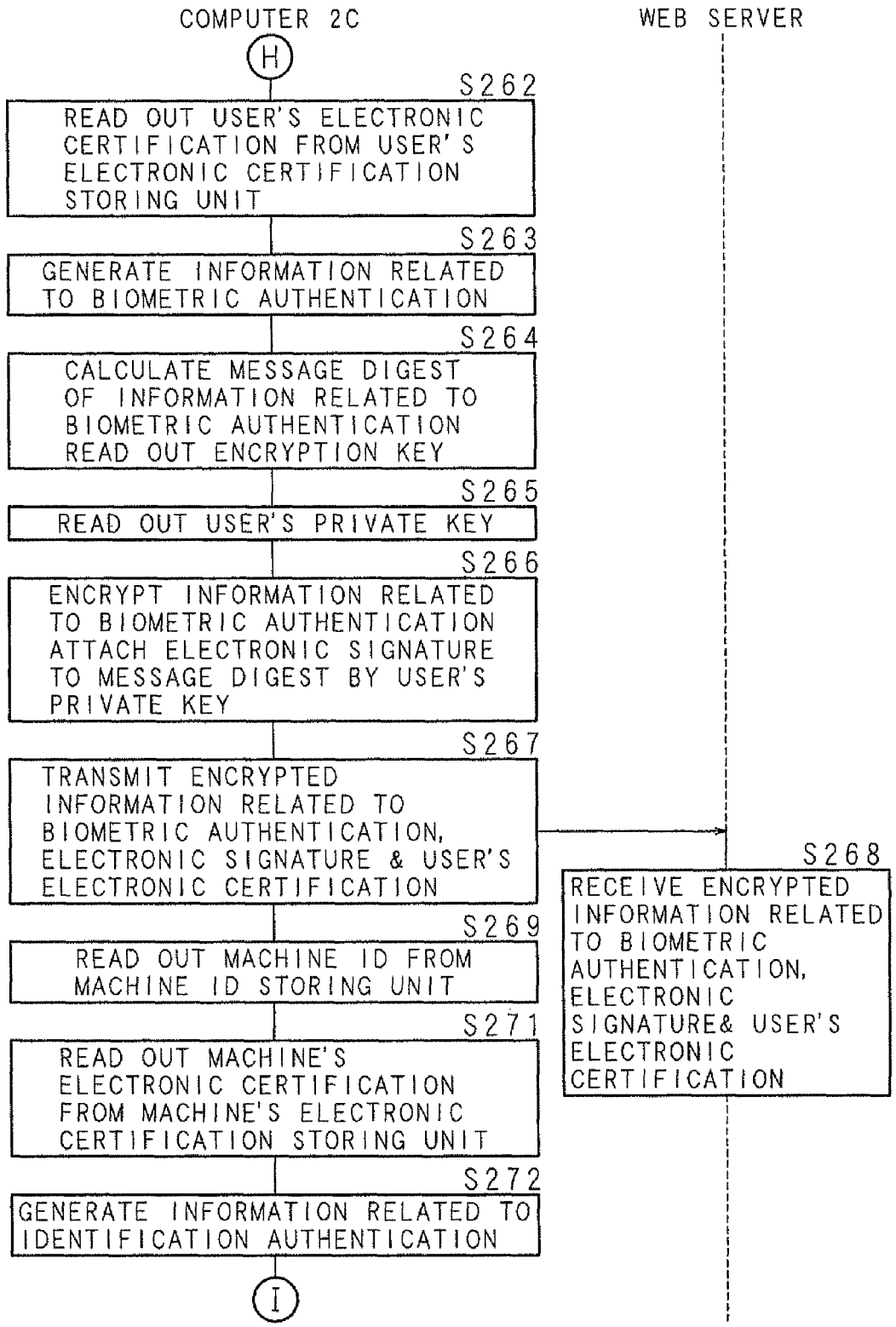

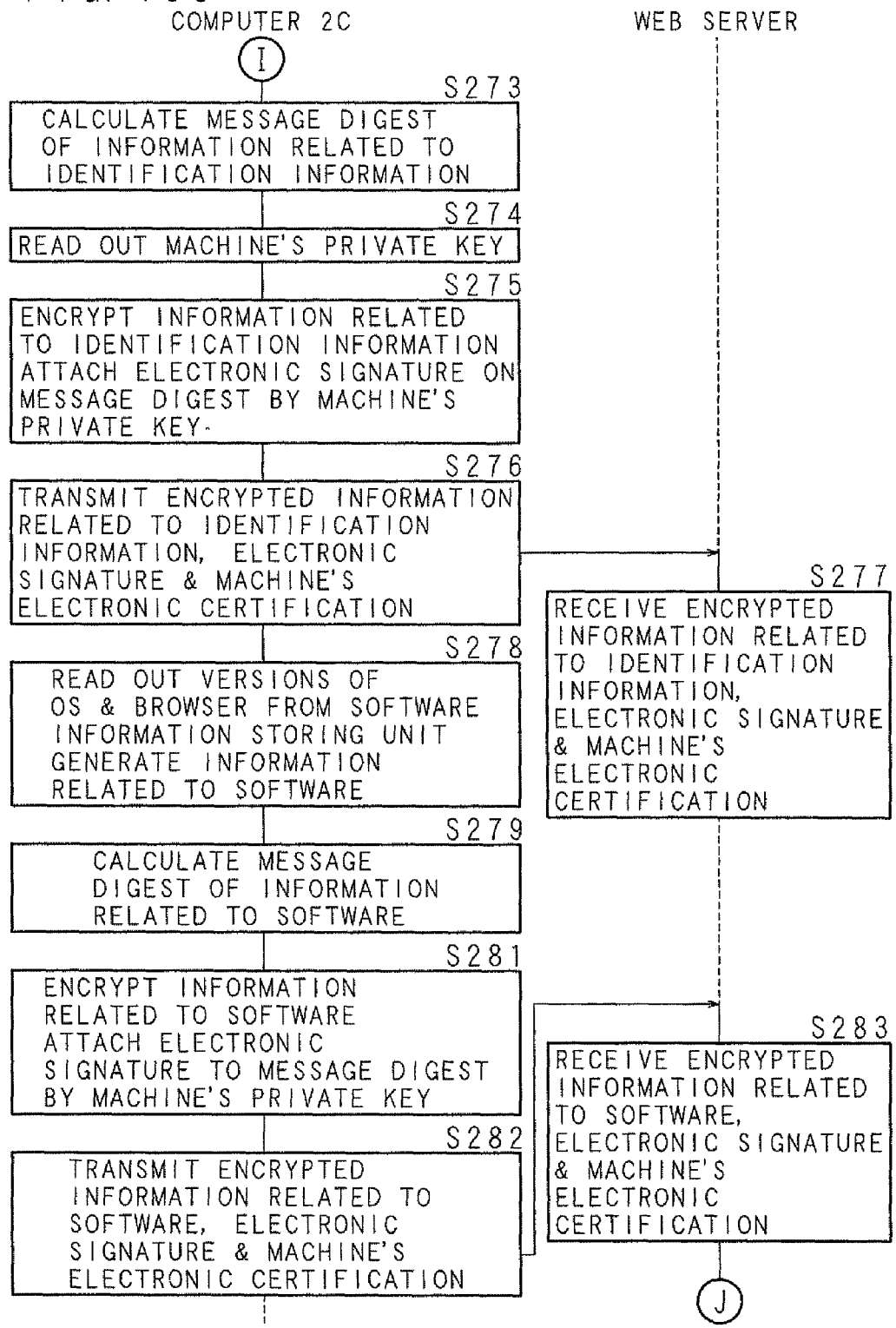

FIG. 18D

COMPUTER 2C | WEB SERVER (J)

S284: RECEIVE PUBLIC KEY FROM CA SERVER

S285: DECRYPT USER'S ELECTRONIC CERTIFICATION & MACHINE'S ELECTRONIC CERTIFICATION
READ OUT USER PUBLIC KEY, MACHINE PUBLIC KEY & ENCRYPTION KEY

S286: VERIFY SIGNATURE ON MESSAGE DIGEST FOR INFORMATION RELATED TO BIOMETRIC AUTHENTICATION BY USER PUBLIC KEY

S287: CALCULATE MESSAGE DIGEST OF INFORMATION RELATED TO BIOMETRIC AUTHENTICATION

S288: VERIFY SIGNATURE ON MESSAGE DIGEST FOR INFORMATION RELATED TO IDENTIFICATION INFORMATION AND MESSAGE DIGEST FOR INFORMATION RELATED TO SOFTWARE

S289: CALCULATE MESSAGE DIGEST OF INFORMATION RELATED IDENTIFICATION INFORMATION & INFORMATION RELATED TO SOFTWARE

S291: ALL MESSAGE DIGESTS MATCHED?
NO → END
YES ↓

S292: IS RESULT OF FINGERPRINT AUTHENTICATION POSITIVE?
NO → END
YES ↓

(K)

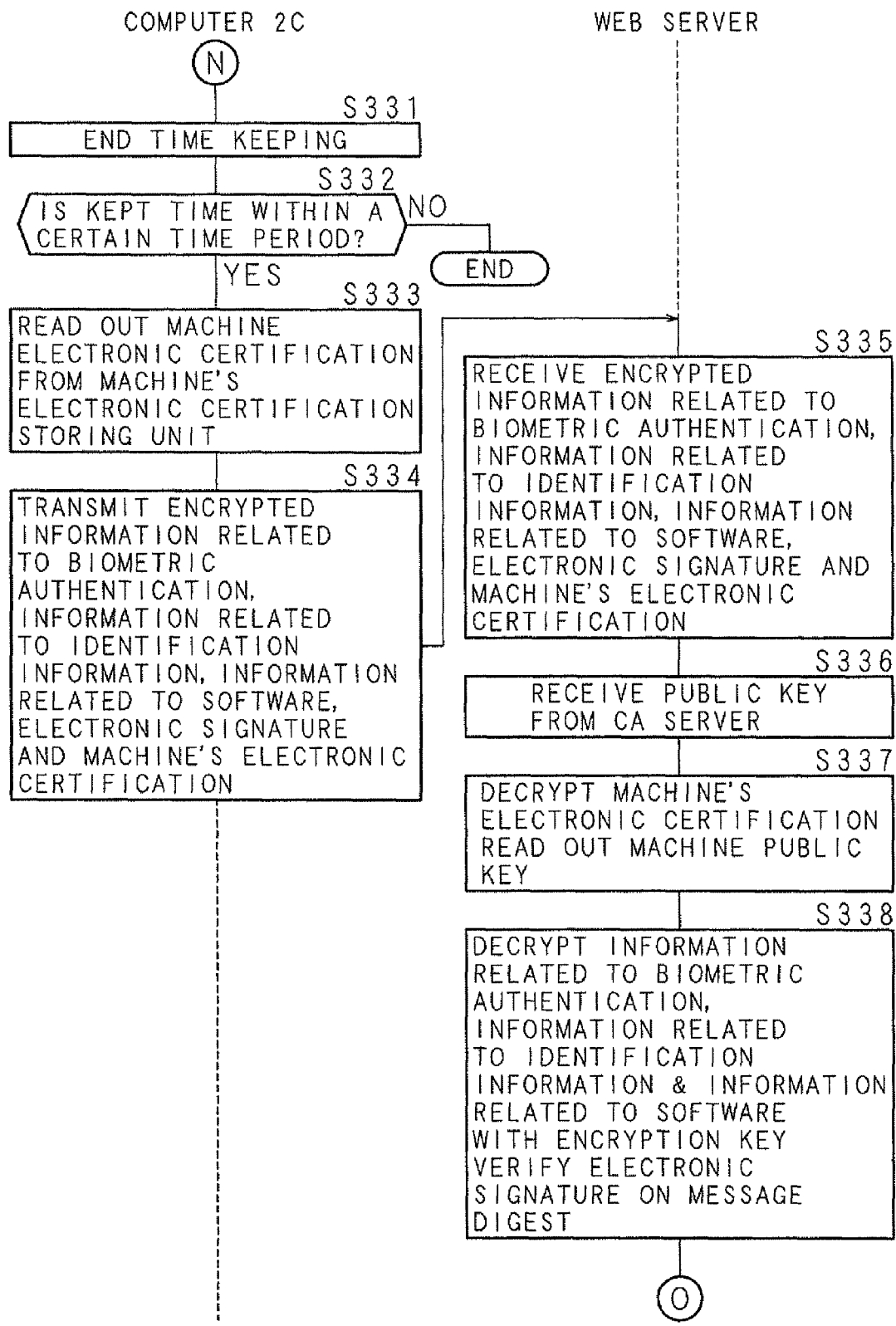

FIG. 21

IMPORTANCE FILE                              ／157

| PROCESSING CONTENTS | IMPORTANCE | CORRESPONDING POLICY TABLE |
|---|---|---|
| BALANCE INQUIRY | LOW | LOW-LEVEL POLICY TABLE |
| MONEY TRANSFER | MEDIUM | MEDIUM-LEVEL POLICY TABLE |
| OVERSEAS REMITTANCE | HIGH | HIGH-LEVEL POLICY TABLE |

FIG. 22

MEDIUM-LEVEL POLICY TABLE  SOFTWARE LEVEL 1                              1542

| MACHINE LEVEL \ BIOMETRIC LEVEL | 1 HDD FACE | 2 HDD FINGERPRINT | 3 SC SC | 3+ SC CERTIFICATION | 3++ BIOMETRIC AUTHENTICATION PKI |
|---|---|---|---|---|---|
| 1 HDD | X | X | X | X | X |
| 2 BIOS | X | X | X | X | X |
| 3 SC | X | X | X | X | X |
| 3+SC CERTIFICATION | X | X | X | X | X |
| 3++ MACHINE AUTHENTICATION PKI | X | X | X | X | O |

FIG. 23

MEDIUM-LEVEL POLICY TABLE   SOFTWARE LEVEL 2                                                        1542

| MACHINE LEVEL \ BIOMETRIC LEVEL | 1 HDD FACE | 2 HDD FINGERPRINT | 3 SC SC | 3+ SC CERTIFICATION | 3++ BIOMETRIC AUTHENTICATION PKI |
|---|---|---|---|---|---|
| 1 HDD | × | × | × | × | × |
| 2 BIOS | × | × | × | × | × |
| 3 SC | × | × | × | × | × |
| 3+ SC CERTIFICATION | × | × | × | × | ○ |
| 3++ MACHINE AUTHENTICATION PKI | × | × | × | ○ | ○ |

FIG. 24

MEDIUM-LEVEL POLICY TABLE  SOFTWARE LEVEL 3

1542

| MACHINE LEVEL | BIOMETRIC LEVEL | | | | |
|---|---|---|---|---|---|
| | 1 HDD FACE | 2 HDD FINGERPRINT | 3 SC | 3+ SC CERTIFICATION | 3++ BIOMETRIC AUTHENTICATION PKI |
| 1 HDD | × | × | × | × | × |
| 2 BIOS | × | × | × | × | × |
| 3 SC | × | × | × | × | ○ |
| 3+ SC CERTIFICATION | × | × | × | ○ | ○ |
| 3++ MACHINE AUTHENTICATION PKI | × | × | ○ | ○ | ○ |

FIG. 25

MEDIUM-LEVEL POLICY TABLE  SOFTWARE LEVEL 3+                                1542

| MACHINE LEVEL \ BIOMETRIC LEVEL | 1 HDD FACE | 2 HDD FINGERPRINT | 3 SC | 3+ SC CERTIFICATION | 3++ BIOMETRIC AUTHENTICATION PKI |
|---|---|---|---|---|---|
| 1 HDD | × | × | × | × | × |
| 2 BIOS | × | × | × | × | ○ |
| 3 SC | × | × | × | ○ | ○ |
| 3+SC CERTIFICATION | × | × | ○ | ○ | ○ |
| 3++ MACHINE AUTHENTICATION PKI | × | ○ | ○ | ○ | ○ |

FIG. 29

POLICY TABLE SOFTWARE LEVEL 1

| | | BIOMETRIC LEVEL | | | | |
|---|---|---|---|---|---|---|
| | | 1<br>HDD<br>FACE | 2<br>HDD<br>FINGERPRINT | 3<br>SC | 3+<br>SC<br>CERTIFICATION | 3++<br>BIOMETRIC<br>AUTHENTICATION PKI |
| MACHINE LEVEL | 1 HDD | × | | | | |
| | 2 BIOS | × | × | × | × | × |
| | 3 SC | × | × | × | × | × |
| | 3+SC CERTIFICATION | × | × | × | × | × |
| | 3++ MACHINE AUTHENTICATION PKI | × | × | × | × | × |

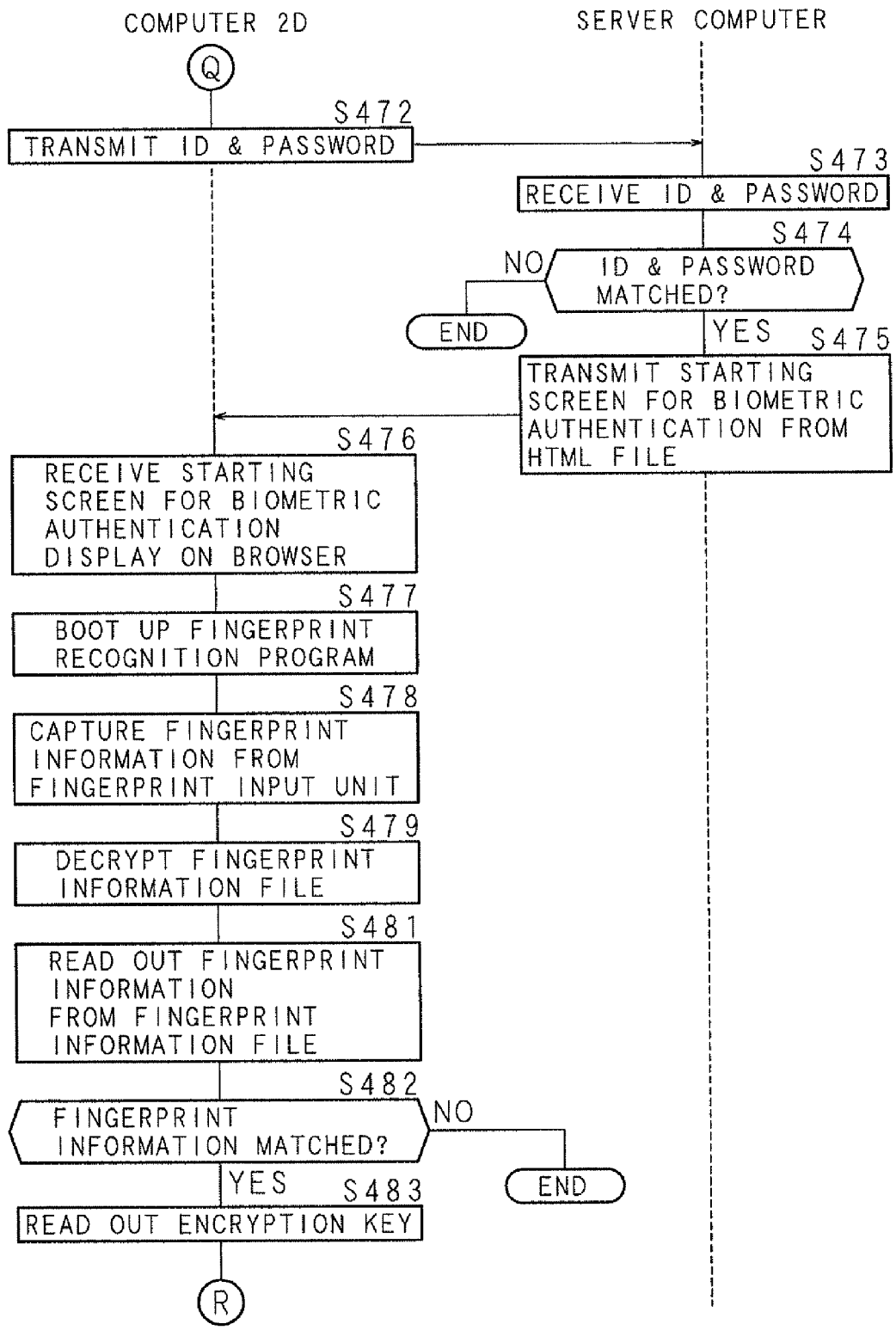

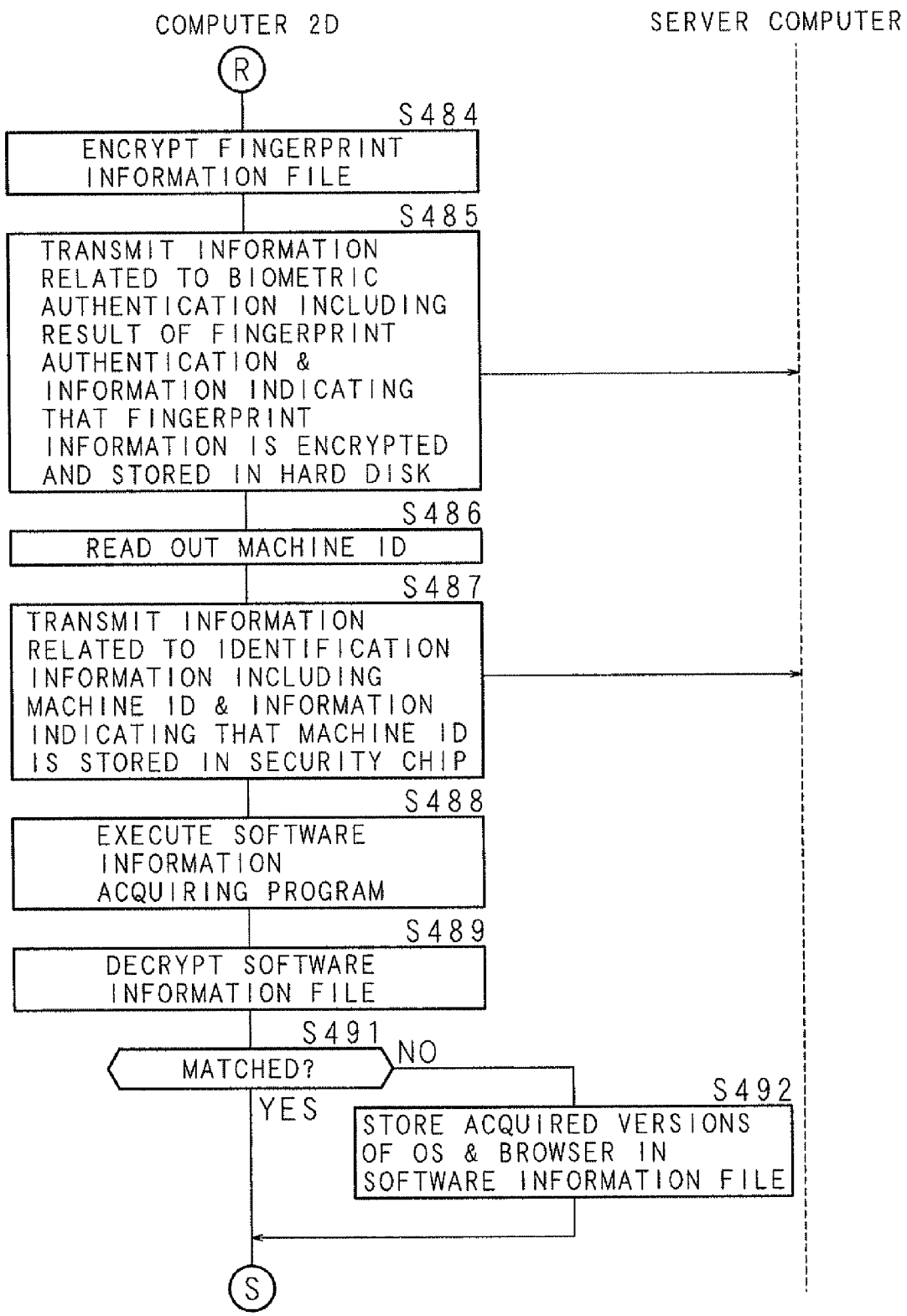

AUTHENTICATION METHOD, AUTHENTICATION DEVICE, PROGRAM AND RECORDING MEDIUM

CROSS-REFERENCE TO RELATED APPLICATIONS

This application is the continuation, filed under 35 U.S.C. §111(a), of PCT International Application No. PCT/JP2008/056403 which has an International filing date of Mar. 31, 2008 and designated the United States of America.

FIELD

The present invention relates to an authentication method of performing authentication for an information processing device connected via a communication network, an authentication device, a program for making the authentication device function as a computer, and a recording medium.

BACKGROUND

In recent years, online transactions through the Internet or the like have been increased. Such online transactions are required to ensure sufficient security. Conventionally, in addition to identity verification using biometrics, Public Key Infrastructure (PKI) authentication and the like have been implemented in order to ensure security. The present applicants have proposed, in Japanese Patent Application Laid-Open No. 2004-157790 for example, a security judgment method by combining biometric authentication, PKI authentication and authentication based on environmental information of a machine (device).

SUMMARY

According to an aspect of the embodiment, an authentication method of performing authentication for an information processing device connected via a communication network by an authentication device, including: receiving information related to biometric authentication concerning the information processing device; receiving information related to identification information for identifying the information processing device; receiving information related to environment of the information processing device; receiving an electronic signature by a secret key which is paired with an electronic certification transmitted from the information processing device; determining, by a control unit, a biometric level based on the received information related to biometric authentication, a device level based on the received information related to identification information and an environment level based on the received information related to environment; correcting, by the control unit, the determined level based on validity of the received electronic signature; and judging as positive, by the control unit, based on a reference level stored in advance and a level determined by all of the corrected biometric level, device level and environment level.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF THE DRAWINGS

FIG. 1 is a schematic view illustrating an outline of an authentication system according to an embodiment.

FIG. 6 is an explanatory view illustrating a record layout of a software DB.

FIG. 8 is an explanatory view illustrating a record layout of a user DB.

FIG. 9 is an explanatory view illustrating a record layout of a software evaluation table.

FIG. 11 is an explanatory view illustrating memory contents of a policy table.

FIG. 12 is an explanatory view illustrating memory contents of a policy table.

FIG. 13 is an explanatory view illustrating memory contents of a policy table.

FIG. 14 is an explanatory view illustrating memory contents of a policy table.

FIG. 15A is a flowchart illustrating a procedure of a level determining process in a computer.

FIG. 15B is a flowchart illustrating a procedure of a level determining process in a computer.

FIG. 15C is a flowchart illustrating a procedure of a level determining process in a computer.

FIG. 16B is a flowchart illustrating a procedure of a level determining process in a computer.

FIG. 17B is a flowchart illustrating a procedure of a level determining process in a computer.

FIG. 17C is a flowchart illustrating a procedure of a level determining process in a computer.

FIG. 18B is a flowchart illustrating another procedure of a level determining process in a computer.

FIG. 18C is a flowchart illustrating another procedure of a level determining process in a computer.

FIG. 18D is a flowchart illustrating another procedure of a level determining process in a computer.

FIG. 19C is a flowchart illustrating a procedure of an integrated PKI authentication process.

FIG. 21 is an explanatory view illustrating a record layout of an importance file.

FIG. 22 is an explanatory view illustrating memory contents of a medium-level policy table.

FIG. 23 is an explanatory view illustrating memory contents of a medium-level policy table.

FIG. 24 is an explanatory view illustrating memory contents of a medium-level policy table.

FIG. 25 is an explanatory view illustrating memory contents of a medium-level policy table.

FIG. 29 is an explanatory view illustrating memory contents of a policy table.

FIG. 30B is a flowchart illustrating a procedure of a level determining process.

FIG. 30C is a flowchart illustrating a procedure of a level determining process.

DESCRIPTION OF EMBODIMENTS

Embodiment 1

Figure 2:
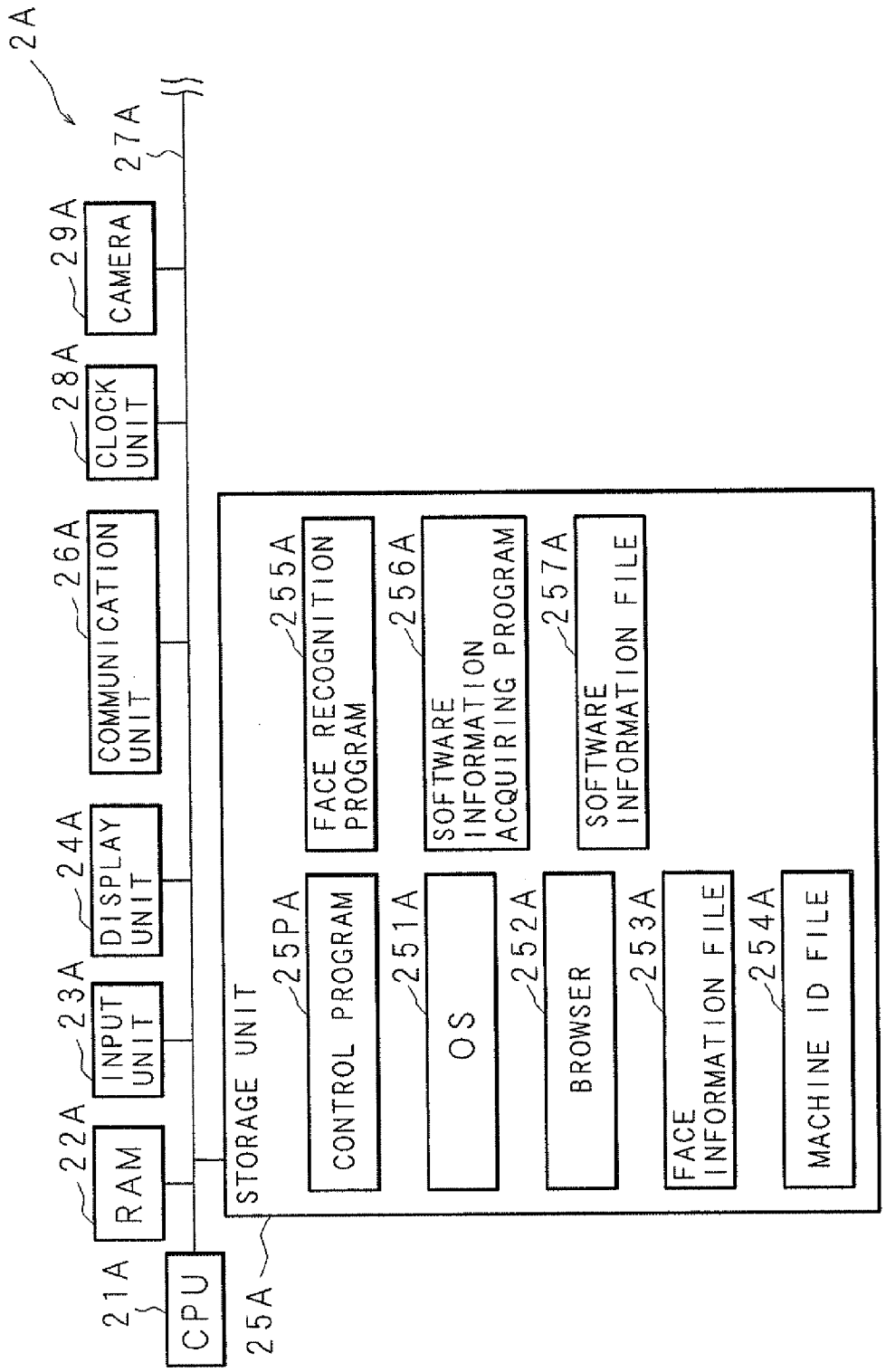
FIG. 2 is a block diagram illustrating hardware of a computer.

An embodiment of the present invention will be described below with reference to the drawings. FIG. 1 is a schematic view illustrating an outline of an authentication system according to the present embodiment. An authentication system includes an authentication device 1, information processing devices 2A, 2B, 2C (hereinafter represented by 2 in some cases), . . . , a communication network N, an authentication facility's server computer 3, a database (hereinafter referred to as DB) server computer 4 and the like. In the present embodiment, though an example is described where the authentication device 1 of a banking facility executes various processes such as money transfer, overseas remittance, foreign currency deposits, application for investment trust, balance inquiries and the like in response to requests from the information processing devices 2, 2, 2, . . . , it is not limited to such an example of online banking. The authentication device 1 of a banking facility will hereinafter be described as a Web server 1. It may also be possible for another Web server connected to the Web server 1 to execute various processes such as money transfer, overseas remittance, foreign currency deposits, application for investment trust, balance inquiries and the like while the Web server 1 executes an authentication process which will be described below.

The information processing device 2 may be a machine such as, for example, a personal computer, a mobile telephone, Personal Digital Assistance (PDA), a portable game machine with a communication function, a music player with a communication function or the like. In the description below, an example where the information processing device 2 is applied to a machine such as a desktop personal computer, a notebook personal computer or the like will be described. A device is described as a machine while the information processing device 2 is described as a computer 2 by way of explanation. The authentication facility's server computer 3 may be a server computer of a certificate authority run by, for example, VeriSign (registered trademark), Inc., GlobalSign, Inc. or the like, which will be referred to as CA (Certificate Authority) server 3 in the description below. The DB server computer 4 administrates information related to the environment of the computer 2. The information related to environment corresponds to the information on the version of OS (Operating System), the version of a patch for the OS, the version of a browser, the version of a patch for the browser, the version of a word processor, the version of an e-mail software, the version of an antivirus software or the like. In the present embodiment, an example with the version of the OS and the version of the browser of the computer 2 will be described to facilitate explanation. The DB server computer 4 will hereinafter be referred to as a DB server 4.

The computer 2, the CA server 3, the Web server 1 and the DB server 4 are connected with one another via the communication network N including the Internet, mobile phone network and the like, which transmit and receive an HTML (HyperText Markup Language) file and the other information by, for example, HTTP (HyperText Transfer Protocol). Each of the computers 2A, 2B, 2C, . . . has a different security level. For example, one of the computers 2 may perform biometric authentication by a fingerprint, while another may perform it by face authentication. Moreover, storing status in the computer 2 of fingerprint and face information which are used for making a decision in biometric authentication may also be different. Furthermore, the computer 2 stores therein unique identification information (hereinafter referred to as machine ID) for identifying the computer 2, such as a MAC (Media Access Control) address and the like, the storing status in the computer 2 of the machine ID also being different depending on the computer 2. In addition, the security level largely differs depending on the version of OS and the version of the browser in the computer 2. Accordingly, the Web server 1 of a banking facility allows the computer 2 with a given security level to perform various processes in an online bank. Details will be described below.

FIG. 2 is a block diagram illustrating hardware of the computer 2A. The computer 2A includes a CPU (Central Processing Unit) 21A as a control unit, a RAM (Random Access Memory) 22A, an input unit 23A, a display unit 24A, a storage unit 25A, a communication unit 26A, a clock unit 28A, a camera 29A and the like. The CPU 21A is connected to each of the hardware units of the computer 2A, and controls them while executing various software functions in accordance with a control program 25PA stored in the storage unit 25A.

The RAM 22A is a semiconductor element, and performs writing and reading out of necessary information in accordance with the instructions of the CPU 21A. The display unit 24A may be, for example, a liquid-crystal display and the like. The input unit 23A is a keyboard, a mouse and the like. It is also possible to construct the display unit 24A and the input unit 23A in an integrated manner as a touch panel. The communication unit 26A may be, for example, a wired or wireless LAN (Local Area Network) card, and performs transmission/reception of information with the Web server 1. The clock unit 28A outputs the present date-and-time information to the CPU 21A. The camera 29A is a CCD (Charge Coupled Device) or the like, and outputs captured image data to the CPU 21A.

The storage unit 25A is a hard disk or a large-capacity flash memory, which stores a control program 25PA, OS 251A (hereinafter represented by OS 251 in some cases) such as Windows (registered trademark), a browser 252A (hereinafter represented by browser 252 in some cases) such as Internet Explorer (registered trademark). In the description below, the storage unit 25A will be described as a hard disk. The browser 252A analyses an HTML file transmitted from the Web server 1 and displays it on the display unit 24A at the instructions of the CPU 21A. In addition, the storage unit 25A also stores therein a face information file 253A, a machine ID file 254A, a face recognition program 255A, a software information acquiring program 256A and a software information file 257A.

The camera 29A, the face information file 253A and the face recognition program 255A performs biometric authentication using the face of the user. Though an example where face authentication and fingerprint authentication are used as biometric authentication is described in the present embodiment, it is also possible to use the iris, vein, voice and the like. Note that the fingerprint authentication will be described as having a higher security level than the face authentication in the description below. Alternatively, the case with only fingerprint authentication is used may also be employed. In the face information file 253A, image data concerning the face of the user is stored in advance. At initial registration, the CPU 21A captures image data of the face of the user from the camera 29A and stores it in the face information file 253A. When face information is stored in the face information file 253A, the CPU 21A judges whether or not the ID and password input from the input unit 23A matches with the ID and password stored in the storage unit 25A. The CPU 21A stores the face information only when it determines that they match with each other.

When face authentication is performed, the CPU 21A receives image data of a face from the camera 29A. The CPU 21A then boots up the face recognition program 255A to judge whether or not the image data of the face stored in the face information file 253A matches with the received image data of the face. If the CPU 21A determines that they match with each other, it transmits the result of the face authentication and information regarding the storing status of the face information in the computer 2A to the Web server 1 via the communication unit 26A in accordance with the instructions of the control program 25PA. The information regarding the storing status is information indicating that "the face information is stored in the hard disk."

A machine ID for identifying the computer 2 is stored in the machine ID file 254A. The machine ID may be, for example, the serial number of the computer 2, the serial number of the storage unit 25A which is a hard disk, the serial number of the communication unit 26A and the like. In the present embodiment, an example is described where a machine ID given to the computer 2A in advance is stored in the machine ID file 254A in the storage unit 25A. The CPU 21A reads out the machine ID stored in the machine ID file 254A as necessary, and transmits the read-out machine ID to the Web server 1 via the communication unit 26A. Furthermore, the CPU 21A transmits the information indicating that "the machine ID is stored in the hard disk" to the Web server 1 as the information concerning the storing status of the machine ID.

When the software information acquiring program 256A is started, the CPU 21A acquires the version of the OS 251A and the version of the browser 252A, and stores them in the software information file 257A. The CPU 21A acquires the version of the OS 251A and the version of the browser 252A at the boot-up of the computer 2A, before shut-down, every time when the authentication process according to the present embodiment is performed, or on a regular basis (e.g., once in every week or every hour). Moreover, the CPU 21A acquires the version of the OS 251A and the version of the browser 252A also when the environment of the computer 2A is changed, i.e., when a new OS 251A or browser 252A is installed or downloaded, or when a patch file, an update program or the like concerning the OS 251A or browser 252A is installed or downloaded.

Also when a request for acquiring the version of the OS 251A and the version of the browser 252A is received from the input unit 23A in accordance with the instructions by the user, the CPU 21A executes the software information acquiring program 256A to acquire the version of the OS 251A and the version of the browser 252A. Moreover, the CPU 21A executes the software information acquiring program 256A to acquire the version of the OS 251A and the version of the browser 252A when a request for acquiring the version of the OS 251A and the version of the browser 252A is received from the Web server 1. The CPU 21A reads out the version of the OS 251A and the version of the browser 252A from the software information file 257A as necessary, and transmits the read-out versions of OS 251A and browser 252A to the Web server 1 via the communication unit 26A as information related to software.

Figure 3:
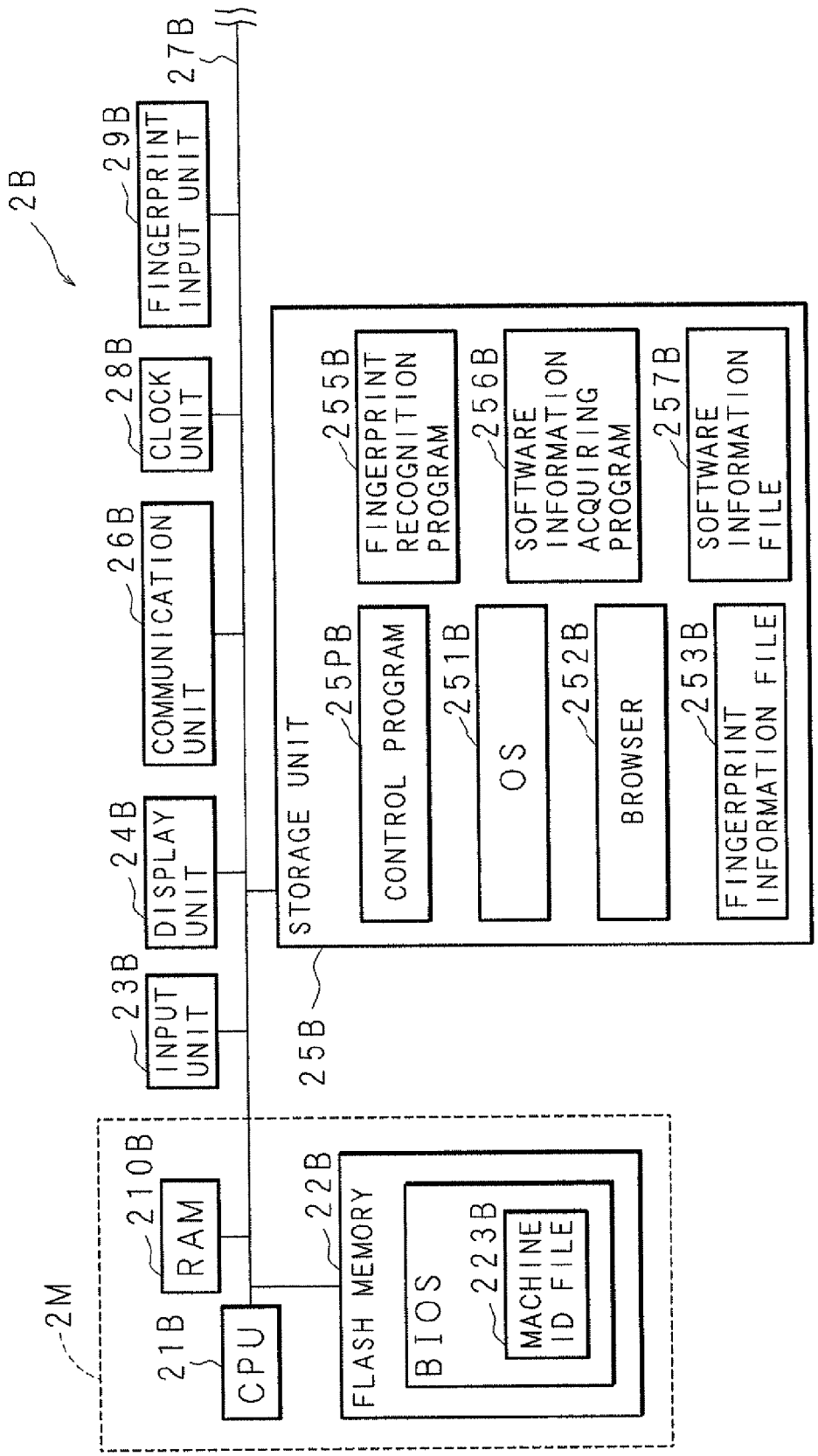
FIG. 3 is a block diagram illustrating hardware of a computer.

FIG. 3 is a block diagram illustrating hardware of the computer 2B. The computer 2B includes a CPU 21B as a control unit, a RAM 210B, a flash memory 22B, an input unit 23B, a display unit 24B, a storage unit 25B, a communication unit 26B, a clock unit 28B, a fingerprint input unit 29B and the like. The CPU 21B is connected to each of the hardware units of the computer 2B via a bus 27B, and controls them while executing various software functions in accordance with a control program 25PB stored in the storage unit 25B.

The flash memory 22B is mounted on a motherboard 2M with the CPU 21B, and stores therein a machine ID file 223B and a program group (hereinafter referred to as BIOS) for controlling peripheral machines such as the input unit 23B and the storage unit 25B. In the machine ID file 223B, the serial number of the computer 2B is stored in advance as a machine ID before shipment of the computer 2B as described above. The machine ID file 223B is protected so as not to allow rewriting of the machine ID. The CPU 21B reads out the machine ID stored in the machine ID file 223B as necessary to transmit it to the Web server 1. Moreover, the CPU 21B transmits information indicating that "the machine ID is stored in BIOS" as information regarding the storing status of the machine ID. Note that, since the computer 2B stores the machine ID in BIOS so as to prohibit easy rewriting, a higher security level is achieved compared to the computer 2A which stores the machine ID in the hard disk.

The RAM 210B is a semiconductor element, and performs writing and reading-out of necessary information in accordance with the instructions of the CPU 21B. The display unit 24B may be, for example, a liquid-crystal display. The input unit 23B is a keyboard, a mouse and the like. The communication unit 26B may be, for example, a wired or wireless LAN card, and performs transmission/reception of information with the Web server 1. The clock unit 28B outputs present date-and-time information to the CPU 21B. The fingerprint input unit 29B is provided near the input unit 23B of the computer 2B. The fingerprint information read by the fingerprint input unit 29B is output to the CPU 21B.

The storage unit 25B is a hard disk or a large-volume flash memory, which stores the control program 25PB, OS 251B, a browser 252B and the like. In the description below, the storage unit 25B will be described as a hard disk for example. The browser 252B analyses an HTML file transmitted from the Web server 1 and displays it on the display unit 24B in accordance with the instructions of the CPU 21B. In addition, the storage unit 25B stores therein a fingerprint recognition program 255B, a fingerprint information file 253B, a software information acquiring program 256B and a software information file 257B.

The fingerprint input unit 29B, the fingerprint information file 253B and the fingerprint recognition program 255B perform fingerprint authentication. In the fingerprint information file 253B, fingerprint information of the user is stored in advance. At the time of initial registration, the CPU 21B captures the fingerprint information of the user from the fingerprint input unit 29B and stores it in the fingerprint information file 253B. When storing the fingerprint information in the fingerprint information file 253B, the CPU 21B judges whether or not the ID and password input from the input unit 23B match with the ID and password stored in the storage unit 25B. The CPU 21B stores the fingerprint information only when it determines that they match with each other.

When fingerprint authentication is executed, the CPU 21B receives fingerprint information from the fingerprint input unit 29B. The CPU 21B then boots up the fingerprint recognition program 255B to judge whether or not the fingerprint information pre-stored in the fingerprint information file 253B matches with the received fingerprint information. If the CPU 21B determines that they match with each other, it transmits the result of the fingerprint authentication and information regarding the storing status of the fingerprint information in the computer 2B to the Web server 1 via the communication unit 26B as information related to biometric authentication in accordance with the instructions of the control program 25PB. The information regarding the storing status is the information indicating that "fingerprint information is stored in the hard disk."

When the software information acquiring program 256B is started, the CPU 21B acquires the version of the OS 251B and the version of the browser 252B to store them in the software information file 257B. The acquisition of the versions may be performed on regular basis, i.e., once in every week for example, or may be performed every time when the version of the OS 251B or browser 252B is updated. The CPU 21B reads out the version of the OS 251B and the version of the browser 252B from the software information file 257B as necessary, and transmits the read-out versions of OS 251B and browser 252B to the Web server 1 via the communication unit 26B as information related to software.

Figure 4:
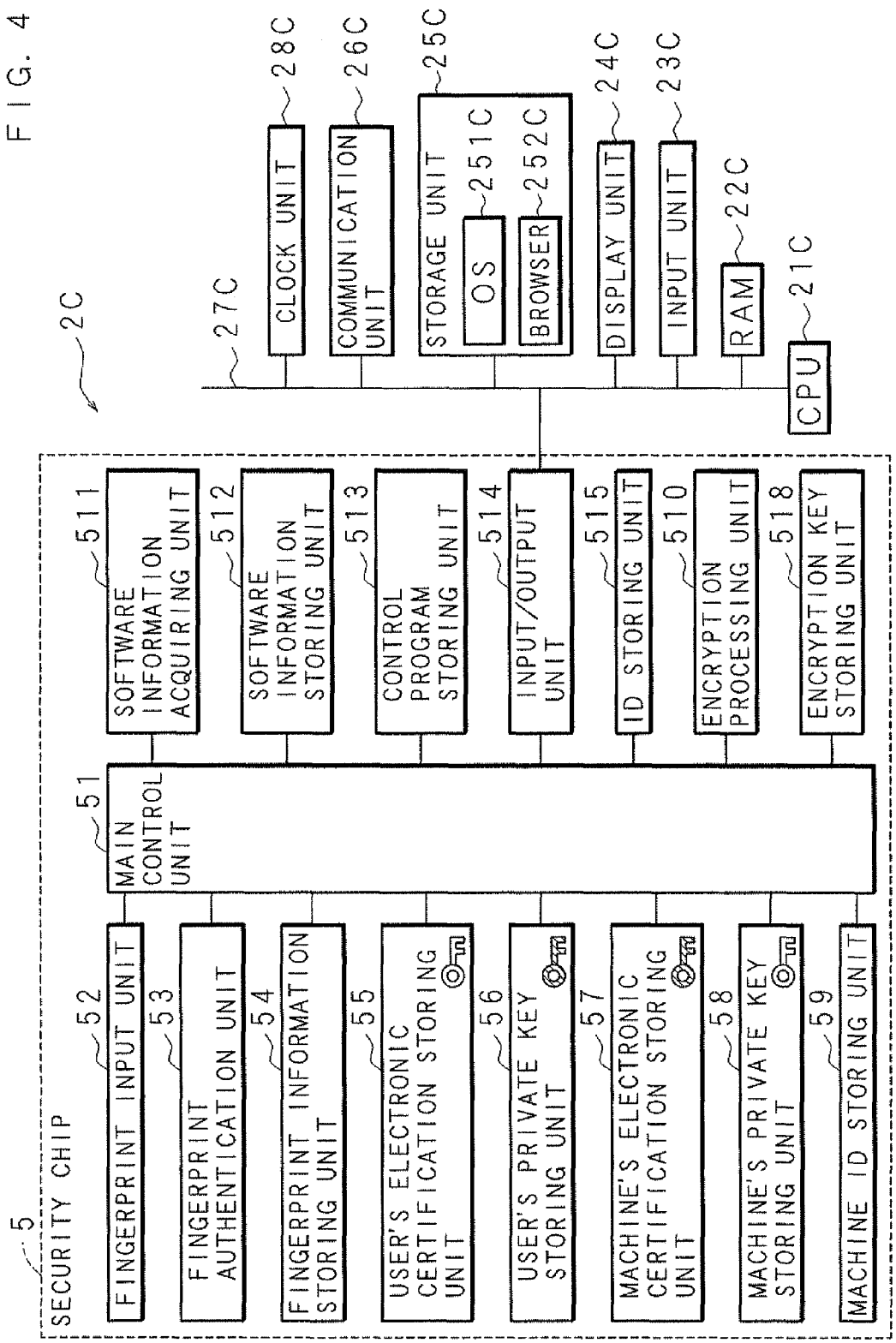
FIG. 4 is a block diagram illustrating hardware of a computer.

FIG. 4 is a block diagram illustrating hardware of the computer 2C. The computer 2C includes a security chip 5, a CPU 21C as a control unit, a RAM 22C, an input unit 23C, a display unit 24C, a storage unit 25C, a communication unit 26C, a clock unit 28C and the like. The computer 2C includes the security chip 5 mounted thereon so as to achieve stronger security, and thus is different from the computers 2A and 2B on which no such chip is mounted.

The CPU 21C is connected to each of the hardware devices of the computer 2C via the bus 27C, and controls them while executing various software functions in accordance with the control program stored in the storing unit 25C. The RAM 22C is a semiconductor element, which performs writing and reading of necessary information in accordance with the instructions of the CPU 21C. The display unit 24C may be, for example, a liquid-crystal display. The input unit 23C is a keyboard, a mouse and the like. The communication unit 26C is, for example, a wired or wireless LAN card, which performs transmission/reception of information with the Web server 1. The clock unit 28C outputs present date-and-time information to the CPU 21C.

The storage unit 25C is a hard disk or a large-volume flash memory, which stores the control program, OS 251C, a browser 252C and the like. In the description below, the storage unit 25C will be described as a hard disk for example. The security chip 5 is an IC (integrated Circuit) chip called TPM (Trusted Platform Module) based on the specifications of TCG (Trusted Computing Group), including basic functions of security established by TCG. The security chip 5 is mounted on the computer 2C to protect data from attacks by software or physical causes, realizing a stronger security compared to the computers 2A and 2B.

The security chip 5 is described. The security chip 5 includes a main control circuit (a circuit is hereinafter simply referred to as a unit) 51, a fingerprint input unit 52, a fingerprint authentication unit 53, a fingerprint information storing unit 54, a user's electronic certification storing unit 55, a user's private key storing unit 56, a machine's electronic certification storing unit 57, a machine's private key storing unit 58, a machine ID storing unit 59, an encryption processing unit 510, a software information acquiring unit 511, a software information storing unit 512, an ID storing unit 515, a control program storing unit 513, an input/output unit 514 and the like. The main control unit 51 is connected to each unit, and executes various processes in accordance with the control program stored in the control program storing unit 513. The security chip 5 is connected to the main CPU 21C of the computer 2C via the input/output unit 514 which is I/F and the bus 27C. The main control unit 51 performs transmission/reception of information with the CPU 21C via the input/output unit 514.

The fingerprint authentication is executed by the fingerprint input unit 52 receiving fingerprint information of the user, the fingerprint authentication unit 53 storing a program for fingerprint authentication and executing a fingerprint authentication process, and a fingerprint information storing unit 54 storing fingerprint information serving as a basis for the fingerprint authentication. The fingerprint authentication may be performed at boot-up of the computer 2C, or alternatively at transmission/reception (transaction) of information with the Web server 1. In the fingerprint information storing unit 54, fingerprint information of the user is stored in advance. At the time of initial registration, the main control unit 51 captures fingerprint information of the user from the fingerprint input unit 52 and stores it in the fingerprint information storing unit 54. When storing the fingerprint information in the fingerprint information storing unit 54, the main control unit 51 judges whether or not the ID and password input from the input unit 23C match with the ID and password stored in the ID storing unit 515. The main control unit 51 stores fingerprint information only when it determines that they match with each other. In the ID storing unit 515, the ID and password input via the input unit 23C at the time of, for example, purchase of the computer 2C are stored.

When the fingerprint authentication is executed, the main control unit 51 receives fingerprint information from the fingerprint input unit 52. The main control unit 51 boots up the fingerprint authentication program in the fingerprint authentication unit 53, to judge whether or not the fingerprint information pre-stored in the fingerprint information storing unit 54 matches with the received fingerprint information. If the main control unit 51 determines that they match with each other, it transmits information related to biometric authentication including the result of the fingerprint authentication and information regarding the storing status of the fingerprint information in the computer 2C to the CPU 21 via the input/output unit 514 in accordance with the instructions of the control program. The information regarding the storing status corresponds to the information indicating that "fingerprint information is stored in the security chip 5." In response to the reception of the information, the CPU 21C transmits the information related to biometric authentication to the Web server 1 via the communication unit 26C.

To further enhance security, a user's electronic certification issued from the CA server 3 may be stored in the user's electronic certification storing unit 55. In the user's electronic certification storing unit 55, a user's public key indicated by an outlined key mark and an electronic certification transmitted from the CA server 3 are stored. Moreover, in the user's private key (secret key) storing unit 56, a user's private key indicated by a hatched key mark which is paired with the user's public key is stored. Note that the public key is stored in the user's electronic certification storing unit 55 while the user's private key is stored in the user's private key storing unit 56 at the time of shipment or initial setting of the security chip 5. The procedure of issuing the user's electronic certification is described. The user inputs owner information including a user name, an e-mail address and the intended purpose of the user's electronic certification from the input unit 23C. The CPU 21C starts the browser 252C to access the CA server 3. The CPU 21C reads out the user's public key stored in the user's electronic certification storing unit 55, and transmits the owner information input from the input unit 23C to the CA server 3 together with the read-out public key.

The CA server 3 performs authentication, and if there is no problem, it adds an electronic signature to the owner information and public key. The CA server 3 generates a user's electronic certification based on the user's public key, owner information and electronic signature in accordance with the specification of X.509. The CA server 3 transmits the generated user's electronic certification to the computer 2C. The CPU 21C of the computer 2C transmits the user's electronic certification to the input/output unit 514. The main control unit 51 stores the user's electronic certification output from the input/output unit 514 in the user's electronic certification storing unit 55. Note that an expiration date may be set in some cases for the user's electronic certification. To sum up, the security of the computer 2C is increased in the order of the following: the case where fingerprint information is stored in the fingerprint information storing unit 54 in the security chip 5 (the first case): the case where fingerprint information is stored in the fingerprint information storing unit 54, a valid user's electronic certification for an expiration date is stored in the user's electronic certification storing unit 55, a user's private key paired with the user's electronic certification is stored in the user's private key storing unit 56, and a valid electronic signature may be applied (the second case): and the case where fingerprint information is stored in the fingerprint information storing unit 54, a valid user's electronic certification for an expiration date is stored in the user's electronic certification storing unit 55, a user's private key paired with the user's electronic certification is stored in the user's private key storing unit 56, a valid electronic signature may be applied, and information related to biometric information including the result of fingerprint authentication and the storing status of fingerprint information is encrypted (the third case). In the description below, an example in the second case where a user's electronic certification is transmitted together will be described.

In the first case described above, the main control unit 51 transmits the result of fingerprint authentication and information indicating that the fingerprint information is stored in the security chip 5 to the CPU 21 via the input/output unit 514 as information related to biometric authentication. The CPU 21C transmits the information related to biometric authentication to the Web server 1 via the communication unit 26C. In the second case described above, as information related to biometric authentication, the main control unit 51 transmits the result of fingerprint authentication and the information indicating that the fingerprint information is stored in the security chip 5 to the CPU 21C via the input/output unit 514 together with the user's electronic certification and the electronic signature attached by the user's private key. The CPU 21C transmits the information related to biometric authentication, the user's electronic certification and the electronic signature for the information related to biometric authentication attached by the user's private key to the Web server 1 via the communication unit 26C. Note that the electronic signature corresponds to a measure such as encryption performed for indicating a person who created information recorded in an electromagnetic record, and may be confirmed whether a change has been introduced thereto. The form of electronic signature described in the present embodiment is merely an example, and it is not limited thereto. That is, the present embodiment is not limited to the specific example, but may take any form as long as an electronic signature is attached to the information transmitted from the computer 2 to the Web server 1, which may determine if the electronic signature is valid.

In the third case, the main control unit 51 performs the processing described below. When the fingerprint information input from the fingerprint input unit 52 matches with the fingerprint information stored in the fingerprint information storing unit 54, the main control unit 51 generates a message digest from the information related to biometric authentication including the result of fingerprint authentication or the information indicating that the fingerprint information is stored in the security chip 5, using a hash function stored in the encryption processing unit 510. In the encryption processing unit 510, an encryption program, a hash function and the like are stored. The main control unit 51 reads out an encryption key from the encryption key storing unit 518, and outputs it to the encryption processing unit 510. Note that the encryption key stored in the encryption key storing unit 518 has been pre-arranged with the Web server 1 in a secure situation. The encryption key is stored in advance in the encryption key storing unit 518, for example, at the time of shipment of the computer 2C. The encryption processing unit 510 performs encryption of the information related to biometric authentication by an encryption processing program. The main control unit 51 reads out a user's private key stored in the user's private key storing unit 56 and outputs it to the encryption processing unit 510. The encryption processing unit 510 attaches an electronic signature to the message digest by the encryption processing program using the user's private key. The main control unit 51 reads out a user's electronic certification from the user's electronic certification storing unit 55.

The main control unit 51 transmits the encrypted information related to biometric authentication and the electronic signature of the message digest to the CPU 21C via the input/output unit 514 together with the read-out user's electronic certification. The CPU 21C transmits the user's electronic certification, the encrypted information related to biometric authentication and the electronic signature of the message digest to the Web server 1 via the communication unit 26C. As will be described later, PKI authentication is performed at the Web server 1. Accordingly, in the third case, it is confirmed that the data is unmistakably transmitted by the user without being altered. Though the PKI authentication is performed on the data related to biometric authentication using the user's electronic certification stored in the user's electronic certification storing unit 55 in the present embodiment, a machine's electronic certification stored in the machine's electronic certification storing unit 57, which will be described later, may also be used.

Subsequently, transmission of information related to identification information will be described. In the machine ID storing unit 59, a machine ID for identifying the security chip 5, the computer 2C or the like is stored. The machine ID corresponds to the serial number of the security chip 5, the serial number of the computer 2C, the serial number of the communication unit 26C or the like. In the description below, the machine ID will be described as the serial number provided to the security chip 5. The machine ID is stored in the machine ID storing unit 59 by the instructions of the main control unit 51 at the time of shipment of the security chip 5. The machine ID is stored in the machine ID storing unit 59 in a non-rewritable status.

In the machine's electronic certification storing unit 57, a machine's electronic certification issued by the CA server 3 is stored. The machine's electronic certification includes a public key of the security chip 5 indicated by an outlined key mark, a machine ID, an expiration date of the machine's electronic certification and the electronic signature of the CA server 3. Note that the machine ID included in the machine's electronic certification may include not only the serial number of the computer 2C but also the serial number of the security chip 5 together. The machine's electronic certification may be issued to a maker by a CA certificate authority at the time of shipment of the computer 2C. In the machine's private key storing unit 58, a machine's private key (indicated by a hatched key mark) corresponding to the public key stored in the machine's electronic certification storing unit 57 is stored. The machine's private key is likewise stored in the machine's private key storing unit 58 in advance at the time of shipment of the computer 2C.

Transmission of information related to identification information is performed by, for example, the three methods described below. In the first method, the machine ID and the information indicating that the machine ID is stored in the security chip 5 are transmitted as the information related to identification information. It is not inevitable to transmit the machine ID itself. In the second method, the information related to identification information including the machine ID and the information indicating that the machine ID is stored in the security chip 5, the machine's electronic certification and the electronic signature attached by the machine's private key stored in the machine's private key storing unit 58, which is paired with the machine's electronic certification, are transmitted. In the description below, an example where the machine's electronic certification is transmitted together in the second method will be described. In the third method, the encrypted identification information, the machine's electronic certification and the electronic signature attached by the machine's private key paired with the machine's electronic certification are transmitted.

Here, the security is increased in the order of the first, second and third methods. In the first method, the main control unit 51 reads out the pre-stored machine ID from the machine ID storing unit 59 and transmits it to the CPU 21C via the input/output unit 514. Along therewith, the main control unit 51 outputs the information indicating that the machine ID is stored in the security chip 5 to the CPU 21C via the input/output unit 514 in accordance with the control program stored in the control program storing unit 513. The CPU 21C transmits the machine ID and the information indicating that the machine ID is stored in the security chip 5 to the Web server 1 as the information related to identification information. Also in this case, since the machine ID is stored in the security chip 5, the security level is still higher compared to the computers 2A and 2B storing the machine ID in the hard disk or BIOS.

According to the second method, the main control unit 51 reads out the pre-stored machine ID from the machine ID storing unit 59 and transmits it to the CPU 21C via the input/output unit 514. Along therewith, the main control unit 51 outputs the information related to identification information including the machine ID and the information indicating that the machine ID is stored in the security chip 5, and the machine's private key to the CPU 21C via the input/output unit 514 in accordance with the control program stored in the control program storing unit 513. The CPU 21C transmits the information related to identification information including the machine ID and the information indicating that the machine ID is stored in the security chip 5, the machine's electronic certification and the electronic signature for the information related to identification information attached by the machine's private key paired with the machine's electronic certification to the Web server 1.

According to the third method, the main control unit 51 performs the following processes in accordance with the control program stored in the control program storing unit 513. The main control unit 51 reads out the pre-stored machine ID from the machine ID storing unit 59, and reads out the information indicating that the machine ID is stored in the security chip 5 from the control program storing unit 513. The main control unit 51 calculates a message digest for the information related to identification information including the read-out machine ID and the information indicating that the machine ID is stored in the security chip 5 using a hash function stored in the encryption processing unit 510.

In the encryption processing unit 510, an encryption processing program, a hash function and the like are stored. The main control unit 51 outputs the message digest and the information related to identification information to the encryption processing unit 510. The main control unit 51 reads out an encryption key from the encryption key storing unit 518 and outputs it to the encryption processing unit 510. The encryption processing unit 510 performs encryption on the information related to identification information by the encryption processing program. The main control unit 51 reads out the machine's private key stored in the machine's private key storing unit 58 and outputs it to the encryption processing unit 510. The encryption processing unit 510 then attaches an electronic signature to the message digest using the machine's private key in accordance with the encryption processing program. The main control unit 51 reads out the machine's electronic certification from the machine's electronic certification storing unit 57.

The main control unit 51 transmits the information related to identification information encrypted at the encryption processing unit 510 and the electronic signature on the message digest to the CPU 21C via the input/output unit 514 together with the read-out machine's electronic certification. The CPU 21C transmits the machine's electronic certification, the encrypted information related to identification information and the electronic signature on the message digest to the Web server 1 via the communication unit 26C. As will be described later, PKI authentication is performed at the Web server 1. As such, in the third case, it is confirmed that the data is the one unmistakably transmitted by the user without being altered. Though PKI authentication is performed on the information related to identification information using the machine's electronic certification stored in the machine's electronic certification storing unit 57 in the present embodiment, the user's electronic certification described above may also be used.

Finally, transmission of information related to software (environment) will be described. The software information acquiring unit 511 acquires the version of OS 251C and the version of browser 252C stored in the storage unit 25C every time the computer 2C is started or at every certain time period. The acquired information on the version of OS 251C and the version of browser 252C is stored in the software information storing unit 512 as the information related to software. The main control unit 51 executes a control program stored in the control program storing unit 513 to perform the transmission process described below.

According to one method, the main control unit 51 transmits the information related to software to the Web server 1 without an electronic signature attached using the private key paired with the user's electronic certification or the machine's electronic certification. According to another method, the information is transmitted to the Web server 1 for PKI authentication together with the electronic signature by the private key paired with the user's electronic certification or machine's electronic certification. The main control unit 51 transmits the encrypted information related to software to the Web server 1 together with the electronic signature attached to the information related to software using the private key (user's private key) paired with the user's electronic certification stored in the user's electronic certification storing unit 55 or the electronic signature attached to the information related to software using the private key (machine's private key) paired with the machine's electronic certification stored in the machine's electronic certification storing unit 57. An example with the machine's electronic certification will be described below. Specifically, the main control unit 51 reads out the information related to software from the software information storing unit 512 and outputs it to the encryption processing unit 510. The main control unit 51 reads out an encryption key from the encryption key storing unit 518 and outputs it to the encryption processing unit 510. The encryption processing unit 510 then performs encryption of the information related to software by the encryption processing program. The encryption processing unit 510 calculates a message digest for the information related to software based on the stored hash function. The encryption processing unit 510 outputs the calculated message digest to the main control unit 51.

The main control unit 51 reads out the machine's private key stored in the machine's private key storing unit 58, and attaches an electronic signature to the message digest using the read-out machine's private key. The main control unit 51 then outputs the encrypted information related to software, the electronic signature on the message digest and the machine's electronic certification read out from the machine's electronic certification storing unit 57 to the CPU 21C via the input/output unit 514. The CPU 21C transmits the machine's electronic certification, the encrypted information related to software and the electronic signature on the message digest to the Web server 1.

In addition to the above, all of the information related to biometric authentication, the information related to identification information and the information related to software may be transmitted with electronic signature attached for PKI authentication uniformly using the user's electronic certification stored in the user's electronic certification storing unit 55 or the machine's electronic certification stored in the machine's electronic certification storing unit 57. In such a case, various pieces of information are transmitted at the same time through PKI authentication, enabling further enhancement of the security level. An example where PKI authentication is performed uniformly using the machine's electronic certification will be described below.

The main control unit 51 outputs the information related to biometric authentication, the information related to identification information and the information related to software described above to the encryption processing unit 510. The main control unit 51 reads out an encryption key by the encryption key storing unit 518 and outputs it to the encryption processing unit 510. The encryption processing unit 510 then performs encryption of information by the encryption processing program. The encryption processing unit 510 calculates a message digest for the information related to biometric authentication, the information related to identification information and the information related to software based on the stored hash function. The encryption processing unit 510 outputs the calculated message digest to the main control unit 51.

The main control unit 51 reads out the machine's private key stored in the machine's private key storing unit 58 and attaches an electronic signature to the message digest using the read-out machine's private key. The main control unit 51 then outputs the encrypted information related to biometric authentication, information related to identification information and information related to software, as well as the electronic signature on the message digest and the machine's electronic certification read out from the machine's electronic certification storing unit 57 to the CPU 21C via the input/output unit 514. The CPU 21C transmits the machine's electronic certification, the encrypted information related to biometric authentication, information related to identification information and information related to software, as well as the electronic signature on the message digest to the Web server 1. Though three examples of the computers 2A to 2C are illustrated in the present embodiment, they are mere examples and the present embodiment is not limited thereto. It is also possible to appropriately integrate the hardware units in the computers 2A, 2B and 2C. For example, though the face information file 253A in the computer 2A is stored in the storage unit 25A which is a hard disk, it may also be stored in BIOS in the flash memory 22B as in the computer 2B. Moreover, though biometric authentication for the computer 2C is executed in the security chip 5, it may also be executed outside the security chip 5 as in the computer 2B.

Figure 5:
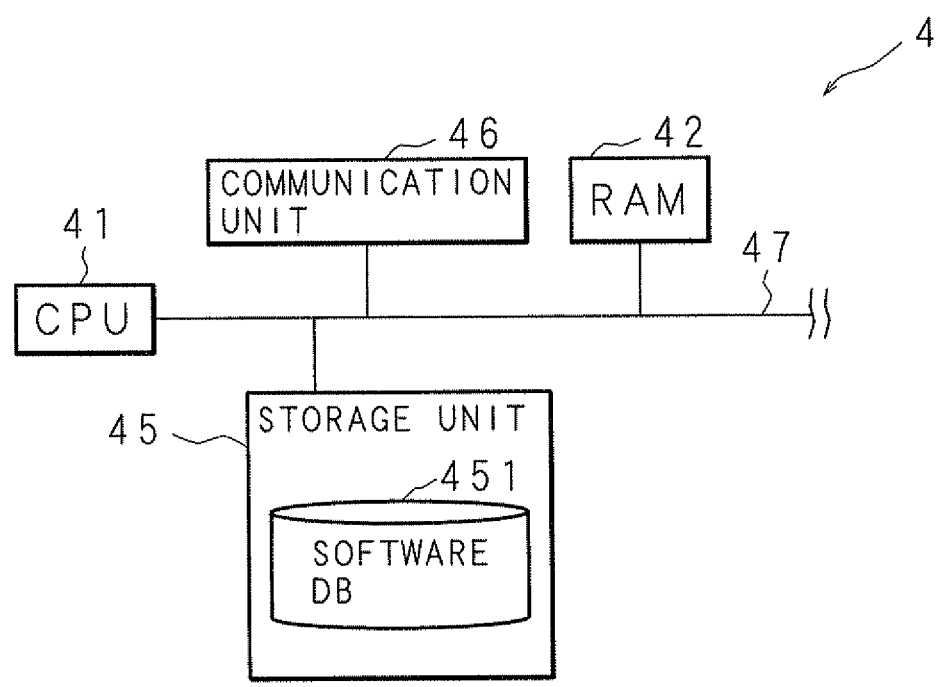
FIG. 5 is a block diagram illustrating hardware of a DB server.

FIG. 5 is a block diagram illustrating hardware of the DB server 4. The DB server 4 includes a CPU 41, a RAM 42, a communication unit 46 and a storage unit 45. The CPU 41 is connected to each hardware unit of the DB server 4 via a bus 47, and controls them while executing various software functions in accordance with a control program stored in the storage unit 45. The RAM 42 is a semiconductor element, and performs writing and reading-out of necessary information in accordance with the instructions of the CPU 41. The communication unit 46 may be a gateway or the like serving as a firewall.

The storage unit 45 stores therein a software DB 451. The CPU 41 performs interactions using an access interface according to the form of a database such as SQL (Structured Query Language) in a scheme with which a key of a field in the software DB 451 is associated, to execute processes such as storing and searching of necessary information. In the software DB 451, information related to various versions of the OS and browser are stored. The CPU 41 transmits the information related to the versions of the OS and browser in response to a request from the Web server 1.

FIG. 6 is an explanatory view illustrating a record layout of the software DB 451. The software DB 451 includes a type field, a version field, an update time field and a contents field. In the type field, the names of OS and browser are stored. In the version field, versions of OS or browser are stored. In the update time field, date-and-time information at which each software is updated is stored by associating it with an OS and its version or a browser and its version. For example, the version "W06" of the OS is the latest version which passed through the versions "W01" to "W05," and the update time of Sep. 25, 2007, 12:01 is stored. Moreover, the version "I05" of the browser is the latest version which passed through the versions "I01" to "I04," and the update time of Oct. 5, 2007, 21:00:20 is stored. In the contents field, explanation for each version is stored. The CPU 41 stores a version, update time and contents in the software DB 451 every time the version of the OS or software is updated.

Figure 7:
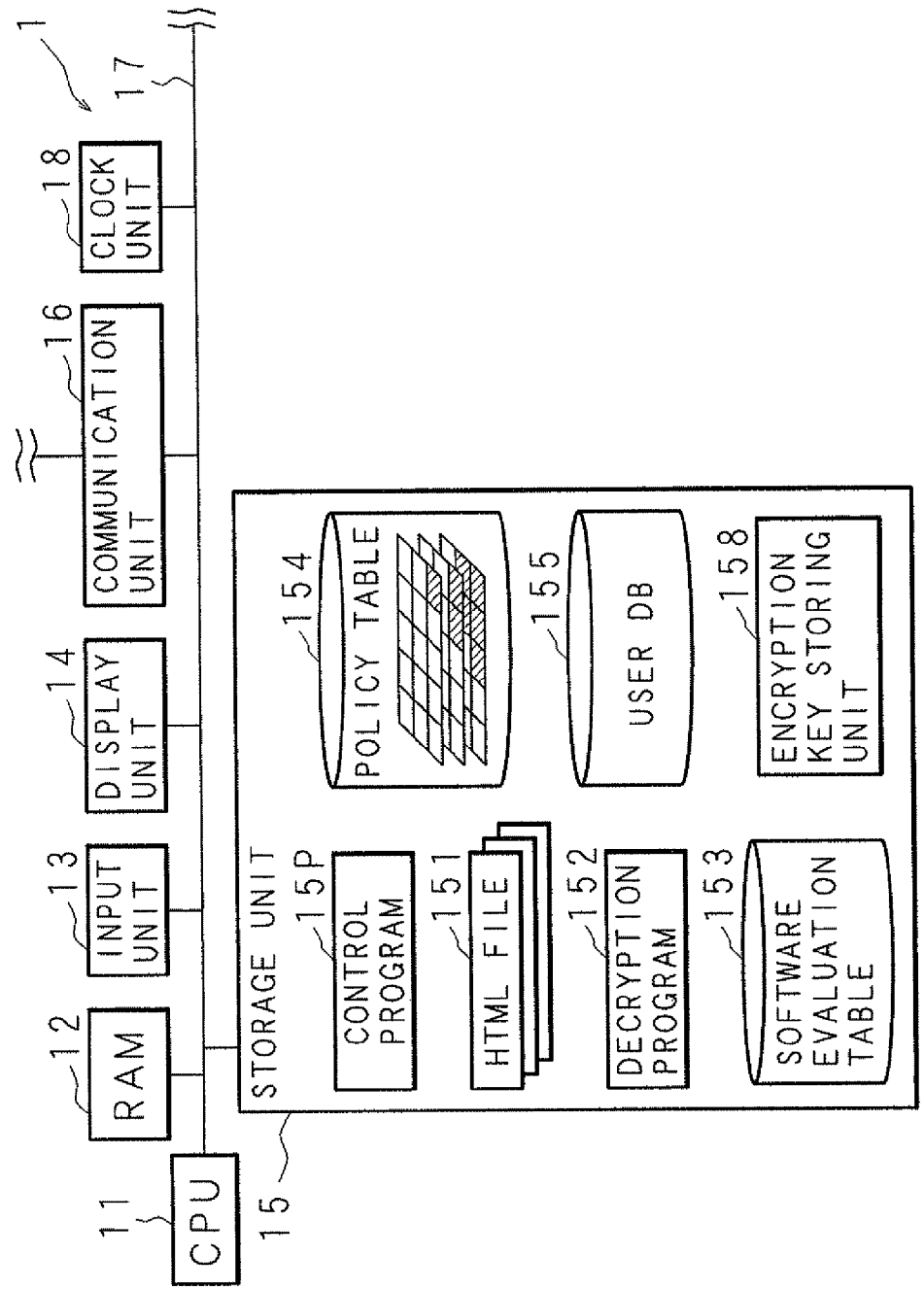
FIG. 7 is a block diagram illustrating hardware of a Web server.

FIG. 7 is a block diagram illustrating hardware of the Web server 1. The Web server 1 includes a CPU 11 as a control unit, a RAM 12, an input unit 13, a display unit 14, a storage unit 15, a communication unit 16, a clock unit 18 and the like. The CPU 11 is connected to each hardware unit via a bus 17, and controls them while executing various software functions in accordance with a control program 15P stored in the storage unit 15.

The RAM 12 is an semiconductor element, which performs writing and reading-out of necessary information in accordance with the instructions of the CPU 11. The display unit 14 is, for example, a liquid-crystal display. The input unit 13 is a keyboard, mouse and the like. The communication unit 16 is a gateway or the like serving as a firewall, performing transmission/reception of information with the computer 2, the CA server 3 and the DB server 4. The clock unit 18 outputs present date-and-time information to the CPU 11. The storage unit 15 is, for example, a hard disk, storing the control program 15P, an HTML file 151, a decryption program 152, a software evaluation table 153, a policy table 154, an encryption key storing unit 158, a user DB 155 and the like. Note that the software evaluation table 153, the user DB 155 and the policy table 154 may not necessarily be stored in the storage unit 15 in the Web server 1, but may be stored in a DB server (not illustrated) to be read and written as necessary.

In the HTML file 151, screens for executing various processes such as a top page of online banking, a registration screen, a money transfer screen and a balance inquiry screen are stored in the HTML format. In response to a request from the computer 2, the CPU 11 of the Web server 1 appropriately reads out a corresponding HTML file 151 and transmits it to the computer 2 via the communication unit 16. The decryption program 152 is a program for decrypting encrypted information transmitted from the computer 2. Note that a hash function is stored in the storage unit 15. The user DB 155 stores the information of the user and the information of the computer 2 which conduct transactions. The encryption key storing unit 158 stores an encryption key corresponding to the encryption key stored in the encryption key storing unit 518 of the computer 2C.

FIG. 8 is an explanatory view illustrating a record layout of the user DB 155. The user DB 155 includes, for example, an ID field, a password field, a name field, a machine ID field, an account number field and a balance field. In the ID field, a unique ID for identifying an intended user of transaction. Moreover, in the password field, a password is stored by associating it with an ID. In the name field, a full name of the user is stored by associating it with an ID. In the machine ID field, a machine ID for identifying the computer 2 is stored. The machine ID differs depending on a type of the computer 2 as described above. In the account number field, an account number of the user is stored. In the balance field, a bank balance corresponding to an account number is stored. For the name, account number and balance, data transmitted from a bank server (not illustrated) is stored in the user DB 155 at the instructions of the CPU 11.

The user stores an ID, a password and a machine ID in the user DB 155 at initial registration in online banking. The computer 2 transmits the ID and password input by the user. The CPU 11 of the Web server 1 stores the transmitted ID and password in the user DB 155 by associating them with an account number. The computer 2 transmits the ID and password as well as a machine ID to the Web server 1. The CPU 11 of the Web server 1 stores the received machine ID in the user DB 155 by associating it with the account number.

The software evaluation table 153 stores a level corresponding to a version of a software. FIG. 9 is an explanatory view illustrating a record layout of the software evaluation table 153. The software evaluation table 153 stores a software level by associating it with each of the versions of OS and browser. In the software evaluation table 153, values are stored such that the newer the version of OS or browser is, the higher the software level becomes. For example, when the versions of OS and browser are both the newest, the software level is stored as 3, the highest value. Moreover, when the version of OS is the newest while the version of browser is one version older than the newest, the software level of 2 which is lower than 3 is stored. Furthermore, when, for example, the version of OS is two to four versions older than the newest while the version of browser is three versions older, the software level of 1 which is the lowest is stored. Note that the numeral values indicated in the software evaluation table 153 are mere examples, and the values are not limited thereto.

When the version of OS and the version of browser are received from the computer 2 as information related to software, the CPU 11 transmits the versions of OS and browser to the DB server 4. The CPU 41 of the DB server 4 receives the versions of OS and browser, and searches for the software DB 451. The CPU 41 then stores the information indicating that whether the received version of the OS is the newest or how many versions older in the RAM 42 with reference to the update time. The CPU 41 also stores the information indicating whether the received version of the browser is the newest or how many versions older in the RAM 42 with reference to the update time.

The CPU 41 transmits the information related to the versions of OS and browser stored in the RAM 42 (the information indicating whether the version is the newest or how many versions older) to the Web server 1. The CPU 11 of the Web server 1 refers to the software evaluation table 153 to read out a software level based on the information related to the versions of OS and browser transmitted from the DB server 4. Though an example is described in the present embodiment where inquiry for the information on a version is made to the DB server 4 outside, it may also be possible to prepare the software DB 451 which is updated as needed in the storage unit 15 in the Web server 1.

As with the level (software level) based on the information related to software described above, the CPU 11 determines a level based on the transmitted information related to biometric authentication (hereinafter referred to as biometric level)

and a level based on the information related to identification information (device level, hereinafter referred to as machine level). The CPU 11 determines the biometric level and machine level to be higher as the security is more enhanced. The CPU 11 then comprehensively examines the software level, biometric level and machine level to determine whether or not a future process with the computer 2 is allowed, i.e., if the computer 2 is positive or negative.

Figure 10:
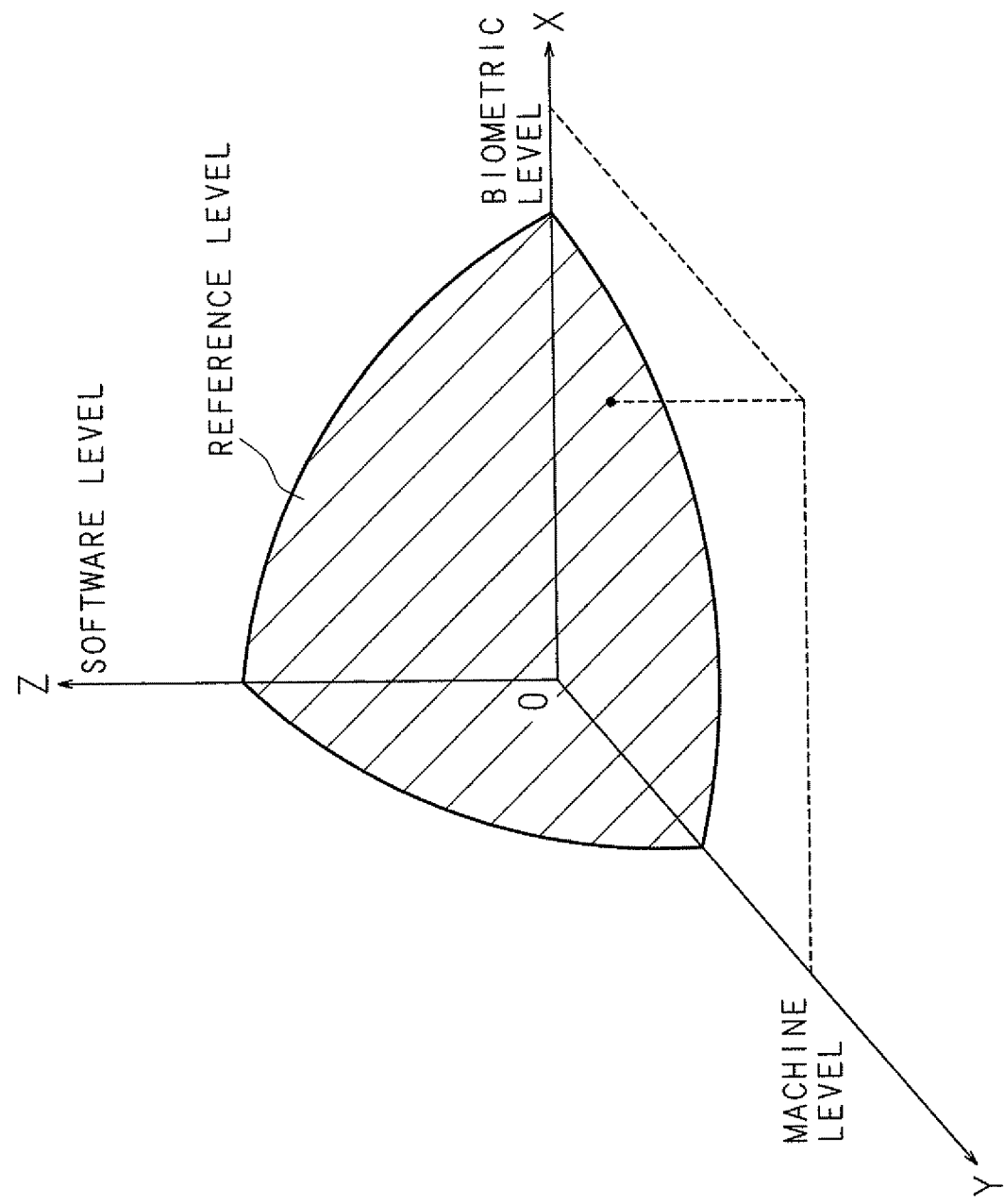
FIG. 10 is a graphic chart illustrating a process of judging positive or negative of a computer according to an embodiment.

FIG. 10 is a graphic chart illustrating a process of judging positive or negative of the computer 2 according to the present Embodiment. The X-axis indicates the biometric level, the Y-axis indicates the machine level, and the Z-axis indicates the software level. On the X-axis, the security level becomes more enhanced in the direction from the original point toward the positive direction. Likewise, on the Y-axis and Z-axis, the security level is more enhanced in the direction from the original point toward the positive direction. A point on the coordinate axis is determined by the biometric level, machine level and software level determined by the transmitted information related to biometric authentication, information related to identification information and information related to software. The reference level in the hatched area is determined in advance by the reference level of the biometric level, the reference level of the machine level and the reference level of the software level. When a process in online banking is executed, the point on the coordinate axis needs to be outside the area of the reference level. When the point on the coordinate axis is inside the hatched area of the reference level, it is determined that the security policy is not satisfied and the process is terminated.

In the storage unit 15 illustrated in FIG. 7, the reference level determined by the reference levels of the biometric level, machine level and software level is stored in advance in accordance with a security policy. More specifically, "1" indicating positive and "0" indicating negative are stored in association with three-dimensional coordinate values. As will be described later, the CPU 11 performs correction and thereafter determines a point on the coordinate axis based on a level. The CPU 11 then judges whether the point is equal to or higher than the reference level, i.e., whether or not "1" indicating positive is stored in the storage unit 15 for the point. If the CPU 11 judges that "positive" is stored, it decides that the computer 2 satisfies the security policy, and continues processing such as money transfer. If, on the other hand, the point is lower than the reference level, the CPU 11 judges that the computer 2 does not satisfy the security policy, terminating the process.

Judgment of positive or negative may be performed on the three-dimensional coordinate axis as described above, or alternatively may be performed with a table provided in accordance with a level. FIGS. 11 to 14 are explanatory views illustrating memory contents of the policy table 154. Note that HDD is an abbreviation for a hard disk drive, while SC is an abbreviation for a security chip. In the policy table 154, positive or negative is stored in association with all possible combinations of the biometric level, machine level and software level. In the drawings, "positive" is indicated by a circle, while "negative" is indicated by an X-mark. A flag indicated by a circle corresponds to the reference level. The policy table 154 stores a plurality of biometric levels in accordance with the information related to biometric authentication or the like in the computer 2, and stores a plurality of machine levels in accordance with the information related to identification information or the like. It also stores a plurality of software levels in accordance with the information related to software or the like of the computer 2. First, a specific example of determining and correcting processes of the biometric level will be described.

The biometric level is determined as any one of the levels 1 to 3. If an electronic signature is valid and there is a user's electronic certification with a valid expiration date, the level is corrected to a level 3+ (level 4). Moreover, if it is determined that there is a user's electronic certification with a valid expiration date, that the information related to biometric authentication is encrypted and transmitted, and that an electronic signature is valid without being altered, the level is corrected to a level 3++ (level 5). The level 1 is a level determined when the type of biometric authentication is face authentication, the result of the face authentication is positive, and when face information for face authentication is stored in the hard disk. The level 2 is higher than level 1, and determined when the type of biometric authentication is fingerprint authentication, the result of the fingerprint authentication is positive, and when fingerprint information for fingerprint authentication is stored in the hard disk. The level 3 is higher than level 2, and determined when the type of biometric authentication is fingerprint authentication, the result of the fingerprint authentication is positive, and when fingerprint information for fingerprint authentication is stored in the security chip 5.

The corrected level 3+ is even higher than level 3. The level 3 is corrected to level 3+ when the type of biometric authentication is fingerprint authentication, the result of the fingerprint authentication is positive, when fingerprint information for fingerprint authentication is stored in the security chip 5, and when a user's electronic certification with a valid expiration date and a valid electronic signature provided by a private key which is paired with the user's electronic certification are transmitted together with the information related to biometric authentication at the same time. The corrected level 3++ is yet higher than level 3+. The level 3+ is further corrected to level 3++ when: the type of biometric authentication is fingerprint authentication, the result of the fingerprint authentication is positive; fingerprint information for fingerprint authentication is stored in the security chip 5; a user's electronic certification with a valid expiration date and a valid electronic signature provided by a private key which is paired with the user's electronic certification are transmitted together with the information related to biometric authentication at the same time; and when the information related to biometric authentication is encrypted and not altered. When the CPU 11 receives from the computer 2 the information related to biometric authentication including the result of face authentication and the information indicating that face information for the face authentication is stored in the storage unit 25A or the like which is a hard disk, and only when the result of face authentication is positive, the CPU 11 refers to the policy table 154 to determine the computer 2 as level 1.

Moreover, when the CPU 11 receives from the computer 2 the information related to biometric authentication including the result of fingerprint authentication and the information indicating that fingerprint information for fingerprint authentication is stored in the storage unit 25B or the like which is a hard disk, and only when the result of the fingerprint authentication is positive, the CPU 11 refers to the policy table 154 to determine the computer 2 as level 2. When the CPU 11 receives from the computer 2 the information related to biometric authentication including the result of fingerprint authentication and the information indicating that fingerprint information for fingerprint authentication is stored in the security chip 5, and only when the result of fingerprint authentication is positive, the CPU 11 refers to the policy table 154 to determine the computer 2 as level 3.

Furthermore, when the CPU 11 receives from the computer 2 a user's electronic certification with a valid expiration date and a valid electronic signature provided by a private key which is paired with the user's electronic certification in addition to the information related to biometric authentication including the result of fingerprint authentication and the information indicating that fingerprint information for fingerprint authentication is stored in the security chip 5, and only when the result of fingerprint authentication is positive, the CPU 11 corrects the level of the computer 2 and determines it as level 3+ with reference to the policy table 154. Note that the validity of an expiration date may be judged with reference to the date-and-time information output from the clock unit 18. If it passes the expiration date, the level 3 is applied. Finally, when the information related to biometric authentication including the encrypted result of fingerprint authentication and the information indicating that fingerprint information for fingerprint authentication is stored in the security chip 5 is encrypted, and when a user's electronic certification with a valid expiration date and a valid electronic signature provided by a private key which is paired with the user's electronic certification are received from the computer 2, and only when the electronic signature is not altered and the result of fingerprint authentication is positive, the CPU 11 corrects the level of the computer 2 and determines it as level 3++ with reference to the policy table 154.

Next, the machine level will be described. The level 1 is a level determined when a machine ID is stored in a hard disk. The level 2 is higher than level 1, which is determined when the machine ID is stored in BIOS. The level 3 is higher than level 2, which is determined when the machine ID is stored in the security chip 5. The level 3+ is higher than level 3. The level 3 is corrected to 3+ when the machine ID is stored in the security chip, and when a machine's electronic certification with a valid expiration date and a valid electronic signature provided by a private key which is paired with the machine's electronic certification are transmitted at the same time with the information related to identification information. The corrected level 3++ is even higher than level 3+. The level is corrected to level 3++ when: the machine ID is stored in the security chip 5; the information related to identification information is encrypted, a machine's electronic certification with a valid expiration date and a valid electronic signature provided by a private key which is paired with the machine's electronic certification are transmitted at the same time; and when the information related to identification information is not altered.

When the information related to identification information including a machine ID and the information indicating that the machine ID is stored in the storage unit 25A which is a hard disk is received from the computer 2, the CPU 11 determines that the computer 2 as level 1 with reference to the policy table, on the condition that the transmitted machine ID matches with the machine ID stored in the user DB 155. When the information related to identification information including a machine ID and the information indicating that the machine ID is stored in BIOS is received from the computer 2, the CPU 11 determines the computer 2 as level 2 with reference to the policy table 154 on the condition that the transmitted machine ID matches with the machine ID stored in the user DB 155.

When the information related to identification information including a machine ID and the information indicating that the machine ID is stored in the security chip 5 is received from the computer 2, the CPU determines the computer 2 as level 3 with reference to the policy table 154 on the condition that the transmitted machine ID matches with the machine ID stored in the user DB 155. When the information related to identification information including a machine ID and the information indicating that the machine ID is stored in the security chip 5 is received from the computer 2 together with a machine's electronic certification with a valid expiration date and a valid electronic signature provided by a private key which is paired with the machine's electronic certification, the CPU 11 corrects the level of the computer 2 and determines it as level 3+ with reference to the policy table 154 on the condition that the transmitted machine ID matches with the machine ID stored in the user DB 155. Moreover, when the information related to identification information including an encrypted machine ID and the information indicating that the machine ID is stored in the security chip 5 is received from the computer 2 together with a machine's electronic certification with a valid expiration date and a valid electronic signature provided by a private key which is paired with the machine's electronic certification, the CPU 11 corrects the level of the computer 2 and determines it as level 3++ with reference to the policy table 154 on the condition that the transmitted machine ID matches with the machine ID stored in the user DB 155 without being altered.

The software level is a level determined by the software evaluation table 153 described above, including software level 1 to 3. A correcting process is performed in the case described below. When the information related to software is transmitted from the computer 2 together with a valid machine's electronic certification or user's electronic certification and a valid electronic signature provided by a private key which is paired with the electronic certification, and when the information related to software is not altered, the CPU 11 corrects the level. The level 1 to 3 are corrected to level 2, level 3 and level 3++, respectively. Furthermore, as will be described later, when the information related to biometric authentication, information related to identification information and information related to software are encrypted and transmitted together with a valid machine's electronic certification and a valid electronic signature provided by a private key which is paired with the machine's electronic certification during a given time period without being altered, or when all of the information related to biometric authentication, information related to identification information and information related to software are transmitted at the same time together with a machine's electronic certification and a valid electronic signature provided by a private key which is paired with the machine's electronic certification, without being altered, the CPU 11 performs a correcting process. Here, though not illustrated, level 2, level 3 and level 3+ are corrected to higher levels of level 3, level 3+ and level 3++, respectively. The CPU 11 determines positive or negative with reference to the policy table 154 based on the biometric level, machine level and software level decided by the processes described above.

FIG. 11 illustrates the case where the software level is 1. When the software level is 1, meaning that the security level is low, negative marks are stored for all cases regardless of the biometric level and machine level. FIG. 12 illustrates the case where the software level is 2. The security is somewhat enhanced compared to the software level 1, information is stored such that the computer 2 is determined as positive when both the biometric and machine levels indicate 3++. FIG. 13 illustrate the case where the software level is 3. Since the software has a newer version and higher security may be expected, information is stored such that the computer 2 is determined as positive when both the biometric and machine level indicates 3++, when the biometric level is 3++ while the machine level is 3+, and when the biometric level is 3+ while the machine level is 3++.

FIG. 14 indicates the case where the software level is 3+. Since the software level is high and not altered, information is stored such that the computer 2 is determined as positive when both the biometric and machine levels indicate 3++, when the biometric level is 3++ while the machine level is 3+, when the biometric level is 3+ while the machine level is 3++, when the biometric level is 3++ while the machine level is 3, when both the biometric and machine levels indicate 3+, and when the biometric level is 3 while the machine level is 3++.

The CPU 11 receives from the computer 2 the information related to biometric authentication including the encrypted result of fingerprint authentication and the information indicating that the fingerprint information is stored in the security chip 5, the information related to identification information including a machine ID and the information indicating that the machine ID is stored in the security chip 5 and the information related to software together with a machine's electronic certification (or user's electronic certification) with a valid expiration date and a valid electronic signature provided by a private key which is paired with the electronic certification. As such, the CPU 11 determines the highest level when all the information are transmitted at the same time without being altered, and when it judges that the software level is 3+, the biometric level is 3++ and the machine level is 3++. For the computer 2 determined to have the highest level, the CPU 11 may judge that the security is more enhanced and thus allow the computer 2 to execute more processes.

As with the memory contents in the policy table 154, an operator may input an appropriate value from the input unit 13. Though an example where the policy table 154 is used has been described in the present embodiment, it is not limited thereto. Judgment may also be made by a point system. For example, the CPU 11 gives 1 to 5 points in order depending on the biometric level, gives 1 to 5 points depending on the machine level, and 1 to 4 points in order depending on the software level. The CPU 11 may store a reference point of 10 corresponding to the reference level as a threshold value in the storage unit 15, while judging the computer 2 as positive when the total point based on each level of the computer 2 is equal to or more than 10. Furthermore, the CPU 11 may set a condition in that at least the biometric level is equal to or more than 3, the machine level is equal to or more than 3 and the software level is equal to or more than 2.

In the hardware described above, the procedure of various software processes according to the present embodiment will be described using a flowchart. In the description below, the procedure performed when each of the computers 2A, 2B and 2C executes a money transfer process in online banking will be described to facilitate explanation. First, description is made for the computer 2A.

FIGS. 15A to 15 C illustrate a flowchart indicating the procedure of a level determining process in the computer 2A. The user boots up the browser 252A of the computer 2A to input URL (Uniform Resource Locator) for accessing Web server 1 from the input unit 23A. The Web server 1 transmits an ID/password input screen for logging in online banking to the computer 2A. On the browser 252A (display unit 24A) of the computer 2A, the ID and password input screen is displayed. The user inputs an ID and a password from the input unit 23A.

The CPU 21A of the computer 2A receives the ID and password input from the input unit 23A and transmits them to the Web server 1 (step S151). The CPU 11 of the Web server 1 receives the ID and password via the communication unit 16 (step S152). The CPU 11 refers to the user DB 155 to judge whether or not the received ID and password match with the ID and password stored in the user DB 155 (step S153). If the CPU 11 judges that there is no matching (NO at step S153), the access is regarded as unauthorized and the process is terminated. If, on the other hand, the CPU 11 judges that they match with each other (YES at step S153), it transmits a starting screen for biometric authentication from the HTML file 151 so as to permit login (step S154).

The CPU 21A of the computer 2A receives the starting screen for biometric authentication, and displays the starting screen for biometric authentication on the browser 252A (step S155). The CPU 21A boots up the control program 25P to perform the following processes. The CPU 21A boots up the face recognition program 255A at reception of the screen, serving as a trigger (step S156), and captures face information of the user from a camera (step S157). The CPU 21A reads out the pre-stored face information from the face information file 253A (step S158). The CPU 21A judges whether or not the read-out face information matches with the captured face information (step S159). If the CPU 21A judges that there is no matching (NO at step S159), the access is regarded as unauthorized and the process is terminated.

If, on the other hand, the CPU 21A judges that the face information match with each other (YES at step S159), it generates information related to biometric authentication including the result of face authentication and the information indicating that the face information is stored in a hard disk, and transmits it to the Web server 1 (step S161). Note that the transmitted result of face authentication includes information indicating that the type of biometric authentication executed at the computer 2A is face authentication and the result of face authentication is positive. Subsequently, the CPU 21A reads out a machine ID from the machine ID file 254A (step S162). The CPU 21A generates information related to identification information including the machine ID and the information indicating that the machine ID is stored in a hard disk, and transmits it to the Web server 1 (step S163).

Subsequently, the CPU 21A reads out versions of OS 251A and browser 252A from the software information file 257A (step S164). Note that the software information acquiring program 256A is executed on a regular basis, storing the acquired versions of OS 251A and browser 252A in the software information file 257A. The CPU 21A transmits the information related to software including the acquired versions of OS 251A and browser 252A to the Web server 1 (step S165).

The CPU 11 of the Web server 1 receives the information related to biometric authentication transmitted at step S161, the information related to identification information transmitted at step S163 and the information related to software transmitted at step S165 (step S167). The CPU 21A refers to the result of face authentication in the received information related to biometric authentication, to judge whether or not the result of face authentication is positive (step S168). If the CPU 11 judges that the result of face authentication is not positive (NO at step S168), the process is regarded as unauthorized and is terminated. If, on the other hand, the CPU 11 judges that the result of face authentication is positive (YES at step S168), it refers to the policy table 154 and the information indicating that face information is stored in a hard disk among the information related to biometric authentication, to determine a biometric level (step S169). In the present example, the biometric level is 1.

The CPU 11 reads out a machine ID corresponding to the ID received at step S152 from the user DB 155. The CPU 11 judges whether or not the machine ID received at step S167 matches with the machine ID read out from the user DB 155 (step S1610). If the CPU 11 judges that there is no matching (NO at step S1610), the access is regarded as unauthorized and the process is terminated. If, on the other hand, the CPU 11 judges that they match with each other (YES at step S1610), it refers to the policy table 154 and the information indicating that the machine ID is stored in a hard disk among the information related to identification information, to determine a machine level (step S171). In the present example, the machine level is 1.

The CPU 11 transmits the versions of OS 251A and browser 252A among the information related to software to the DB server 4 via the communication unit 16 (step S172). The CPU 41 of the DB server 4 transmits the information related to versions, i.e. whether each of the transmitted versions of OS 251A and browser 252A is the latest, one version older, two versions older, or the like, to the Web server 1. The CPU 11 receives the information related to the transmitted versions of OS 251A and browser 252A from the DB server 4 (step S173).

The CPU 11 refers to the software evaluation table 153 and the information related to the versions of OS 251A and browser 252A, to determine a software level (step S174). The CPU 11 reads out positive or negative from the policy table 154 based on the software level determined at step S174, the biometric level determined at step S169 and machine level determined at step S171 (step S175). The CPU 11 judges whether or not a positive mark is stored in the policy table 154 (step S176). If the CPU 11 judges that no positive mark is stored (NO at step S176), it determines that the computer 2A does not satisfy the reference level, and terminates the subsequent processes. In the present example, it is determined as negative regardless of the software level.

If, on the other hand, a positive mark is stored (YES at step S176), the CPU 11 judges that the level of the computer 2A is equal to or more than the reference level, and reads out a screen for money transfer process from the HTML file 151 (step S177). The CPU 11 transmits the screen for money transfer process to the computer 2A (step S178). The CPU 21A of the computer 2A receives the screen for money transfer process and displays it on the browser 252A (step S179).

Figure 16A:
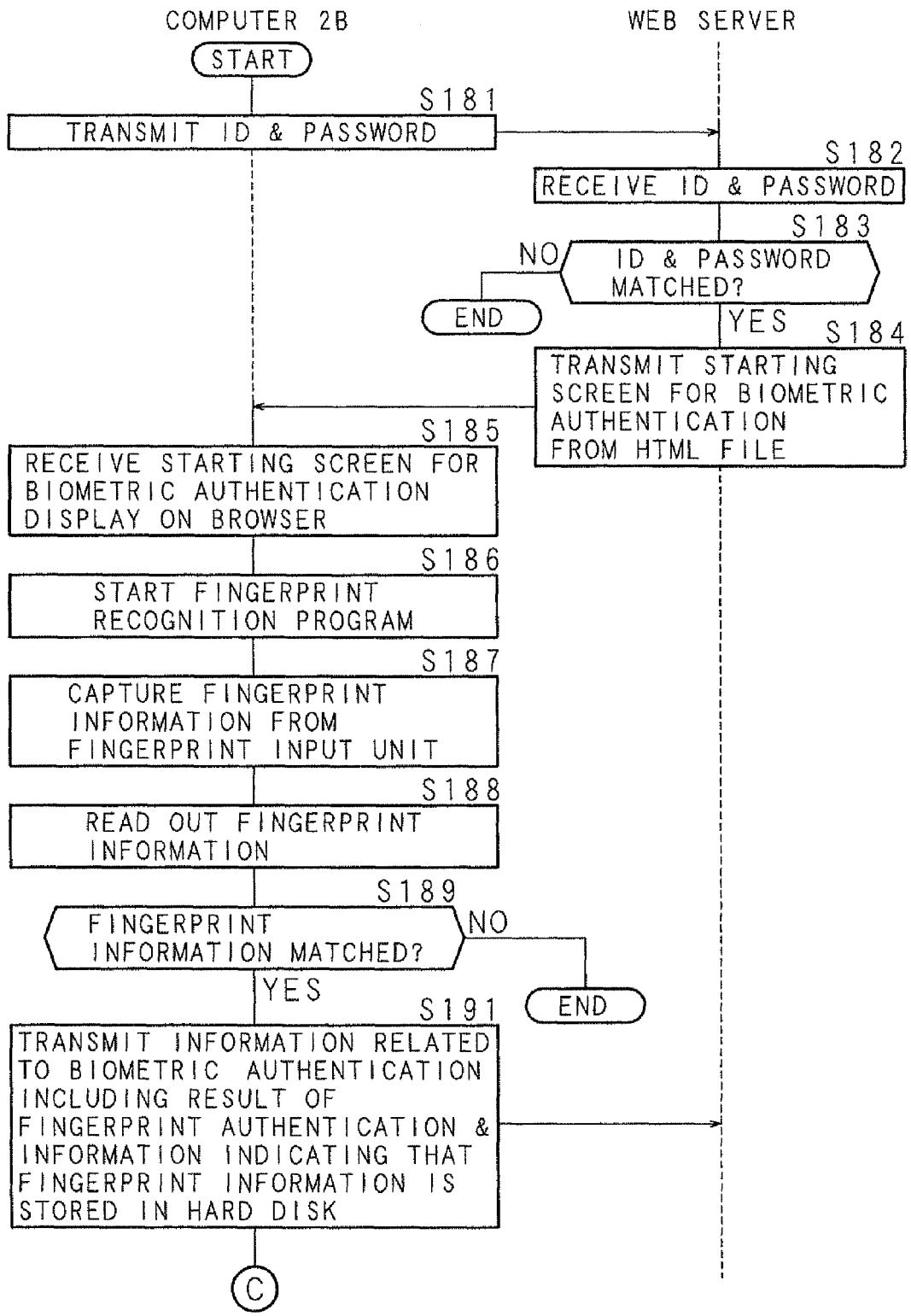
FIG. 16A is a flowchart illustrating a procedure of a level determining process in a computer.
Figure 16C:
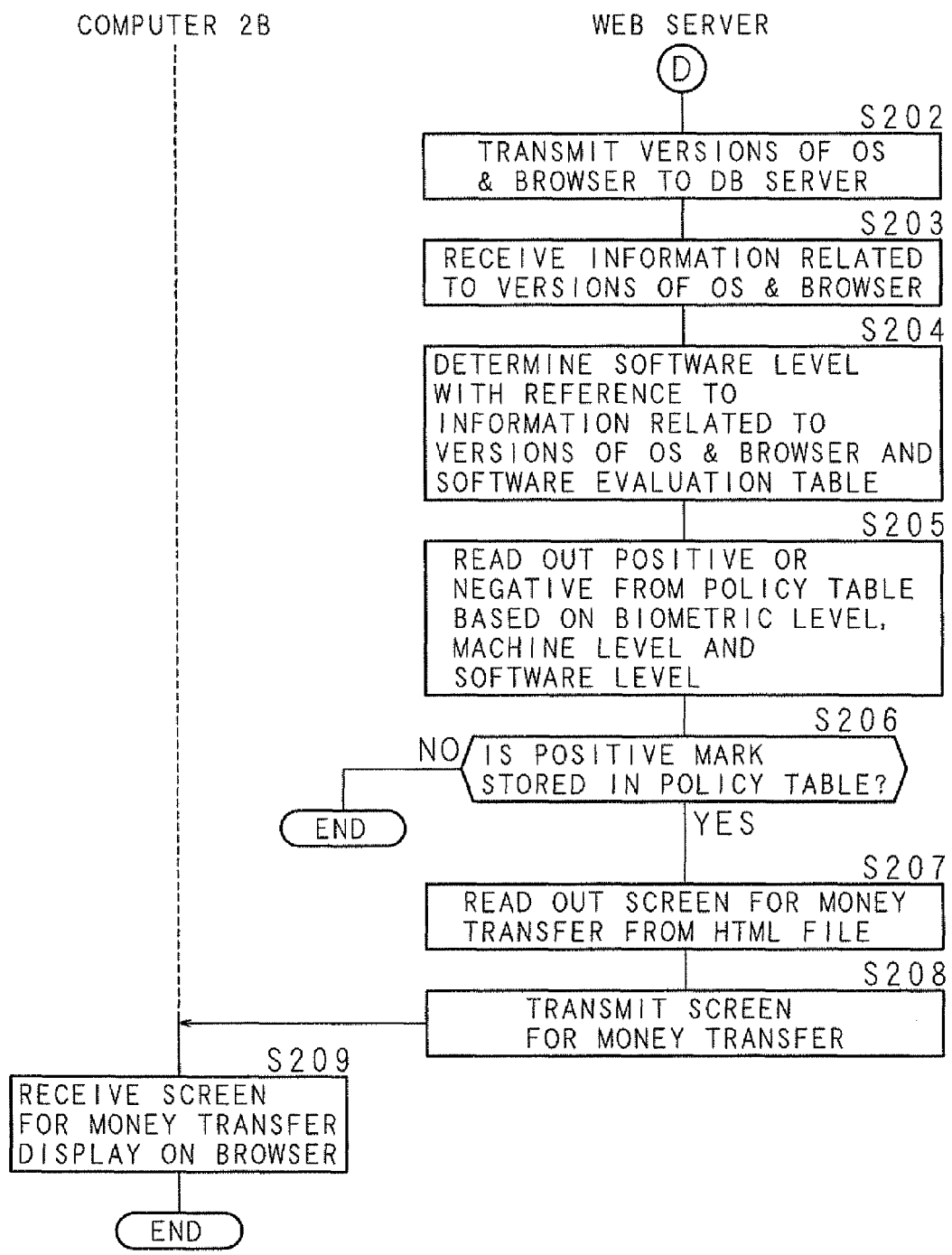
FIG. 16C is a flowchart illustrating a procedure of a level determining process in a computer.
Figure 17A:
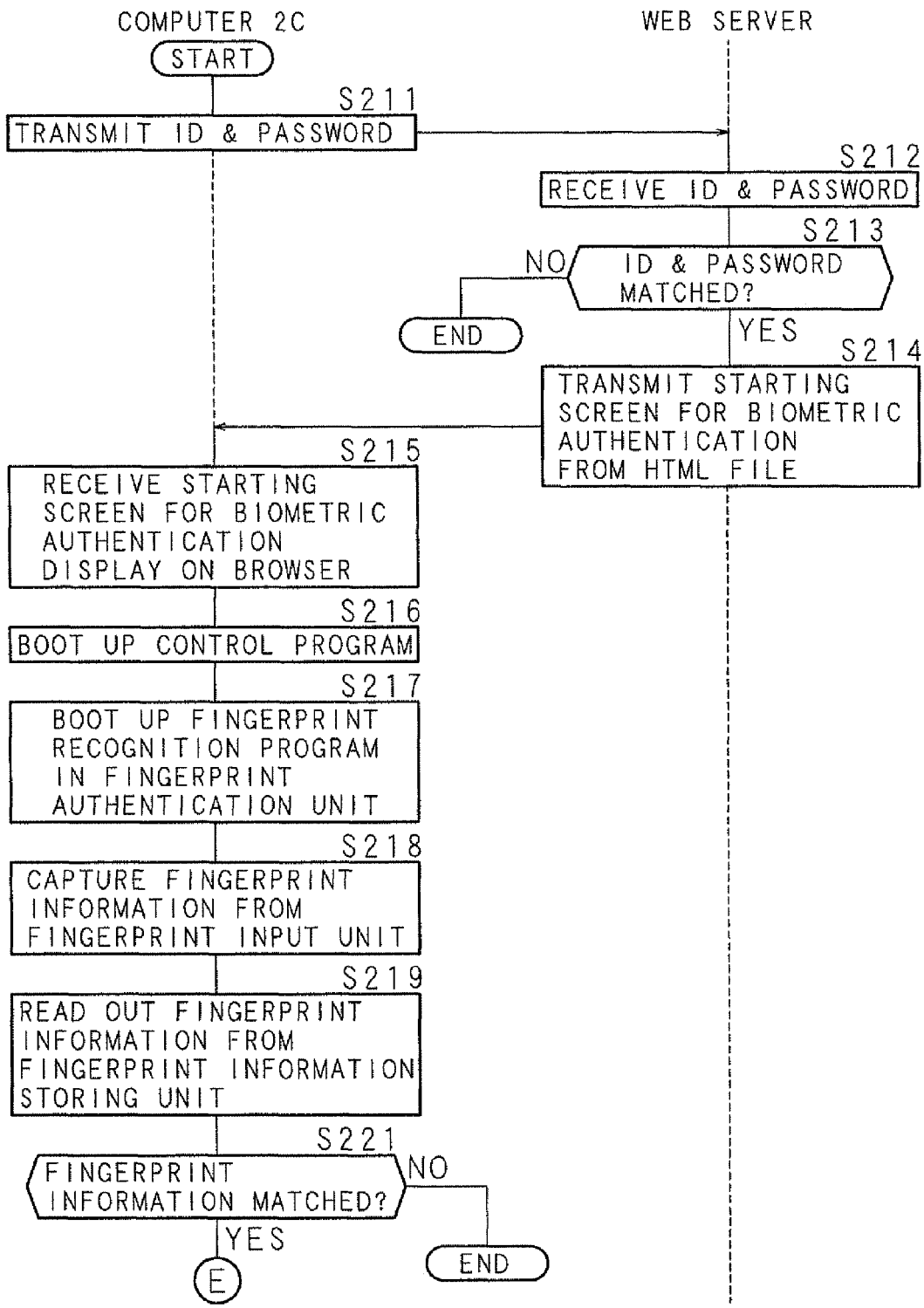
FIG. 17A is a flowchart illustrating a procedure of a level determining process in a computer.
Figure 17D:
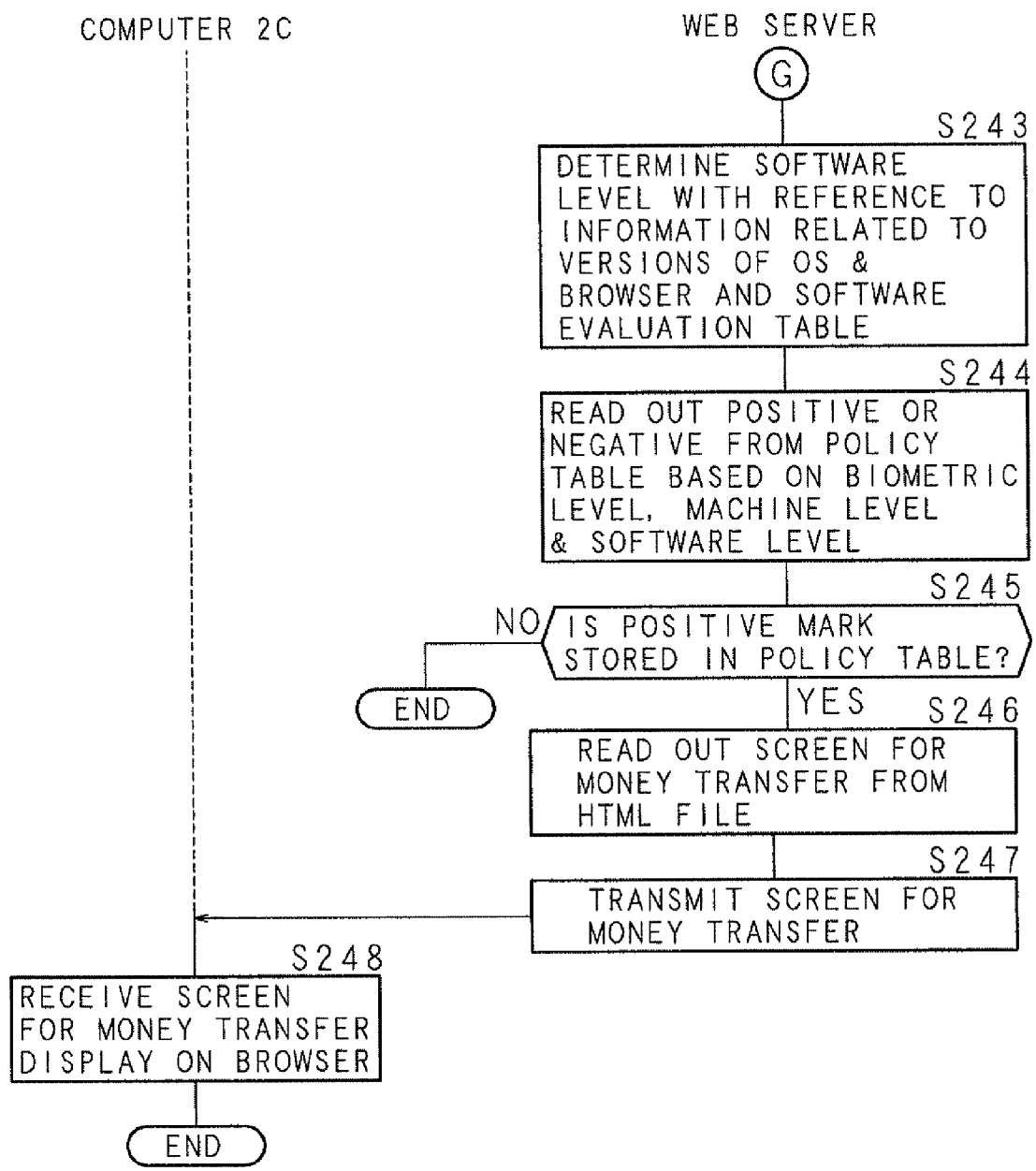
FIG. 17D is a flowchart illustrating a procedure of a level determining process in a computer.
Figure 18A:
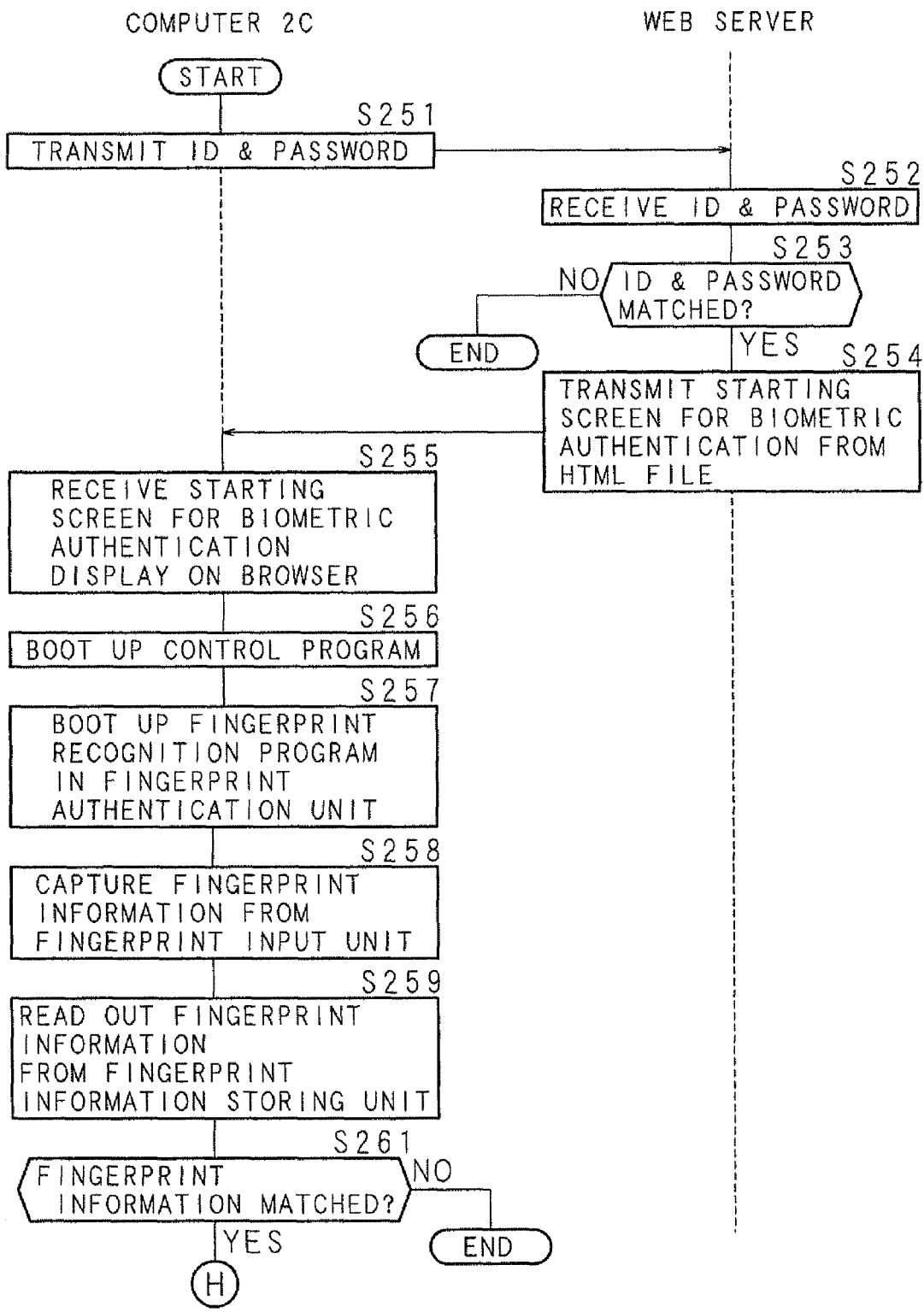
FIG. 18A is a flowchart illustrating another procedure of a level determining process in a computer.
Figure 18E:
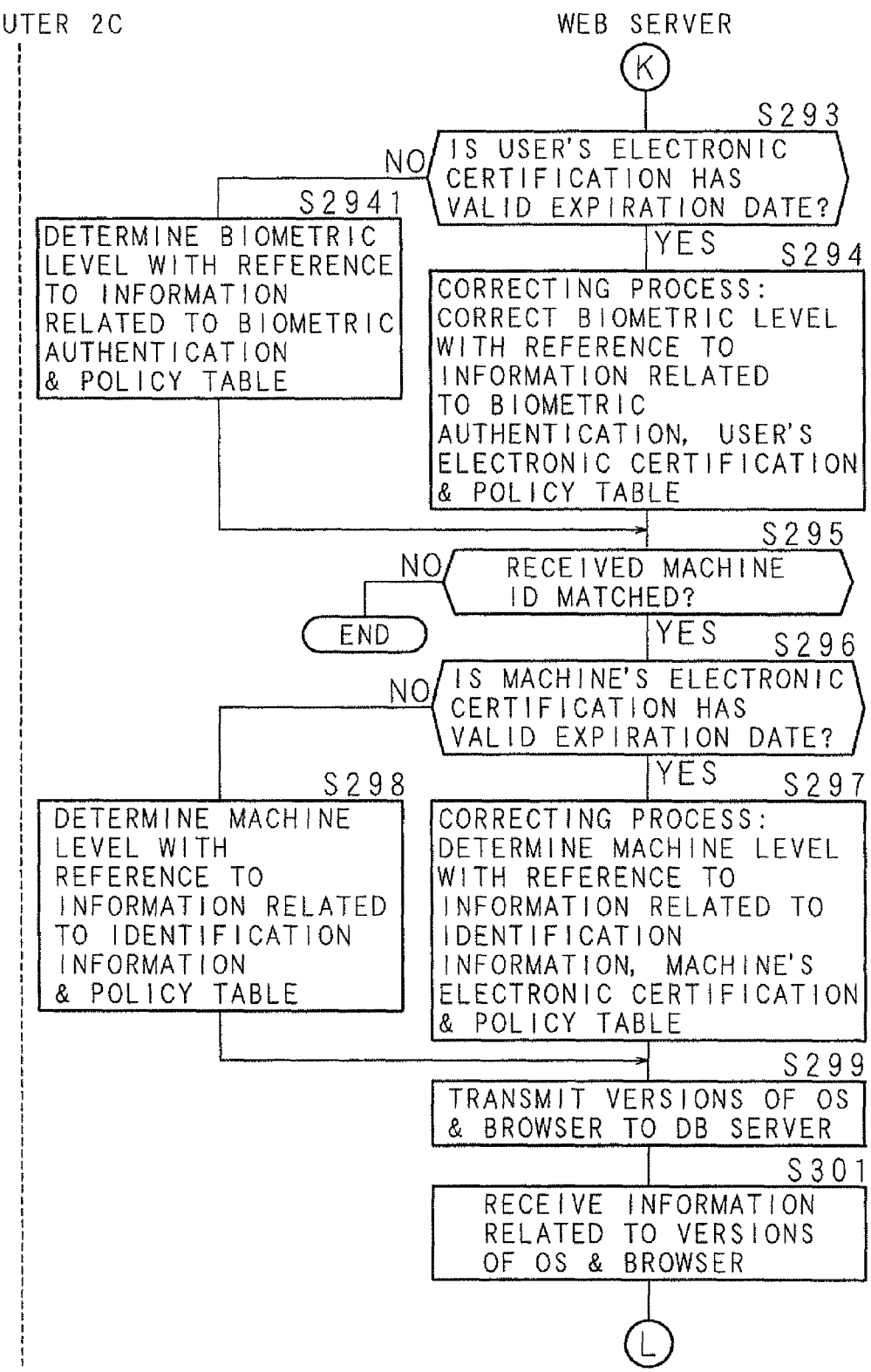
FIG. 18E is a flowchart illustrating another procedure of a level determining process in a computer.
Figure 18F:
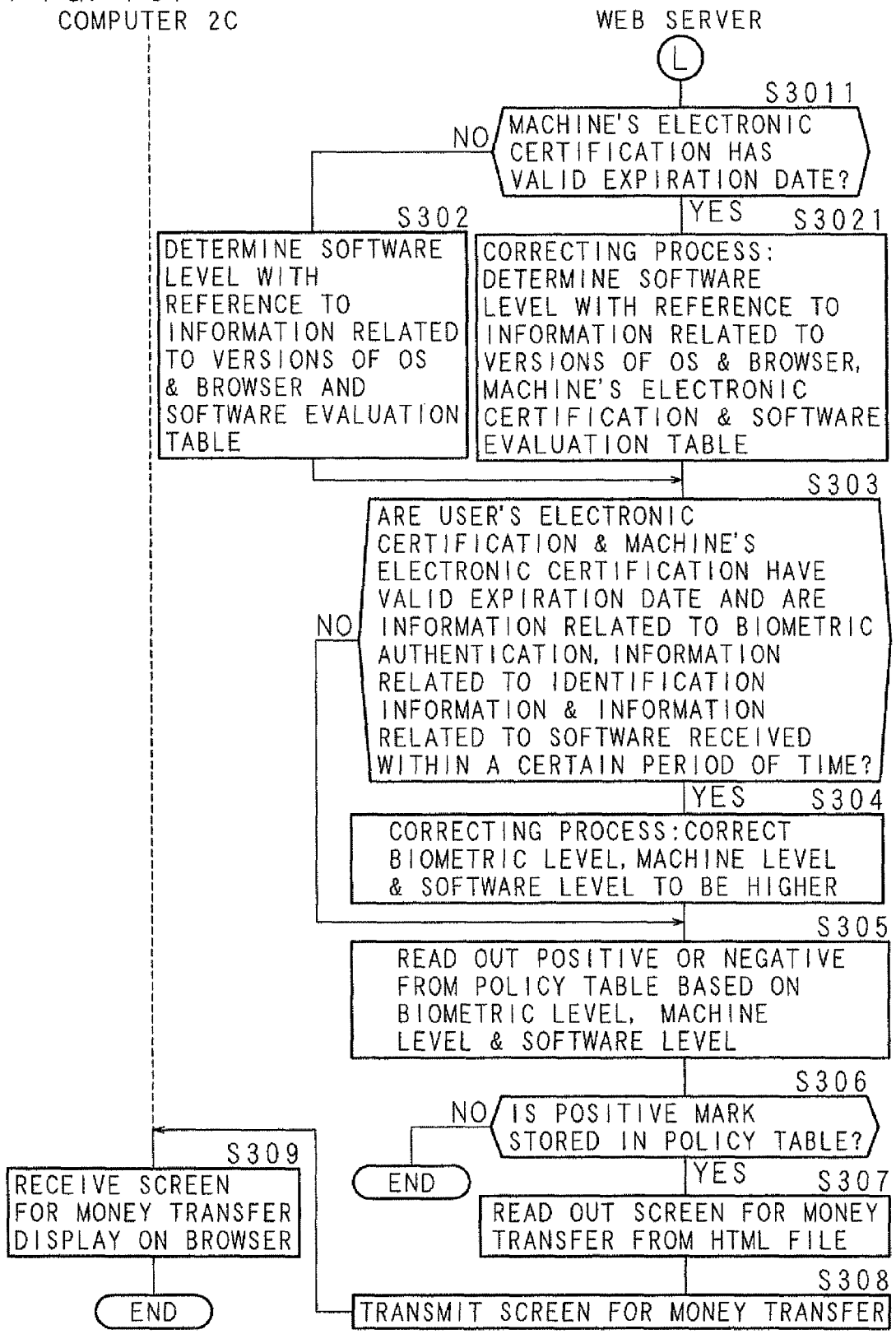
FIG. 18F is a flowchart illustrating another procedure of a level determining process in a computer.
Figure 19A:
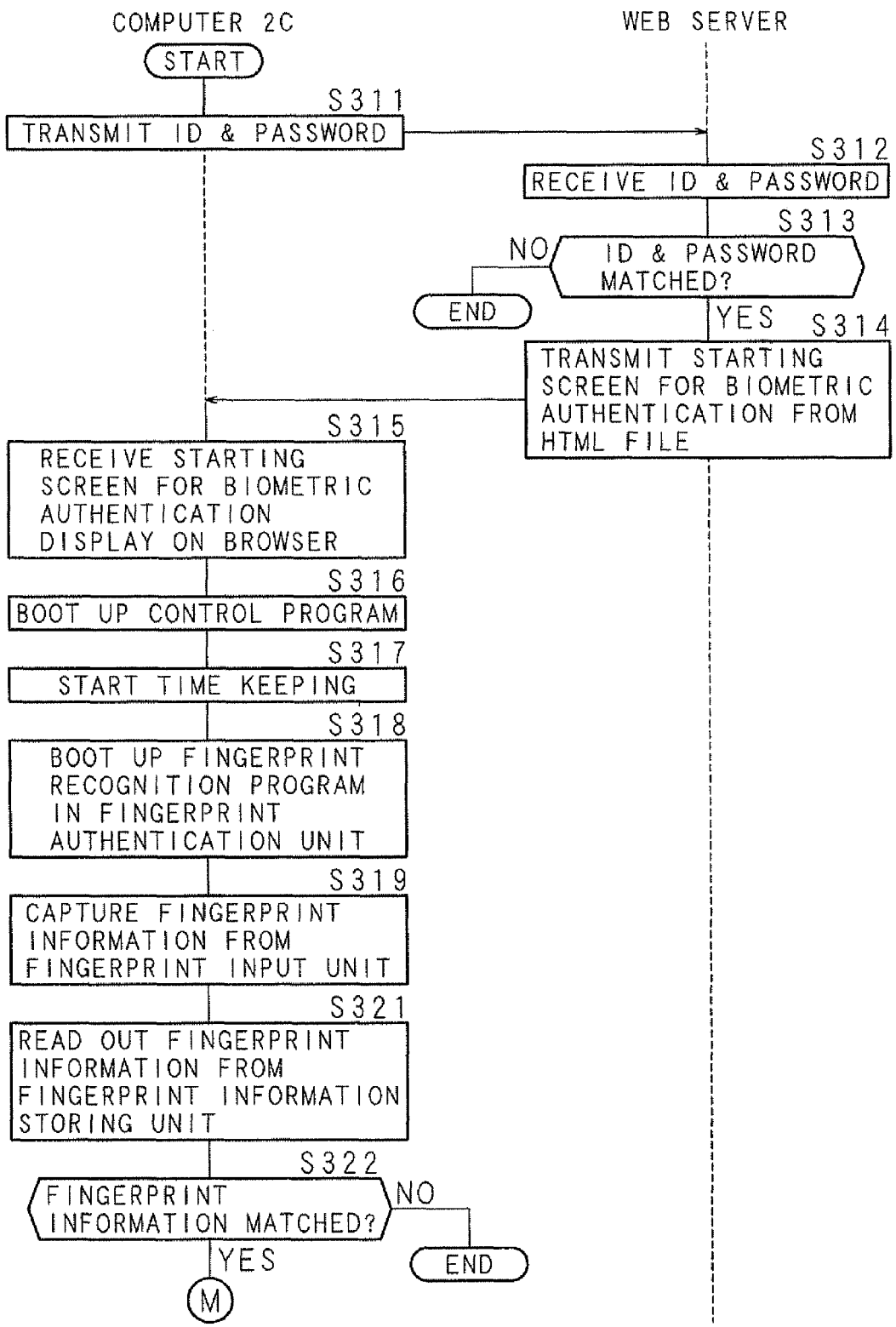
FIG. 19A is a flowchart illustrating a procedure of an integrated PKI authentication process.
Figure 19B:
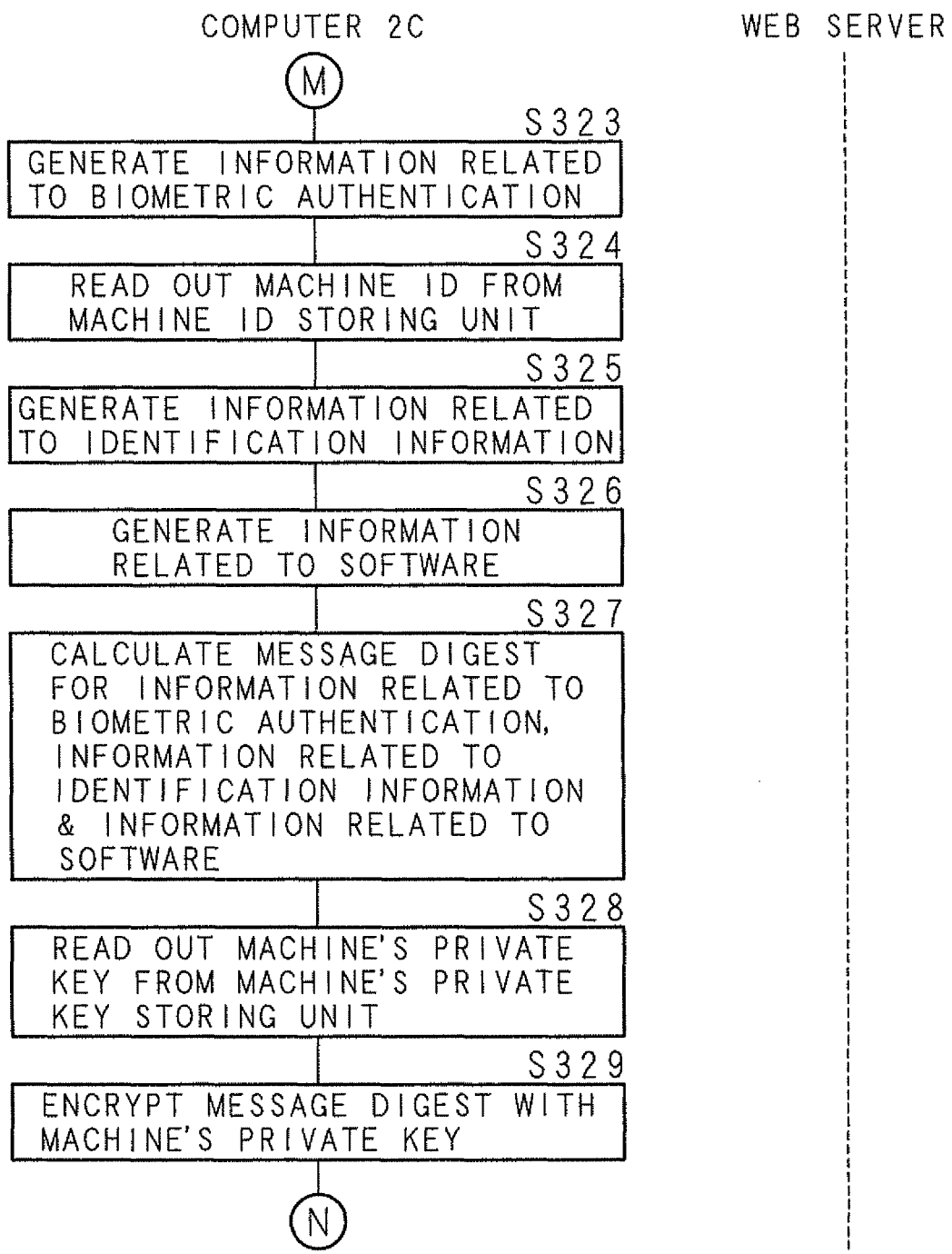
FIG. 19B is a flowchart illustrating a procedure of an integrated PKI authentication process.
Figure 19D:
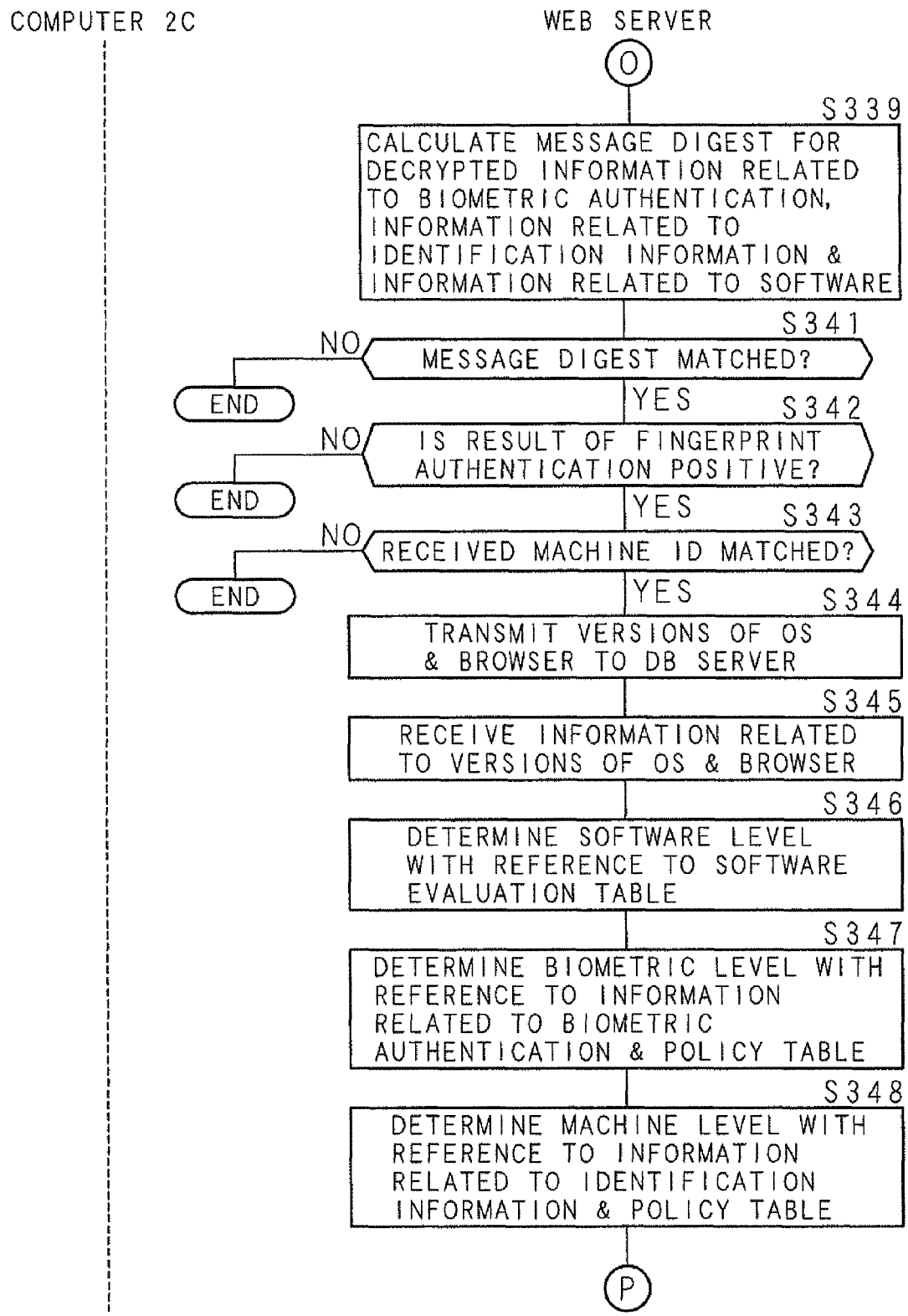
FIG. 19D is a flowchart illustrating a procedure of an integrated PKI authentication process.
Figure 19E:
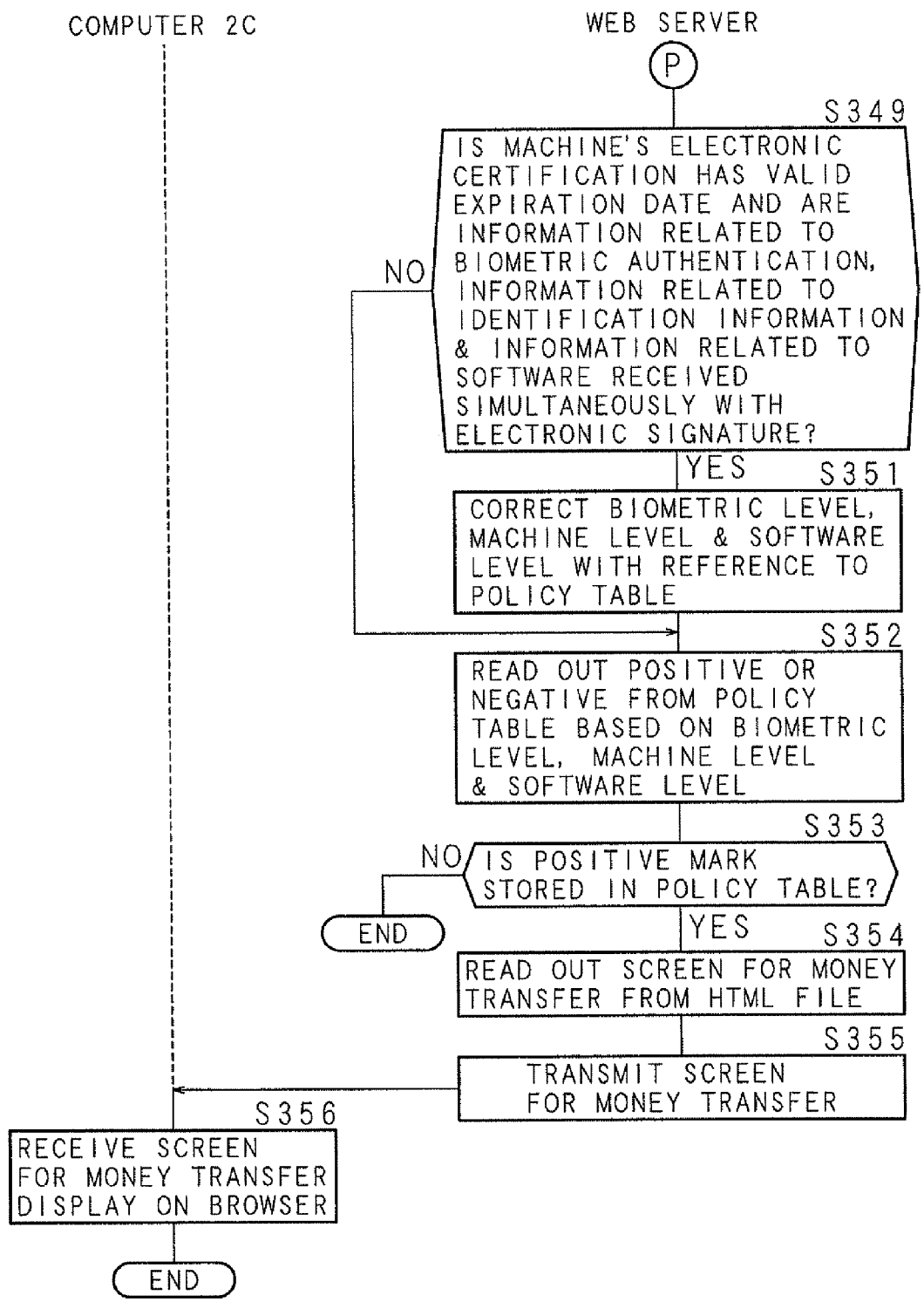
FIG. 19E is a flowchart illustrating a procedure of an integrated PKI authentication process.

FIGS. 16A to 16C illustrate a flowchart indicating a procedure of a level determining process in the computer 2B. The CPU 21B of the computer 2B receives the ID and password input from the input unit 23B and transmits them to the Web server 1 (step S181). The CPU 11 of the Web server 1 receives the ID and password via the communication unit 16 (step S182). The CPU 11 refers to the user DB 155 to judge whether or not the received ID and password match with the ID and password stored in the user DB 155 (step S183). If the CPU 11 judges that there is no matching (NO at step S183), the access is regarded as unauthorized and the process is terminated. If, on the other hand, the CPU judges that they match with each other (YES at step S183), it transmits a starting screen for biometric authentication from the HTML file 151 so as to permit login (step S184).

The CPU 21B of the computer 2B receives the starting screen for biometric authentication and displays the starting screen for biometric authentication on the browser 252B (step S185). The CPU 21B boots up the control program 25PB to execute the following processes. The CPU 21B boots up the fingerprint recognition program 255B at reception of the screen serving as a trigger (step S186), and captures fingerprint information of the user from the fingerprint input unit 29B (step S187). The CPU 21B reads out the pre-stored fingerprint information from the fingerprint information file 253B (step S188). The CPU 21B judges whether or not the read-out fingerprint information matches with the captured fingerprint information (step S189). If the CPU 21B judges that there is no matching (NO at step S189), the access is regarded as unauthorized and the process is terminated.

If, on the other hand, the CPU 21B judges that the fingerprint information match with each other (YES at step S189), it generates information related to biometric authentication including the result of fingerprint authentication and the information indicating that the fingerprint information is stored in a hard disk, and transmits the information to the Web server 1 (step S191). Note that the result of fingerprint authentication to be transmitted includes information indicating that the type of biometric authentication executed at the computer 2B is fingerprint authentication and that the computer 2B is determined as positive as a result of fingerprint authentication. Subsequently, the CPU 21B reads out a machine ID from the machine ID file 223B on BIOS (step S192). The CPU 21B generates information related to identification information including the machine ID and the information indicating that the machine ID is stored in BIOS, and transmits the information to the Web server 1 (step S193).

Subsequently, the CPU 21B reads out the versions of OS 251B and browser 252B from the software information file 257B (step S194). Note that the software information acquiring program 256B is executed on a regular basis, storing the acquired versions of OS 251B and browser 252B in the software information file 257B. The CPU 21B transmits the information related to software including the acquired versions of OS 251B and browser 252B to the Web server 1 (step S195).

The CPU 11 of the Web server 1 receives the information related to biometric authentication transmitted at step S191, the information related to identification information transmitted at step S193 and the information related to software transmitted at step S195 (step S196). The CPU 11 refers to the result of fingerprint authentication in the received information related to biometric authentication to judge whether the result of fingerprint authentication is positive or negative (step S197). If the CPU 11 judges that the result of fingerprint authentication is not positive (NO at step S197), the process is regarded as unauthorized and is terminated. If, on the other hand, the CPU 11 judges that the result of fingerprint authentication is positive (YES at step S197), it refers to the policy table 154 and the information indicating that the fingerprint information is stored in a hard disk among the information related to biometric authentication, to determine a biometric level (step S198). In the present example, the biometric level is determined as 2.

The CPU 11 reads out a machine ID corresponding to the ID received at step S182 from the user DB 155. The CPU 11 judges whether or not the machine ID received at step S196 matches with the machine ID read out from the user DB 155 (step S199). If the CPU 11 judges that there is no matching (NO at step S199), the access is regarded as unauthorized and the process is terminated. If, on the other hand, the CPU 11 judges that they match with each other (YES at step S199), it refers to the policy table 154 and the information indicating that the machine ID is stored in BIOS among the information related to identification information, to determine a machine level (step S201). In the present example, the machine level is determines as 2.

The CPU 11 transmits the versions of OS 251B and browser 252B in the information related to software to the DB server 4 via the communication unit 16 (step S202). The CPU 41 of the DB server 4 refers to the software DB 451 to transmit information related to versions indicating whether each of the transmitted versions of OS 251B and browser 252B is the latest, one version older, two versions older or the like to the Web server 1. The CPU 11 receives the information related to the versions of OS 251B and browser 252B transmitted from the DB server 4 (step S203).

The CPU 11 refers to the information related to the versions of OS 251B and browser 252B and the software evaluation table 153, to determine a software level (step S204). The CPU 11 reads out positive or negative from the policy table 154 based on the software level determined at step S204, the biometric level determined at step S198 and the machine level determined at step S201 (step S205). The CPU 11 judges whether or not a positive mark is stored in the policy table 154 (step S206). If the CPU 11 judges that no positive mark is stored (NO at step S206), the computer 2B is regarded as not satisfying the reference level, and the subsequent processes are terminated.

If, on the other hand, a positive mark is stored (YES at step S206), the CPU 11 determines that the level of the computer 2B is equal to or more than the reference level, and reads out a screen for money transfer process from the HTML file 151 (step S207). The CPU 11 transmits the screen for money transfer process to the computer 2B (step S208). The CPU 21B of the computer 2B receives the screen for money transfer process and displays it on the browser 252B (step S209).

FIGS. 17A to 17D illustrate a flowchart indicating a procedure of a level determining process in the computer 2C. In the flowchart, an example where no encrypting process is performed is illustrated. The CPU 21C of the computer 2C receives the ID and password input from the input unit 23C and transmits them to the Web server 1 (step S211). The CPU 11 of the Web server 1 receives the ID and password via the communication unit 16 (step S212). The CPU 11 refers to the user DB 155 to judge whether or not the received ID and password match with the ID and password stored in the user DB 155 (step S213). If the CPU 11 judges that there is no matching (NO at step S213), the access is regarded as unauthorized and the process is terminated. If, on the other hand, the CPU 11 judges that they match with each other (YES at step S213), it transmits a starting screen for biometric authentication from the HTML file 151 so as to permit login (step S214).

The CPU 21C of the computer 2C receives the starting screen for biometric authentication and displays the starting screen for biometric authentication on the browser 252C (step S215). The main control unit 51 boots up the control program stored in the control program storing unit 513 at reception of a display command for the starting screen for biometric authentication from the CPU 21C, which serves as a trigger (step S216), to execute the following processes. The main control unit 51 boots up the fingerprint recognition program in the fingerprint authentication unit 53 (step S217), and captures fingerprint information of the user from the fingerprint input unit 52 (step S218). The main control unit 51 reads out the pre-stored fingerprint information from the fingerprint information storing unit 54 (step S219). The main control unit 51 judges whether or not the read-out fingerprint information matches with the captured fingerprint information (step S221). If the main control unit 51 judges that there is no matching (NO at step S221), the access is regarded as unauthorized and the process is terminated.

If the main control unit 51 judges that they match with each other (YES at step S221), it reads out a user's electronic certification from the user's electronic certification storing unit 55 (step S222). The main control unit 51 transmits the information related to biometric authentication including the result of fingerprint authentication and the information indicating that the fingerprint information is stored in the security chip 5 to the Web server 1 together with a user's electronic certification and an electronic signature provided by a private key which is paired with the user's electronic certification and is stored in the user's private key storing unit 56 (step S223). Here, the main control unit 51 attaches an electronic signature to (encrypts) the information related to biometric authentication by the user's private key stored in the user's private key storing unit 56. Though transmission/reception of information from the security chip 5 to the Web server 1 is performed through the input/output unit 514 and the communication unit 26C in accordance with the instructions of the CPU 21C as described above, such description will not be repeated below to facilitate explanation. The CPU 11 of the Web server 1 receives the information related to biometric authentication, electronic signature and user's electronic certification (step S224). Subsequently, the main control unit 51 reads out a machine ID from the machine ID storing unit 59 (step S225). The main control unit 51 reads out a machine's electronic certification from the machine's electronic certification storing unit 57 (step S226). The main control unit 51 transmits the information related to identification information including the machine ID and the information indicating that the machine ID is stored in the security chip 5 to the Web server 1 together with the read-out machine's electronic certification and the electronic signature attached using a machine's private key which is paired with the machine's electronic certification retrieved from the machine's private key storing unit 58 by the main control unit 51 (step S227). Here, the main control unit 51 attaches an electronic signature to the information related to identification information by the machine's private key stored in the machine's private key storing unit 58.

The Web server 1 receives the information related to identification information, electronic signature and machine's electronic certification (step S228). The software information acquiring unit 511 executes the software information acquiring program stored therein on a regular basis, to acquire the version of OS 251C and the version of browser 252C in the storage unit 25C. The software information acquiring unit 511 stores the acquired versions of OS 251C and browser 252C in the software information storing unit 512. The main control unit 51 reads out the versions of OS 251C and browser 252C from the software information storing unit 512 (step S229).

The main control unit 51 transmits the read-out information related to software to the Web server 1 (step S231). The CPU 11 of the Web server 1 receives the information related to software (step S232). The CPU 11 refers to the result of fingerprint authentication in the information related to biometric authentication received at step S224, to judge whether the result of fingerprint authentication is positive or negative (step S233). If the CPU 11 judges that the result of fingerprint authentication is not positive (NO at step S233), the access is regarded as unauthorized and the process is terminated. If, on the other hand, the CPU 11 judges that the result of fingerprint authentication is positive (YES at step S233), it refers to date-and-time information output from the clock unit 18 to judge whether or not the user's electronic certification received at step S224 has a valid expiration date (step S234).

If the CPU 11 judges that it is expired (NO at step S234), it treats the user's electronic certification as not existing, and refers to the policy table 154 and the information indicating that the fingerprint information is stored in the security chip 5 among the information related to biometric authentication, to determine a biometric level (step S236). In the present example, the level is determined as 3. If, on the other hand, the CPU 11 judges that it is valid (YES at step S234), it refers to the information indicating that the fingerprint information is stored in the security chip 5 among the information related to biometric authentication, the electronic signature, the user's electronic certification and the policy table 154, to determine a biometric level so as to correct the level to be higher than the generally-determined level (step S235). The CPU 11 decrypts the electronic signature by a public key in the user's electronic certification so as to judge whether the electronic signature is valid, and determines as valid when the decrypted information matches with the information related to biometric authentication. If the CPU 11 judges that the electronic signature is valid, the level is corrected to be higher. If the CPU 11 judges that there is no matching and thus the electronic signature is not valid, the level remains uncorrected. In the present example, there is a valid electronic signature in addition to the conditions for level 3, so that the level is determined as 3+.

The CPU 11 reads out a machine ID corresponding to the ID received at step S212 from the user DB 155. The CPU 11 judges whether or not the machine ID received at step S228 matches with the machine ID read out from the user DB 155 (step S237). If the CPU 11 judges that there is no matching (NO at step S237), the access is regarded as unauthorized and the process is terminated. If, on the other hand, the CPU 11 judges that they match with each other (YES at step S237), it judges whether or not the machine's electronic certification received at step S228 has a valid expiration date (step S238).

If the CPU 11 judges that it is expired (NO at step S238), the machine's electronic certification is treated as non-existing, while the CPU 11 refers to the information indicating that the machine ID is stored in the security chip 5 among the information related to identification information, the electronic signature and the policy table 154 to determine a machine level (step S240). In the present example, the level is determined as 3. If, on the other hand, the CPU 11 judges that the certification has a valid expiration date (YES at step S238), it refers to the information indicating that the machine ID is stored in the security chip 5 among the information related to identification information, the electronic signature, the machine's electronic certification and the policy table 154 to determine a machine level so as to correct the level to be higher than the generally-determined level (step S239). The CPU 11 decrypts the electronic signature by a public key in the machine's electronic certification in order to judge whether or not the electronic signature is valid, and judges as valid when the decrypted information matches with the information related to identification information. If the CPU 11 judges that the electronic signature is valid, it corrects the level to be higher. If the CPU 11 judges that there is no matching and thus is not valid, the level remains uncorrected. In the present example, there is a valid electronic signature in addition to the conditions for level 3, so that the level is determined as 3+.

The CPU 11 transmits the versions of OS 251C and browser 252C among the information related to software to the DB server 4 via the communication unit 16 (step S241). The CPU 41 of the DB server 4 refers to the software DB 451 to transmit the information related to versions, i.e. whether each of the transmitted versions of OS 251 and browser 252C is the latest, one version older, two versions older or the like, to the Web server 1. The CPU 11 receives the information related to the versions of OS 251C and browser 252C transmitted from the DB server 4 (step S242).

The CPU 11 refers to the information related to the versions of OS 251C and browser 252C and the software evaluation table 153 to determine a software level (step S243). The CPU 11 reads out positive or negative from the policy table 154 based on the software level determined at step S243, the biometric level determined at step S253 or S236 and the machine level determined at step S239 or S240 (step S244). The CPU 11 judges whether a positive mark is stored in the policy table 154 (step S245). If the CPU 11 judges that no positive mark is stored (NO at step S245), the computer 2C is regarded as not satisfying the reference level and the subsequent process is terminated.

If, on the other hand, a positive mark is stored (YES at step S245), the CPU 11 judges that the level of the computer 2C is equal to or more than the reference level, and reads out a screen for money transfer process from the HTML file 151 (step S246). The CPU 11 transmits the screen for money transfer process to the computer 2C (step S247). The CPU 21C of the computer 2C receives the screen for money transfer process and displays it on the browser 252C (step S248).

FIGS. 18A to 18F illustrate a flowchart indicating another procedure of a level determining process in the computer 2C. This flowchart indicates the case where each piece of information is encrypted to be transmitted. The CPU 21C of the computer 2C receives the ID and password input from the input unit 23C, and transmits them to the Web server 1 (step S251). The CPU 11 of the Web server 1 receives the ID and password via the communication unit 16 (step S252). The CPU 11 refers to the user DB 155 to judge whether or not the received ID and password match with the ID and password stored in the user DB 155 (step S253). If the CPU 11 judges that there is no matching (NO at step S253), the access is regarded as unauthorized and the process is terminated. If, on the other hand, the CPU 11 judges that they match with each other (YES at step S253), it transmits a starting screen for biometric authentication from the HTML file 151 so as to permit login (step S254).

The CPU 21C of the computer 2C receives the starting screen for biometric authentication and displays the starting screen for biometric authentication on the browser 252C (step S255). The main control unit 51 boots up the control program stored in the control program storing unit 513 at reception of a display command for the starting screen for biometric authentication from the CPU 21C, which serves as a trigger (step S256), to execute the following processes. The main control unit 51 boots up the fingerprint recognition program in the fingerprint authentication unit 53 (step S257), to capture fingerprint information of the user from the fingerprint input unit 52 (step S258). The main control unit 51 reads out the pre-stored fingerprint information from the fingerprint information storing unit 54 (step S259). The main control unit 51 judges whether or not the read-out fingerprint information matches with the captured fingerprint information (step S261). If the main control unit 51 judges that there is no matching (NO at step S261), the access is regarded as unauthorized and the process is terminated.

If the main control unit 51 judges that they match with each other (YES at step S261), it reads out a user's electronic certification from the user's electronic certification storing unit 55 (step S262). The main control unit 51 generates information related to biometric authentication including the result of fingerprint authentication and the information indicating that the fingerprint information is stored in the security chip 5 (step S263). The main control unit 51 calculates a message digest of the information related to biometric authentication based on the hash function stored in the encryption processing unit 510, and also reads out an encryption key for an encrypting process from the encryption key storing unit 518 (step S264). The main control unit 51 reads out a user's private key from the user's private key storing unit 56 (step S265).

The main control unit 51 encrypts the information related to biometric authentication using an encryption key, and attaches an electronic signature to the message digest using the user's private key stored in the user's private key storing unit 56 (step S266). The main control unit 51 transmits the encrypted information related to biometric authentication, the electronic signature on the message digest and the user's electronic certification to the Web server 1 (step S267). The CPU 11 of the Web server 1 receives the encrypted information related to biometric authentication, the electronic signature on the message digest and the user's electronic certification (step S268). The CPU 11 of the Web server 1 stores the date-and-time information at which these pieces of information are received in the storage unit 15 with reference to the output from the clock unit 18. Though an example where the date-and-time information from the clock unit 18 in the Web server 1 is stored will be described below, it may also be possible to obtain authentication from a time stamp server (not illustrated) connected via the communication network N while acquiring the stamped time. The main control unit 51 reads out a machine ID from the machine ID storing unit 59 (step S269). The main control unit 51 reads out a machine's electronic certification from the machine's electronic certification storing unit 57 (step S271). The main control unit 51 generates information related to identification information including the machine ID and the information indicating that the machine ID is stored in the security chip 5 (step S272).

The main control unit 51 calculates a message digest for the information related to identification information based on the hash function stored in the encryption processing unit 510 (step S273). The main control unit 51 reads out a machine's private key from the machine's private key storing unit 58 (step S274). The main control unit 51 encrypts the information related to identification information using an encryption key, and attaches an electronic signature to the message digest using the machine's private key (step S275). The main control unit 51 transmits the encrypted information related to identification information, the electronic signature on the message digest and the machine's electronic certification to the Web server 1 (step S276).

The CPU 11 of the Web server 1 receives the encrypted information related to identification information, the electronic signature on the message digest and the machine's electronic certification (step S277). The CPU 11 of the Web server 1 stores the date-and-time information at which these pieces of information are received in the storage unit 15 with reference to the output from the clock unit 18. The main control unit 51 reads out the version of OS 251C and the version of browser 252C from the software information storing unit 512, and generates information related to software including such information (step S278). The main control unit 51 calculates a message digest for the information related to software based on the hash function stored in the encryption processing unit 510 (step S279). The main control unit 51 encrypts the information related to software using an encryption key and attaches an electronic signature to the message digest using the machine's private key read out at step S274 (step S281).

The main control unit 51 then transmits the encrypted information related to software, the electronic signature on the message digest and the machine's electronic certification to the Web server 1 (step S282). Note that a user's private key may also be used in place of the machine's private key at step S281. Also at step S282, the pair of user's electronic certification keys may be used in place of the pair of machine's electronic certification keys. The CPU 11 of the Web server 1 receives the encrypted information related to software, the electronic signature on the message digest and the machine's electronic certification (step S283). The CPU 11 of the Web server 1 stores the date-and-time information at which these pieces of information are received in the storage unit 15 with reference to the output from the clock unit 18.

The CPU 11 of the Web server 1 makes a request to the CA server 3 concerning the user's electronic certification and machine's electronic certification for acquiring the public key of the CA server 3. The CPU 11 receives the public key of the CA server 3 transmitted from the CA server 3 (step S284). The CPU 11 boots up the decryption program 152. The CPU 11 verifies the signature on the user's electronic certification received at step S268 and that on the machine's electronic certification received at steps S277 and S283 using the public key of the CA server 3. If the result of verification is correct, the CPU 11 recognizes that the user's public key and machine's public key included therein are the correct user's public key and machine's public key, and reads out an encryption key from the encryption key storing unit 158 (step S285).

The CPU 11 verifies the signature on the message digest for the information related to biometric authentication received at the step S268 (step S286). Specifically, since the information related to biometric authentication has been encrypted by the encryption key pre-arranged in a secure situation, the CPU 11 decrypts the information related to biometric authentication with the read-out encryption key. The CPU 11 calculates a message digest for the received information related to biometric authentication which has been decrypted, based on the hash function stored in the storage unit 15 (step S287). Moreover, the CPU 11 decrypts the message digest to which an electronic signature is attached using the user's public key in the user's electronic certification. The CPU 11 verifies the signature by checking whether or not the decrypted message digest matches with the calculated message digest. If they match with each other, it determines that the electronic signature has not been altered and thus is valid. If they do not match with each other, the CPU 11 determines that it has been altered and thus is not valid. Likewise, the CPU 11 verifies the signature on the message digest for the information related to identification information and verifies the signature on the message digest for the information related to software using a machine's public key (step S288). The CPU 11 calculates a message digest for each of the information related to identification information and the information related to software (step S289). The procedure of verifying a signature concerning the identification information is as follows. Since the information related to identification information is encrypted by an encryption key pre-arranged in a secure situation, the CPU 11 decrypts the information related to identification information by the read-out encryption key. The CPU 11 calculates a message digest for the received information related to identification information which has been decrypted, based on the hash function stored in the storage unit. Furthermore, the CPU 11 decrypts the message digest to which an electronic signature is attached using the machine's public key in the received machine's electronic certification. The CPU 11 verifies signature by checking whether or not the decrypted message digest matches with the calculated message digest. Verification of a signature on the information related to software is performed as well by the procedure described below. Since the information related to software has been encrypted by the encryption key pre-arranged in a secure situation, the CPU 11 decrypts the information related to software by the read-out encryption key. The CPU 11 calculates a message digest for the received information related to software which has been decrypted, based on the hash function stored in the storage unit 15. Furthermore, the CPU 11 decrypts the message digest to which an electronic signature is attached, using the machine's public key in the machine's electronic certification. The CPU 11 verifies signature by checking whether or not the decrypted message digest matches with the calculated message digest. The CPU 11 judges whether the message digest concerning the information related to biometric authentication calculated at step S287 matches with the message digest verified for its signature at step S286, whether the message digest concerning the information related to identification information calculated at step S289 matches with the message digest verified for its signature at step S288, and whether the message digest concerning the information related to software calculated at step S289 matches with the message digest verified for its signature at step S288 (step S291).

If the main control unit 51 judges that any of the message digests does not match with its corresponding message digest (NO at step S291), it determines that the electronic signature has been altered and thus not valid, and terminates the process. If, on the other hand, the main control unit 51 judges that all message digests match with their corresponding message digests (YES at step S291), the CPU 11 refers to the result of fingerprint authentication among the decrypted information related to biometric authentication received at step S268, and judges whether the result of fingerprint authentication is positive or negative (step S292). If the CPU 11 judges that the result of fingerprint authentication is not positive (NO at step S292), the access is regarded as unauthorized and the process is terminated. If, on the other hand, the CPU judges that the result of fingerprint authentication is positive (YES at step S292), it refers to the date-and-time information output from the clock unit 18 and judges whether or not the user's electronic certification received at step S268 has a valid expiration date (step S293).

If the CPU 11 judges that it is expired (NO at step S293), it treats the user's electronic certification as not existing, and refers to the policy table 154 and the information indicating that the fingerprint information is stored in the security chip 5 among the information related to biometric authentication, to determine a biometric level (step S2941). In the present example, the level is determined as 3. If, on the other hand, the CPU 11 judges that the expiration date is valid (YES at step S293), it refers to the information indicating that the fingerprint information is stored in the security chip 5 among the information related to biometric authentication, the user's electronic certification and the policy table 154 to determine a biometric level so as to correct the level higher than the generally-determined level (step S294). In the present example, there is a valid user's electronic certification and it is verified by a valid electronic signature that no alteration has been made, so that the level is determined as 3+.

The CPU 11 reads out a machine ID corresponding to the ID received at step S252 from the user DB 155. The CPU 11 judges whether or not the machine ID in the decrypted information related to identification information received at step S277 matches with the machine ID read out from the user DB 155 (step S295). If the CPU 11 judges that there is no matching (NO at step S295), the access is regarded as unauthorized and the process is terminated. If, on the other hand, the CPU 11 judges that they match with each other (YES at step S295), it judges whether or not the machine's electronic certification received at step S277 has a valid expiration date (step S296).

If the CPU 11 judges that it is expired (NO at step 296), it treats the machine's electronic certification as not existing, and refers to the policy table 154 and the information indicating that the machine ID is stored in the security chip 5 among the information related to identification information, to determine a machine level (step S298). In the present example, the level is determined as 3. If, on the other hand, the CPU 11 judges that the expiration date is valid (YES at step S296), it refers to the information indicating that the machine ID is stored in the security chip 5 among the information related to identification information, the machine's electronic certification and the policy table 154, to determine a machine level so as to correct the level to be higher than the generally-determined level (step S297). In the present example, there is a valid machine's electronic certification and it is verified by a valid electronic signature that no alteration has been made in addition to the conditions for the level 3, so that the level is determined as 3+.

The CPU 11 transmits the versions of OS 251C and browser 252C among the decrypted information related to software received at step S283 to the DB server 4 via the communication unit 16 (step S299). The CPU 41 of the DB server 4 refers to the software DB 451 to transmit information related to versions, indicating whether each of the transmitted versions of OS 251C and browser 252C is the latest, one version older, two versions older or the like, to the Web server 1. The CPU 11 receives the information related to versions of OS 251C and browser 252C transmitted from the DB server 4 (step S301).

The CPU 11 judges whether or not the machine's electronic certification has a valid expiration date (step S301). If the CPU 11 judges that the machine's electronic certification is expired (NO at step S301), the CPU 11 refers to the information related to versions of OS 251C and browser 252C and the software evaluation table 153, to determine a software level (step S302). For example, each version of the OS 251 and browser 252C is one version older, the software level is determined as 2 based on the software evaluation table 153 (see FIG. 12). If, on the other hand, the CPU 11 judges that the machine's electronic certification has a valid expiration date (YES at step S3011), it refers to the information regarding the versions of OS 251C and browser 252C, the machine's electronic certification and the software evaluation table 153, to correct the software level (step S3021). In the example described above, there is a valid machine's electronic certification and it is verified by a valid electronic signature that no alteration has been made, so that the software level is raised to level 3 (see FIG. 13).

The CPU 11 judges whether the user's electronic certification and machine's electronic certification are not expired and whether the information related to biometric authentication, information related to identification information and information related to software received at steps S268, S277 and S288 are received during a certain period of time, with reference to the received date and time stored in the storage unit 15 (step S303). Note that the certain period of time is stored as, for example, 10 seconds in the storage unit 15.

If the CPU 11 judges that the certifications are not expired and the information are received during a certain period of time (YES at step S303), the already-determined biometric level, machine level and software level are corrected to be higher (step S304). For example, each level may be raised by 1. In the example above, the biometric level is corrected to 3++, the machine level is corrected to 3++ and the software level is corrected to 3+ as illustrated in FIG. 14. If, on the other hand, the CPU 11 judges that the certifications are not expired and the information are not received during the certain period of time (NO at step S303), it skips the correcting process at step S304. The CPU 11 reads out positive or negative from the policy table 154 based on the finally-determined software level, biometric level and machine level (step S305). The CPU 11 judges whether or not a positive mark is stored in the policy table 154 (step S306). If the CPU 11 judges that no positive mark is stored (NO at step S306), it determines that the computer 2C does not satisfy the reference level and terminates the subsequent processes.

If, on the other hand, the CPU 11 judges that a positive mark is stored (YES at step S306), it determines that the level of the computer 2C is equal to or higher than the reference level and reads out a screen for money transfer process from the HTML file 151 (step S307). The CPU 11 transmits the screen for money transfer to the computer 2C (step S308). The CPU 21C of the computer 2C receives the screen for money transfer process and displays it on the browser 252C (step S309). Though the example in FIGS. 18A to 18F illustrated the case where the information related to biometric authentication is transmitted for PKI authentication with the user's electronic certification, and then the information related to identification information is transmitted for PKI authentication with the machine's electronic certification, and thereafter the information related to software is transmitted for PKI authentication with the machine's electronic certification, it is not limited thereto. For example, the information related to identification information may also be transmitted together with the information related to software for PKI authentication with the machine's electronic certification.

Finally, an example where each of the information related to biometric authentication, information related to identification information and information related to software is provided with an electronic signature by a private key paired with the machine's electronic certification or user's electronic certification to be transmitted and all of the information is encrypted will be described using a flowchart. An example using a machine's electronic certification will be described below.

FIGS. 19A to 19E illustrate a flowchart indicating the procedure of an integrated PKI authentication process. The CPU 21C of the computer 2C receives the ID and password input from the input unit 23C, and transmits them to the Web server 1 (step S311). The CPU 11 of the Web server 1 receives the ID and password via the communication unit 16 (step S312). The CPU 11 refers to the user DB 155 to judge whether or not the received ID and password match with the ID and password stored in the user DB 155 (step S313). If the CPU 11 judges that there is no matching (NO at step S313), the access is regarded as unauthorized and the process is terminated. If, on the other hand, the CPU 11 judges that they match with each other (YES at step S313), it transmits a starting screen for biometric authentication from the HTML file 151 so as to permit login (step S314).

The CPU 21C of the computer 2C receives the starting screen for biometric authentication and displays the starting screen for biometric authentication on the browser 252C (step S315). The main control unit 51 boots up a control program stored in the control program storing unit 513 at reception of a display command for the starting screen for biometric authentication from the CPU 21C, which serves as a trigger (step S316), to execute the following processes. The main control unit 51 refers to the output of the clock unit 28C to start time keeping (step S317). The main control unit 51 boots up a fingerprint authentication program in the fingerprint authentication unit 53 (step S318), and captures the fingerprint information of the user from the fingerprint input unit 52 (step S319). The main control unit 51 reads out the pre-stored fingerprint information from the fingerprint information storing unit 54 (step S321). The main control unit 51 judges whether or not the read-out fingerprint information matches with the captured fingerprint information (step S322). If the main control unit 51 judges that there is no matching (NO at step S322), the access is regarded as unauthorized and the process is terminated.

If the main control unit 51 judges that they match with each other (YES at step S322), it generates information related to biometric authentication including the result of fingerprint authentication and the information indicating that the fingerprint information is stored in the security chip 5 (step S323). The main control unit 51 reads out a machine ID from the machine ID storing unit 59 (step S324). The main control unit 51 generates information related to identification information including the machine ID and the information indicating that the machine ID is stored in the security chip 5 (step S325). The main control unit 51 reads out the versions of OS 251C and browser 252C from the software information storing unit 512, and generates information related to software including these information (step S326).

The main control unit 51 calculates a message digest for each of the information related to biometric authentication generated at step S323, the information related to identification information generated at step S325 and the information related to software generated at step S326, based on the hash function stored in the encryption processing unit 510 (step S327). The main control unit 51 reads out an encryption key stored in the encryption key storing unit 518. The main control unit 51 encrypts the information related to biometric authentication, the information related to identification information and the information related to software by the read-out encryption key. The main control unit 51 reads out a machine's private key from the machine's private key storing unit 58 (step S328). The main control unit 51 attaches an electronic signature to (encrypts) the message digest calculated at step S327 using the machine's private key (step S329). The main control unit 51 terminates the time keeping started at step S317 (step S331).

The main control unit 51 judges whether or not the kept time is within the certain time period pre-stored in the storage unit 15 (step S332). The certain time period may be stored as, for example, five seconds. Accordingly, the time required for acquisition and encryption of three pieces of information related to biometric authentication, identification information and software as well as addition of an electronic signature to a message digest may be limited to be within the certain time period. This enables three processes of biometric authentication, acquisition of a machine ID and acquisition of environmental information to be executed approximately at the same time, and assures the linkage thereof also on the computer 2 side, preventing easy impersonation.

If the main control unit 51 judges that the kept time is not within the certain time period (NO at step S332), it terminates the process because simultaneity may not be assured. If, on the other hand, the main control unit 51 judges that the kept time is within the certain period of time (YES at step S332), it reads out a machine's electronic certification from the machine's electronic certification storing unit 57 (step S333). The main control unit 51 transmits the encrypted information related to biometric authentication, information related to identification information and information related to software, as well as an electronic signature on a message digest and the machine's electronic certification to the Web server 1 (step S334). This enables the message digest to which an electronic signature is added by a machine's private key which is paired with the machine's electronic certification as well as the encrypted information related to biometric authentication, information related to identification information and information related to software to be enveloped.

The CPU 11 of the Web server 1 receives the encrypted information related to biometric authentication, information related to identification information, information related to software, as well as the electronic signature on the message digest and the machine's electronic certification (step S335). The CPU 11 makes a request to the CA server 3 which issued the machine's electronic certification for acquiring a public key for the CA server 3 concerning the machine's electronic certification. The CPU 11 receives a corresponding public key for the CA server 3 in response to the acquisition request (step S336). The CPU 11 verifies the machine's electronic certification using the public key for the CA server 3, and if the result of verification is correct, it reads out a machine's public key in the machine's electronic certification (step S337).

The CPU 11 reads out an encryption key stored in the encryption key storing unit 158. The CPU 11 decrypts the information related to biometric authentication, information related to identification information and information related to software by the read-out encryption key, and verifies (decrypts) the electronic signature on the message digest using the machine's public key included in the received machine's electronic certification (step S338). The CPU 11 boots up a decryption program 152. The CPU 11 reads out the hash function pre-stored in the storage unit 15 and calculates a message digest for each of the decrypted information related to biometric authentication, information related to identification information and information related to software (step S339). The CPU 11 judges whether or not the calculated message digest matches with the message digest decrypted at step S338 (step S341). If the CPU 11 judges that there is no matching (NO at step S341), it determines that the electronic signature has been altered and thus not valid, and terminates the process.

If the CPU 11 judges that the message digests match with each other (YES at step S341), it determines that the electronic signature has not been altered and thus valid, and refers to the result of fingerprint authentication among the information related to biometric authentication to judge whether or not the result of fingerprint authentication is positive (step S342). If the CPU 11 judges that the result of fingerprint authentication is not positive (NO at step S342), it terminates the process. If, on the other hand, the CPU 11 judges that the result of fingerprint authentication is positive (YES at step S342), it reads out a machine ID corresponding to the ID received at step S312 from the user DB 155 with reference to the information on machine IDs among the received information related to identification information, and judges whether or not these IDs match with each other by comparing them (step S343).

If the CPU 11 judges that the received machine ID does not match with the machine ID stored in the user DB 155 (NO at step S343), it terminates the process. If, on the other hand, the CPU 11 judges that the received machine ID matches with the machine ID stored in the user DB 155 (YES at step S343), it extracts the versions of OS 251C and browser 252C among information related to software, and transmits the extracted information to the DB server 4 (step S344). The CPU 11 receives the information related to the versions of OS 251C and browser 252C from the DB server 4 (step S345).

The CPU 11 refers to the received information related to the versions of OS 251C and browser 252C and the software evaluation table 153, to determine a software level (step S346). Subsequently, the CPU 11 refers to the policy table 154 and the information indicating that the fingerprint information is stored in the security chip 5 among the information related to biometric authentication, to determine a biometric level (step S347). In the present example, the biometric level is determined as 3. The CPU 11 refers to the policy table 154 and the information indicating that the machine ID is stored in the security chip 5 among the information related to identification information, to determine a machine level (step S348). In the present example, the machine level is determined as 3. This determines all of the biometric, machine and software levels, which may be corrected when the conditions described below are satisfied.

The CPU 11 judges whether the decrypted machine's electronic certification has a valid expiration date and whether the information related to biometric authentication, information related to identification information and information related to software are received at the same time as the electronic signature added by the machine's private key which is paired with the machine's electronic certification as in step S335 (step S349). If the CPU 11 judges that the certification is not expired and the receptions were made at the same time (YES at step S349), it refers to the policy table 154 to correct the biometric level, machine level and software level. More specifically, the levels are corrected to be higher than the already-determined levels (step S351). For example, since the biometric level satisfies the conditions for both the electronic signature and encryption made by the machine's private key which is paired with the machine's electronic certification, it is raised by two phases to be level 3++. The machine level also satisfies the conditions for both the electronic signature and encryption made by the machine's private key which is paired with the machine's electronic certification, so that the level is raised by two phases to be 3++. As for the software level, when it is determined as level 3 at step S346 (see FIG. 13), it is raised by one phase to be level 3+ (see FIG. 14). It is noted that, at step S346, when each of the versions of both OS 251C and browser 252C is the latest and the level is 3+ (FIG. 14), the level is raised by one phase to be level 3++.

If the CPU 11 judges that the certification is expired and the receptions were not made at the same time at step S349 (NO at step S349), it skips the process at step S351. The CPU 11 reads out positive or negative from the policy table 154 based on the finally-determined biometric level, machine level and software level (step S352). The CPU 11 judges whether or not a positive mark is stored in the policy table 154 (step S353). If the CPU 11 determined that no positive mark is stored (NO at step S353), it determines that the computer 2C does not satisfy the reference level and terminates the subsequent process.

If, on the other hand, the CPU 11 judges that a positive mark is stored (YES at step S353), it determines that the computer 2C has a level equal to or more than the reference level and reads out a screen for money transfer process from the HTML file 151 (step S354). The CPU 11 transmits the screen for money transfer to the computer 2C (step S355). The CPU 21C of the computer 2C receives the screen for money transfer process and displays it on the browser 252C (step S356).

Embodiment 2

Embodiment 2 relates to an example where a policy level is changed in accordance with the importance of transaction in online banking. Different security levels are required depending on contents of transaction, i.e., balance inquiry, money transfer, overseas remittance or the like. In the present embodiment, a reference level used for judging whether or not a process may be continued is changed. For example, the required security level increases in the order of the balance inquiry, the money transfer and the overseas remittance.

Thus, the reference level is set to become higher in such an order. In the three-dimensional coordinate in FIG. 10, the volume of the reference level indicated by the hatched area increases as the importance of a process (required security level) becomes higher. In the description below, an example where the security policy table 154 illustrated in Embodiment 1 is provided in a plural number depending on the level of importance will be described.

Figure 20:
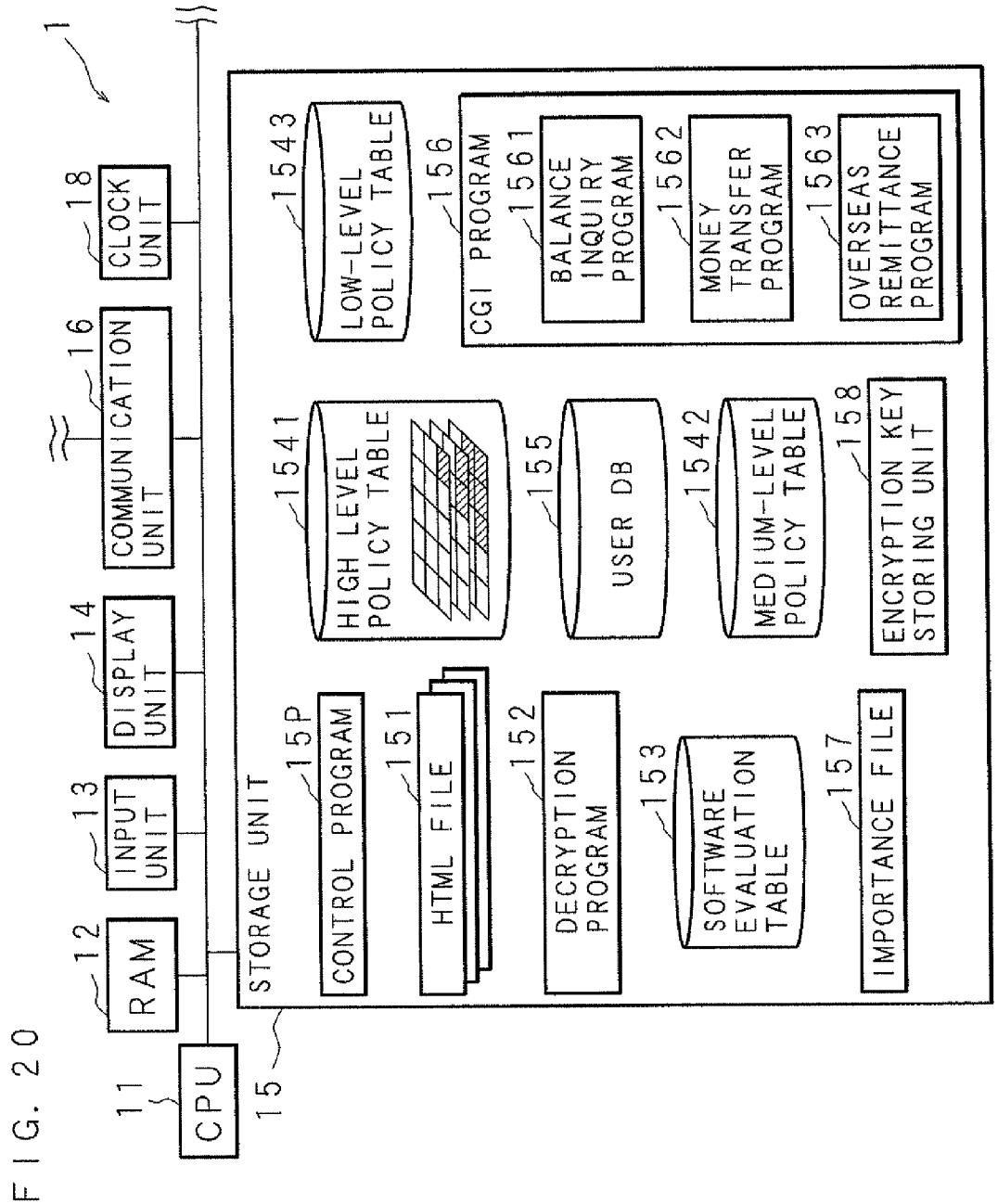
FIG. 20 is a block diagram illustrating hardware of a Web server according to Embodiment 2.

FIG. 20 is a block diagram illustrating hardware of a Web server 1 according to Embodiment 2. In addition to the Embodiment 1, an importance file 157, a high-level policy table 1541, a medium-level policy table 1542 and a low-level policy table 1543 (represented by policy table 154 in some cases) and a CGI (Common Gateway Interface) program 156 are newly stored in the storage unit 15. FIG. 21 is an explanatory view illustrating a record layout of the importance file 157. The importance file 157 stores the level of importance depending on processing contents in online banking, and includes a processing contents field, an importance field, a corresponding policy table field and the like.

In the processing contents field, various processes executed in online banking are stored. In the present embodiment, processes such as balance inquiry, money transfer and overseas remittance are stored for example. For instance, since balance inquiry does not require very high security, the importance is stored as low. Moreover, since money transfer requires a certain level of security, the importance is stored as medium. Furthermore, overseas remittance requires the highest security, the importance is stored as high. In the corresponding policy table field, a type of policy table 154 used in accordance with the processing contents and importance is stored. When the processing content is balance inquiry, the CPU 11 refers to the importance file 157 and accesses the low-level policy table 1543 corresponding to the importance of "low." If, on the other hand, the processing content is overseas remittance, it refers to the importance file 157 and accesses the high-level policy table 1541 corresponding to the importance of "high."

The high-level policy table 1541, medium-level policy table 1542 and low-level policy table 1543 store different information on positive or negative, i.e. information on whether or not the process is to be continued, for all possible combinations of the biometric level, machine level and software level. As the importance or the required security level increases, less positive marks are stored corresponding to the biometric level, machine level and software level. In the present embodiment, the same policy table 154 as the one used in Embodiment 1 is employed for the high-level policy table 1541.

FIGS. 22 to 25 are explanatory views illustrating memory contents of the medium-level policy table 1542. Also in the medium-level policy table 1542, information on positive or negative is stored for all possible combinations of the biometric level, machine level and software level. When compared with the high-level policy table 1541, the medium-level policy table 1542 stores more positive marks in place of negative marks even when each of the levels is low. For example, when FIG. 24 is compared with FIG. 13 for the software level 3, more positive marks are stored in place of negative marks in the case where the machine level is 3 and the biometric level is 3++, where the machine level is 3+ and the biometric level is 3+, and where the machine level is 3++ and the biometric level is 3+.

Though the low-level policy table 1543 is not illustrated in detail, the low-level policy table 1543 stores more positive marks in place of negative marks compared to the medium-level policy table 1542 even when each of the levels is low. As such, the CPU 11 flexibly utilizes the previously-provided policy tables 154 in accordance with the level of importance, achieving smooth processing. For the CGI program 156, three programs are provided including a balance inquiry program 1561, a money transfer program 1562 and an overseas remittance program 1563. When the CPU 11 confirms balance at a request from the computer 2, it executes the balance inquiry program 1561 after the judgment is made as positive based on the low-level policy table 1543.

The CPU 11 reads out a corresponding HTML file 151, writes the processing result and transmits the HTML file 151 concerning the processing result to the user. When the CPU 11 transfers money at a request from the computer 2, it executes the money transfer program 1562 after judgment is made as positive by the medium-level policy table 1542. The CPU 11 then reads out a corresponding HTML file 151, writes the processing result and transmits the HTML file 151 concerning the processing result to the user. Likewise, when the CPU 11 remits money overseas at a request from the computer 2, it executes the overseas remittance program 1563 after judgment is made as positive by the high-level policy table 1541. The CPU 11 then reads out a corresponding HTML file 151, writes the processing result and transmits the HTML file 151 concerning the processing result to the user.

Figure 26:
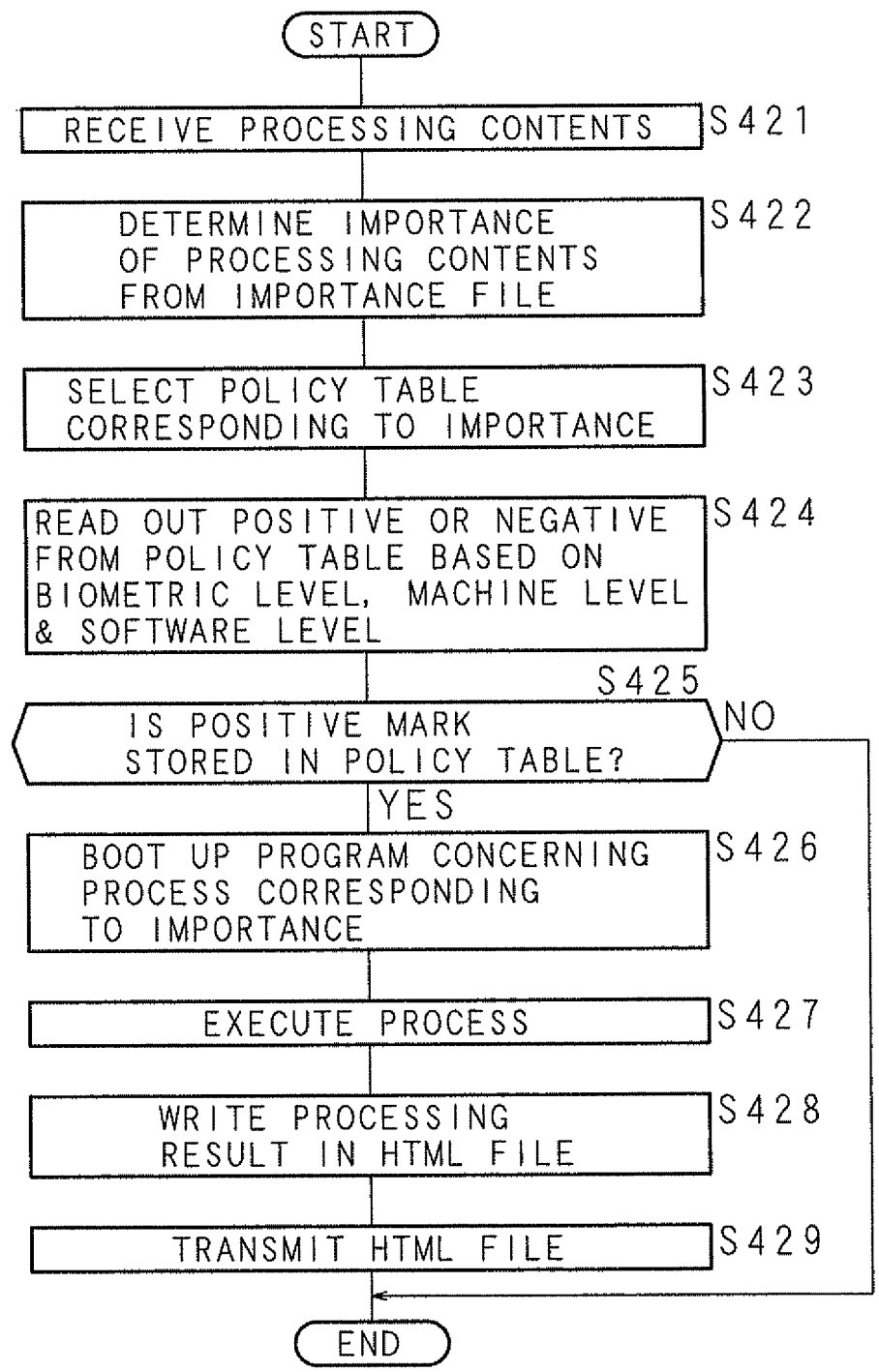
FIG. 26 is a flowchart illustrating a procedure of an importance determining process according to Embodiment 2.

In the hardware as described above, the procedure of executing various processes will be described using a flowchart. FIG. 26 is a flowchart illustrating a procedure of an importance determining process according to Embodiment 2. After login by the user of the computer 2, the CPU 11 of the Web server 1 receives a processing content transmitted from the computer 2 (step S421). This may be, in the example described above, any one of balance inquiry, money transfer and overseas remittance. The CPU 11 refers to the importance file 157 to determine the importance corresponding to the processing content (step S422). The CPU 11 selects any one policy table 154 corresponding to the processing content and importance among the high-level policy table 1541, medium-level policy table 1542 and low-level policy table 1543 (step S423). The CPU 11 executes the processes described in Embodiment 1, to read out information on positive or negative from the policy table 154 based on the biometric level, machine level and software level (step S424).

The CPU 11 judges whether or not a positive mark is stored in the policy table 154 selected at step S423 (step S425). If the CPU 11 judges that no positive mark is stored (NO at step S425), it determines that the computer 2 does not satisfy the reference level and a series of processes are terminated. If, on the other hand, the CPU 11 judges that a positive mark is stored (YES at step S425), it determines that the computer 2 satisfies the reference level, and boots up any one CGI program 156 corresponding to the importance among the balance inquiry program 1561, money transfer program 1562 and overseas remittance program 1563 (step S426).

The CPU 11 then executes a process based on the information such as various requests, amount or payee transmitted from the computer 2 (step S427). The CPU 11 writes the processing result in the HTML file 151 (step S428) and transmits the HTML file 151 after writing to the computer 2 (step S429). This enables verification of the computer 2 based on an optimal security policy in accordance with a security level required for transactions, achieving both safer and smoother processing.

Embodiment 2 is as described above, while the other parts and functions are similar to those in Embodiment 1. Thus, corresponding parts are denoted by the same reference numbers and the detailed description thereof will not be repeated.

Embodiment 3

Figure 27:
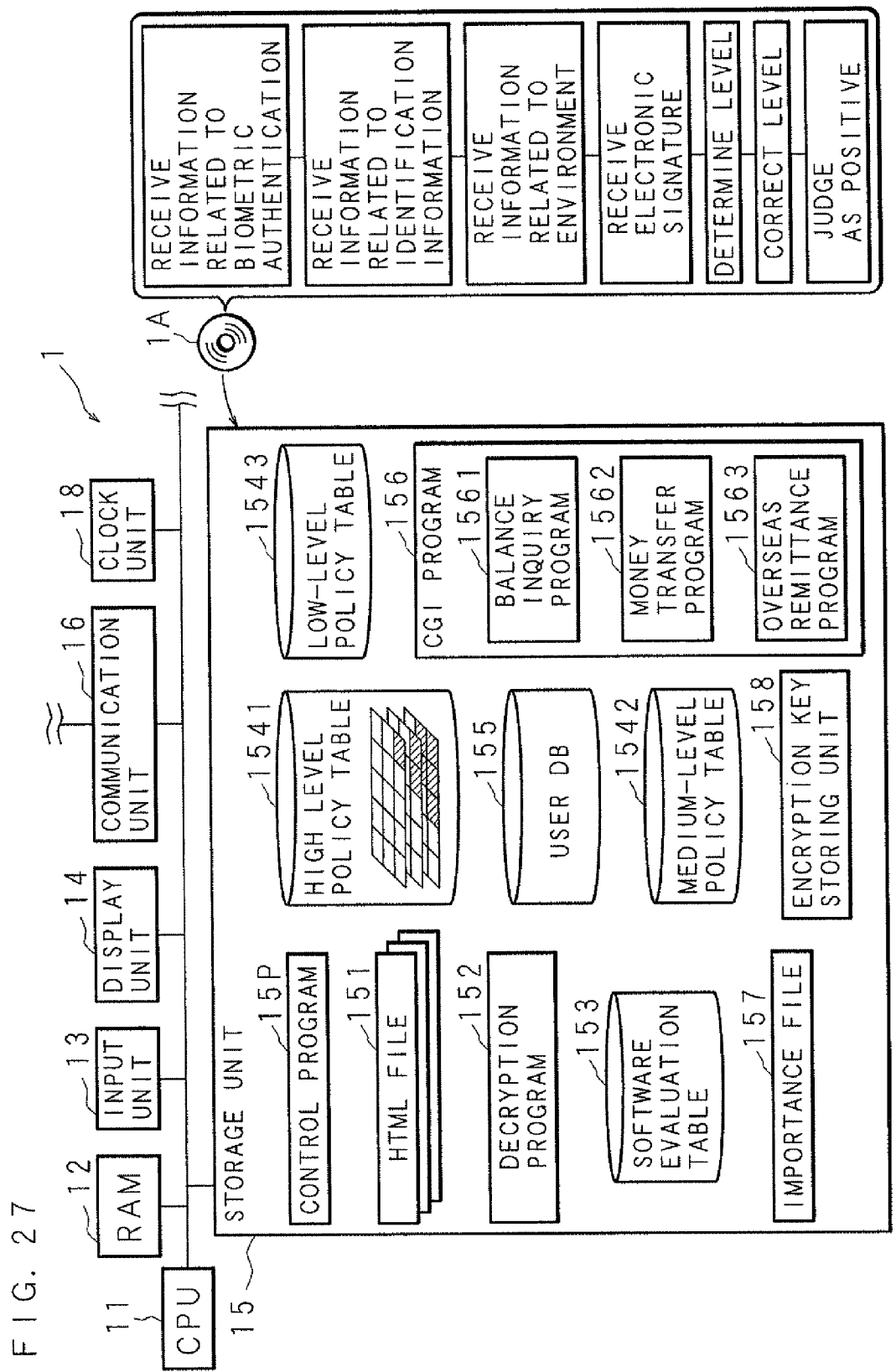
FIG. 27 is a block diagram illustrating a Web server according to Embodiment 3.

FIG. 27 is a block diagram illustrating the Web server 1 according to Embodiment 3. The program for making the Web server 1 operate according to Embodiment 3 may also be provided in the form of a portable recording medium 1A such as CD-ROM as in Embodiment 3. Moreover, the program may also be downloaded from another server computer (not illustrated) via the communication network N. Details thereof will be described below.

The portable recording medium 1A in which a program for making a recording medium reading device (not illustrated) of the Web server 1 illustrated in FIG. 27 receive information related to biometric authentication, receive information related to identification information, receive information related to environment, receive an electronic signature, determine a level, correct the level and judges as positive is recorded is inserted into the recording medium reading device so as to install the program in the control program 15P of the storage unit 15. Alternatively, the program may also be installed in the storage unit 15 by downloading it from another server computer (not illustrated) outside via the communication unit 16. The program is loaded to the RAM 12 to be executed. Hence, the Web server 1 functions as described above.

Embodiment 3 is as described above, while the other configurations and functions are similar to those in Embodiments 1 and 2. Thus, corresponding parts are denoted by the same reference numbers and will not be described in detail.

Embodiment 4

Figure 28:
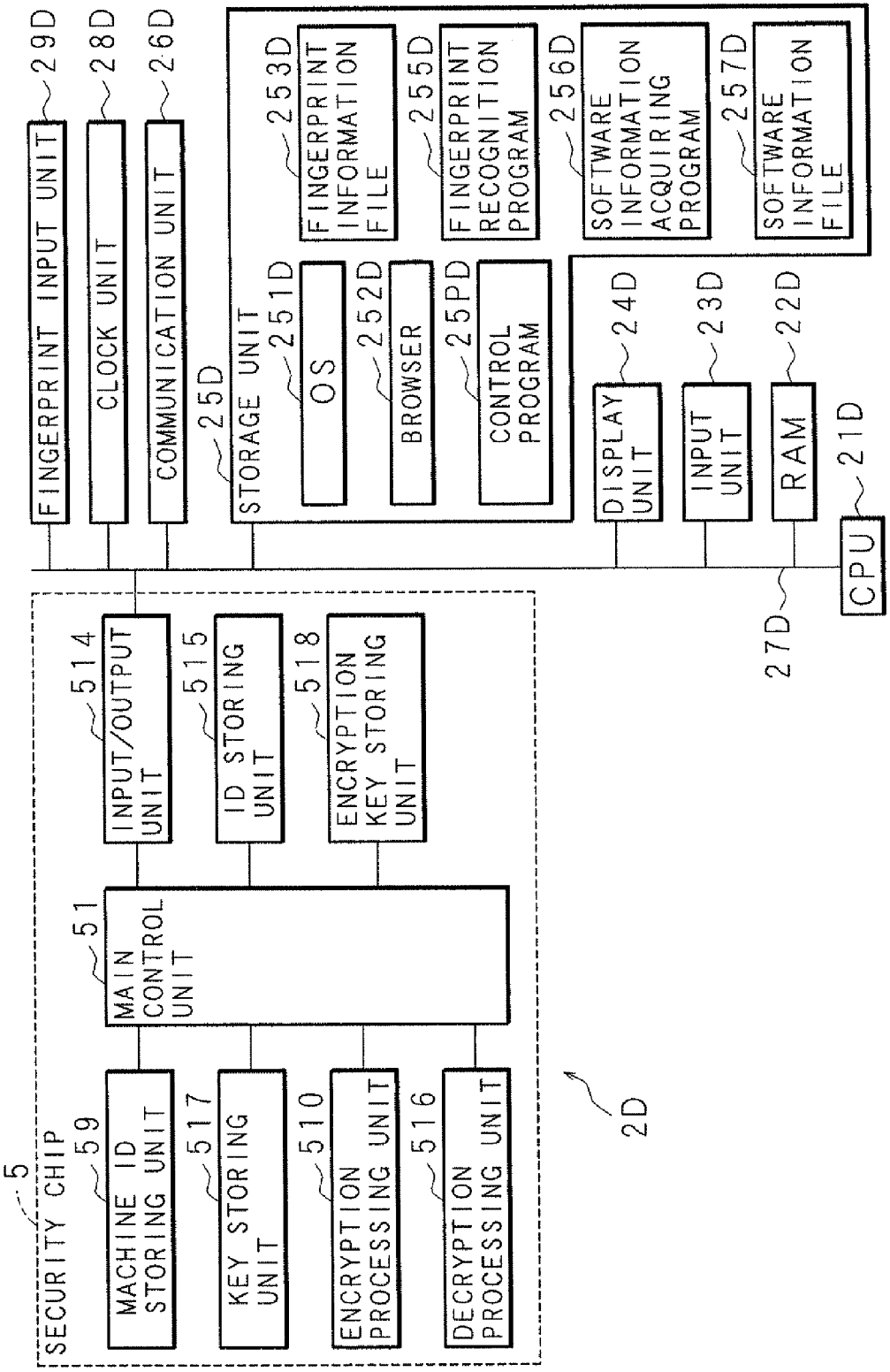
FIG. 28 is a block diagram illustrating hardware of a computer.
Figure 30A:
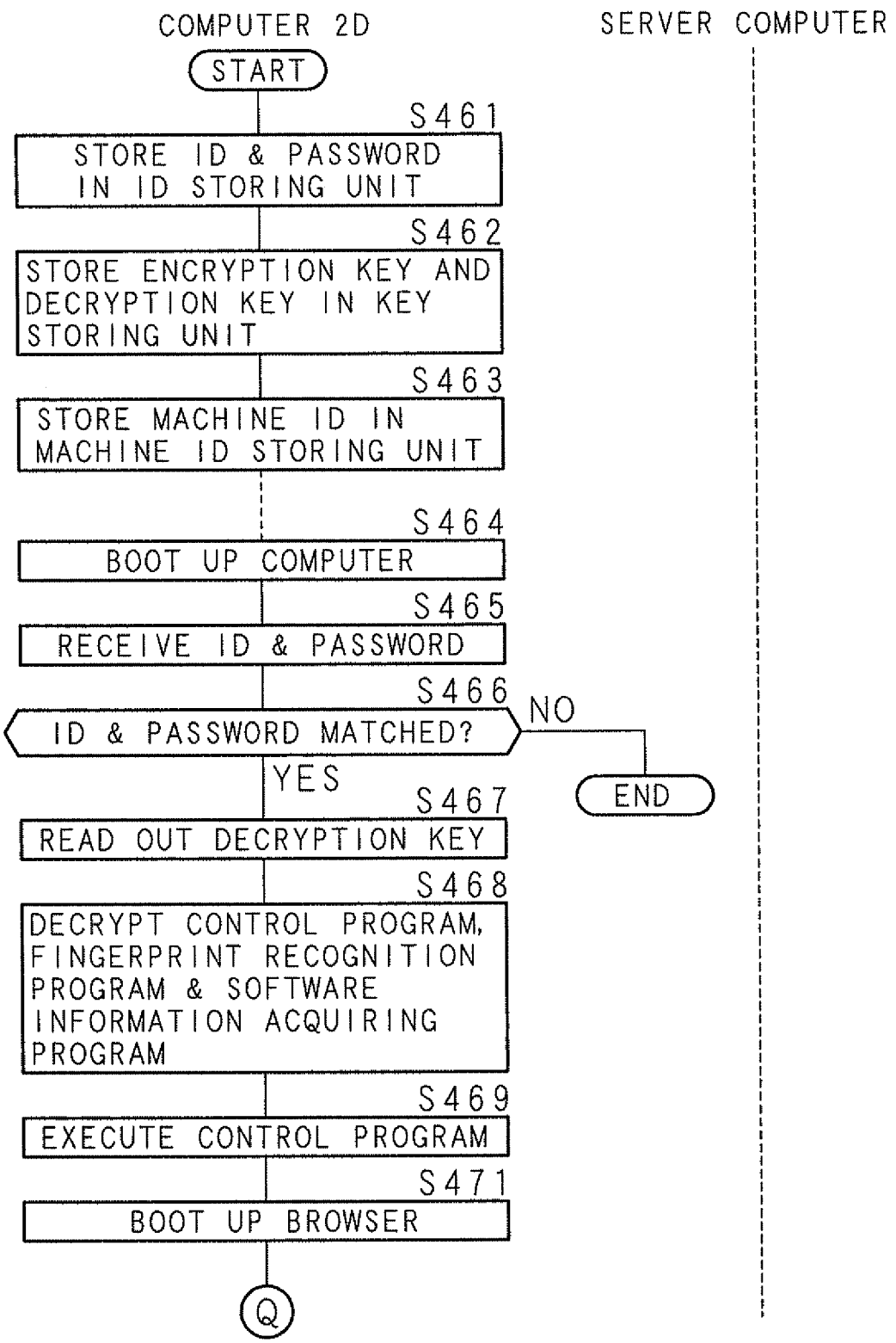
FIG. 30A is a flowchart illustrating a procedure of a level determining process.
Figure 30D:
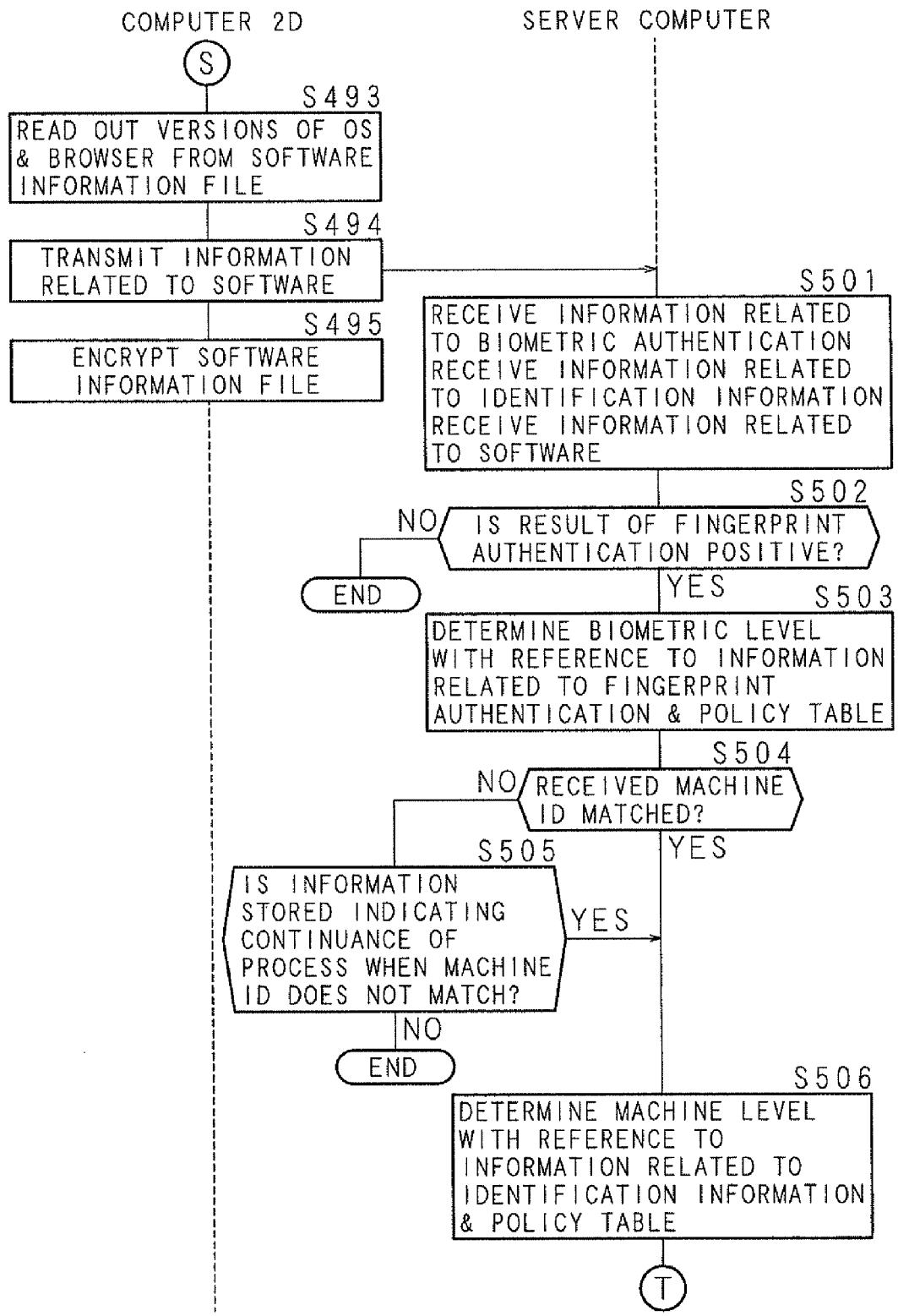
FIG. 30D is a flowchart illustrating a procedure of a level determining process.
Figure 30E:
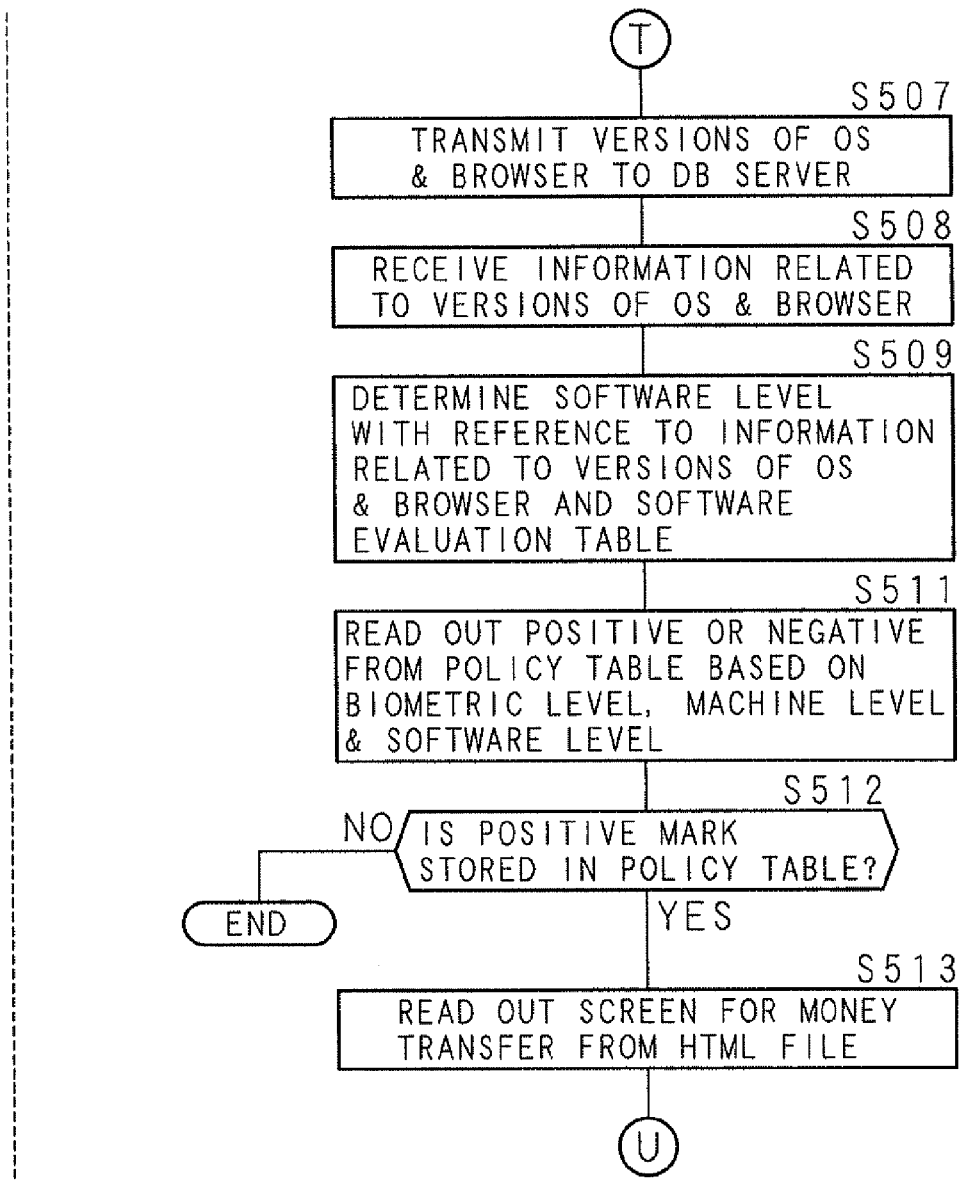
FIG. 30E is a flowchart illustrating a procedure of a level determining process.
Figure 30F:
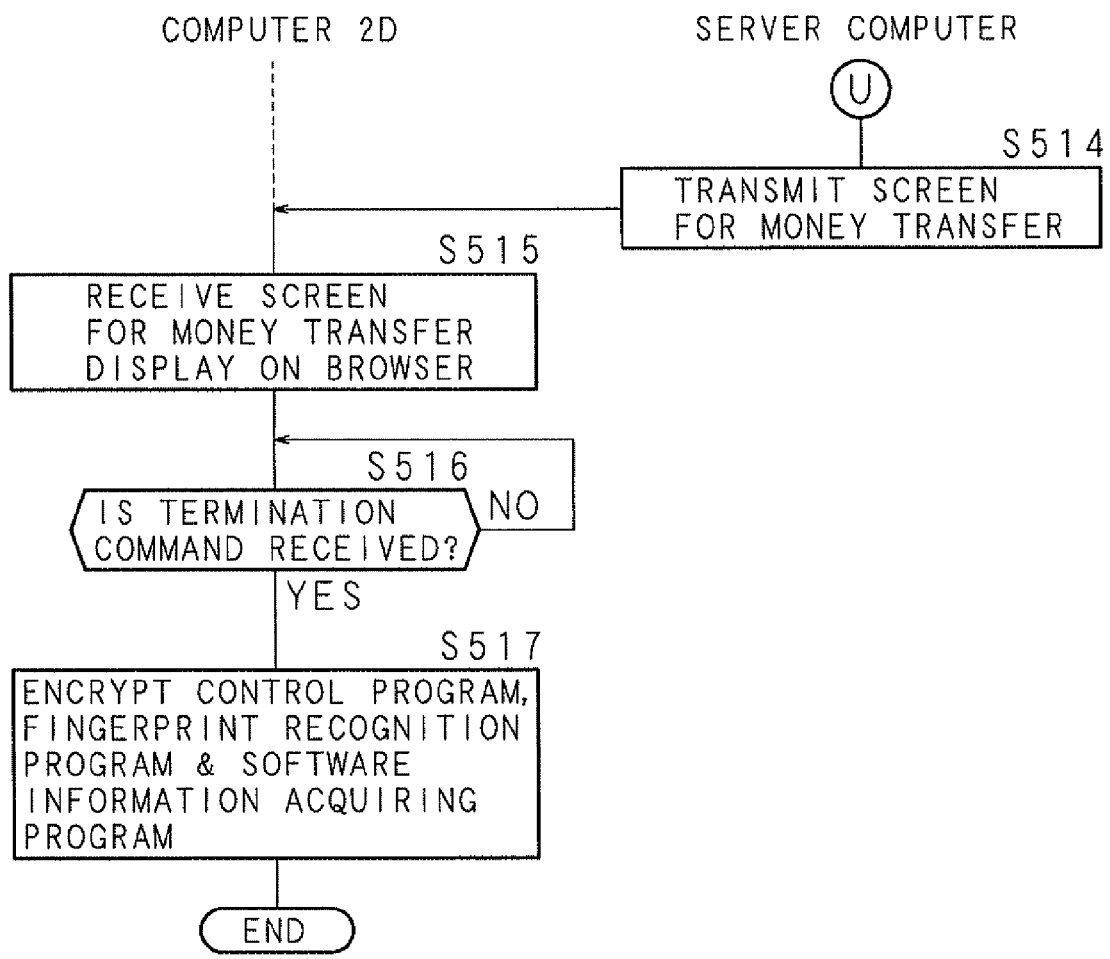
FIG. 30F is a flowchart illustrating a procedure of a level determining process.

FIG. 28 is a block diagram illustrating hardware of a computer 2D. The computer 2 connected to the Web server 1 may also be configured as described in the present embodiment. The computer 2D includes a CPU 21D as a control unit, an RAM 22D, an input unit 23D, a display unit 24D, a storage unit 25D, a communication unit 26D, a clock unit 28D and a fingerprint input unit 29D as well as a security chip 5 and the like. The CPU 21D is connected to each of the hardware units of the computer 2D via a bus 27D, and controls them while executing various software functions in accordance with a control program 25PD stored in the storage unit 25D.

The security chip 5 includes a main control unit 51, a machine ID storing unit 59, a key storing unit 517, an encryption processing unit 510, a decryption processing unit 516, an ID storing unit 515, an encryption key storing unit 518, an input/output unit 514 and the like. The security chip 5 is connected to the main CPU 21D of the computer 2D via the input/output unit 514 which is I/F and the bus 27D. The main control unit 51 performs transmission/reception of information with the CPU 21D via the input/output unit 514. The main control unit 51 is connected to each unit and executes various processes in accordance with a control program stored in the control program 25PD and a control program (not illustrated) provided in the security chip 5. The storage unit 25D stores therein an OS 251D, a browser 252D, the control program 25PD, a fingerprint information file 253D, a fingerprint recognition program 255D, a software information acquiring program 256D, a software information file 257D and the like. Since the fingerprint input unit 29D, input unit 23D and the like as well as the programs stored in the storage unit 25D are as described in Embodiment 1 for example, description thereof will not be repeated.

The machine ID storing unit 59 in the security chip 5 stores a machine ID as in Embodiment 1, and outputs the stored machine ID in accordance with the instructions of the main control unit 51. Note that the machine ID may be stored in advance at the time of factory shipment. The key storing unit 517 stores an encryption key and a decryption key for encrypting and decrypting various kinds of information stored in the storage unit 25D. Each of the encryption key and decryption key is stored in the key storing unit 517 at the time of factory shipment. The encryption processing unit 510 stores an encryption program for encrypting various kinds of information using the encryption key stored in the key storing unit 517. The decryption processing unit 516 stores a decryption program for decrypting the information encrypted by the encryption processing unit 510 using the decryption key stored in the key storing unit 517. The ID storing unit 515 stores an ID and a password required for decryption of information by the decryption processing unit 516.

The encryption process will be described below. The main control unit 51 encrypts the control program 25PD, fingerprint information file 253D, fingerprint recognition program 255D, software information acquiring program 256D and software information file 257D stored in the storage unit 25D by the encryption program stored in the encryption processing unit 510. For example, when the control program 25PD, fingerprint recognition program 255D and software information acquiring program 256D are installed at the time of factory shipment, the main control unit 51 reads out an encryption key stored in the key storing unit 517 and executes the encryption process for the control program 25PD, fingerprint recognition program 255D and software information acquiring program 256D based on the encryption program and encryption key stored in the encryption processing unit 510. The main control unit 51 outputs the encrypted control program 25PD, fingerprint recognition program 255D and software information acquiring program 256D to the CPU 21D via the input/output unit 514.

The CPU 11 stores the encrypted control program 25PD, fingerprint recognition program 255D and software information acquiring program 256D in the storage unit 25D. Note that the encryption process for the control program 25PD, fingerprint recognition program 255D and software information acquiring program 256D may be executed also when these programs are updated. Moreover, the main control unit 51 also encrypts the fingerprint information stored in the fingerprint information file 253 and the software information stored in the software information file 257D by executing the encryption program stored in the encryption processing unit 510. The main control unit 51 receives the fingerprint information to be registered from the fingerprint input unit 29D and, when the received fingerprint information is to be stored in the fingerprint information file 253D, encrypts and then stores it based on the encryption program and encryption key stored in the encryption processing unit 510.

Moreover, every time the software information acquiring program 256D is executed and software information is acquired, the main control unit 51 encrypts the acquired software information file by the encryption program stored in the encryption processing unit 510 and then stores it in the software information file 257D. In the ID storing unit 515, an ID and a password required in decryption is stored, for example, at the time of factory shipment. The ID and password may be changed to a new ID and a new password on the condition that they match with the ID and password input from the input unit 23D. The main control unit 51 receives the ID and password input from the input unit 23D and stores the received ID and password in the ID storing unit 515.

Subsequently, the decryption process will be described. The main control unit 51 receives the ID and password from the input unit 23D and judges whether or not they match with the ID and password stored in the ID storing unit 515. If the main control unit 51 judges that they match with each other, it reads out the decryption key stored in the key storing unit 517 and decrypts the control program 25PD, fingerprint recognition program 255D, software information acquiring program 256D, fingerprint information file 253D and software information file 257D by executing the decryption program stored in the decryption processing unit 516. Note that the ID and password stored in the ID storing unit 515 may be used in common with the ID and password required at the start-up of the OS 251D.

The main control unit 51 performs the decryption process for the control program 25PD, fingerprint recognition program 255D, software information acquiring program 256D, fingerprint information file 253D and software information file 257D at the start-up of the control program 25PD, fingerprint recognition program 255D and software information acquiring program 256D or at the start-up of the computer 2D. As will be described later, for the fingerprint information file 253D, the decryption process may also be performed when the fingerprint recognition program 255D is executed. Likewise, for the software information file 257D, the decryption process may also be performed when the software information acquiring program 256D is executed. When a terminating command of the computer 2D is received from the input unit 23D, the main control unit 51 executes the encryption program stored in the encryption processing unit 510 again to encrypt the control program 25PD, fingerprint recognition program 255D, software information acquiring program 256D, fingerprint information file 253D and software information file 257D, and then terminates the computer 2D.

FIG. 29 is an explanatory view illustrating memory contents of a policy table 154. For the policy table 154 according to Embodiment 4, the biometric level of 2.5 is newly provided. The fingerprint information of the computer 2D is stored in a hard disk but is encrypted. Thus, a level higher than the level 2 which is determined when fingerprint information is stored in the hard disk and lower than the level 3 which is determined when fingerprint information is stored in the security chip 5 is given. Note that the same applies to the machine level and software level, which will not be described in detail.

The processing procedure according to Embodiment 4 in the hardware above will be described using a flowchart. FIGS. 30A to 30F illustrate a flowchart indicating the procedure of a level determining process. At the time of factory shipment, an ID, a password, an encryption key, a decryption key and a machine ID are stored in the security chip 5. The main control unit 51 stores the ID and password input from the input unit 23D in the ID storing unit 515 (step S461). Moreover, the main control unit 51 stores the encryption key and decryption key downloaded from a server computer or the like (not illustrated) of an authentication organization in the key storing unit 517 via the communication unit 26D (step S462). Furthermore, the main control unit 51 stores a unique machine ID for identifying the security chip 5 itself or the computer 2 itself, which is input from the input unit 23D, in the machine ID storing unit 59 (step S463). The stored information are configured so as not to be easily changed unless the ID and password stored in the ID storing unit 515 matches with the ID and password input from the input unit 23D.

The CPU 21D receives fingerprint information of the user from the fingerprint input unit 29D at initial registration. The CPU 21D stores the fingerprint information in the fingerprint information file 253D. Moreover, the CPU 21D executes the software information acquiring program 256D in accordance with the instructions from the input unit 23D to acquire versions of the OS 251D and browser 252D. The CPU 21D stores the acquired versions of OS 251D and browser 252D in the software information file 257D. The main control unit 51 encrypts the control program 25PD, fingerprint recognition program 255D, software information acquiring program 256D, fingerprint information file 253 and software information file 257D, which have been installed in the storage unit 25D, by the encryption program and encryption key stored in the encryption processing unit 510. As described, the process of initial registration is completed.

The user boots up the computer 2D (step S464). The main control unit 51 executes a program stored in an inside memory (not illustrated) to display the input screen for an ID and a password on the display unit 24D. The user inputs an ID and a password from the input unit 23D. The main control unit 51 receives the ID and password input from the input unit 23D (step S465). The main control unit 51 reads out the ID and password stored in the ID storing unit 515 and judges whether or not they match with the received ID and password (step S466).

If the main control unit 51 judges that there is no matching (NO at step S466), the access is regarded as unauthorized and the process is terminated. If, on the other hand, the main control unit 51 judges that they match with each other (YES at step S466), it reads out the decryption key stored in the key storing unit 517 (step S467). The main control unit 51 executes the decryption program stored in the decryption processing unit 516 to decrypt the encrypted control program 25PD, fingerprint recognition program 255D and software information acquiring program 256D stored in the storage unit 25D (step S468).

The main control unit 51 executes the decrypted control program 25PD (step S469). The CPU 21D boots up the browser 252D (step S471) to access the Web server 1. The CPU 21D receives the ID and password for online banking which is input from the input unit 23D, and transmits it to the Web server 1 (step S472). The CPU 11 of the Web server 1 receives the ID and password via the communication unit 16 (step S473). The CPU 11 refers to the user DB 155 to judge whether or not the received ID and password match with the ID and password stored in the user DB 155 (step S474). If the CPU 11 judges that there is no matching (NO at step S474), the access is regarded as unauthorized and the process is terminated. If, on the other hand, the CPU 11 judges that they match with each other (YES at step S474), it transmits a starting screen for biometric authentication from the HTML file 151 to permit login (step S475).

The CPU 21D of the computer 2D receives the starting screen for biometric authentication and displays the starting screen for biometric authentication on the browser 252D (step S476). The CPU 21D boots up the decrypted fingerprint recognition program 255D at reception of the screen serving as a trigger (step S477), and captures the fingerprint information of the user from the fingerprint input unit 29D (step S478). The main control unit 51 executes the decryption program stored in the decryption processing unit 516 to decrypt the fingerprint information file 253D (step S479). The CPU 21D reads out the pre-stored fingerprint information from the decrypted fingerprint information file 253D (step S481). The CPU 21D judges whether or not the read-out fingerprint information matches with the captured fingerprint information (step S482). If the CPU 21D judges that there is no matching (NO at step S482), the access is regarded as unauthorized and the process is terminated.

If, on the other hand, the CPU 21D judges that the fingerprint information match with each other (YES at step S482), it reads out the encryption key from the key storing unit 517 (step S483). The main control unit 51 reads out the encryption program stored in the encryption processing unit 510 to encrypt the fingerprint information file 253D using the encryption key (step S484). The CPU 21D generates information related to biometric authentication including the result of fingerprint authentication and the information indicating that the fingerprint information is encrypted and stored in a hard disk, and transmits it to the Web server 1 (step S485). Note that the result of fingerprint authentication to be transmitted includes the information indicating that the type of biometric authentication executed at the computer 2D is fingerprint authentication and that the result of fingerprint authentication is determined as positive.

Subsequently, the main control unit 51 reads out a machine ID from the machine ID storing unit 59 (step S486). The read-out machine ID is output to the CPU 21D via the input/output unit 514. The CPU 21D transmits information related to identification information including the machine ID and the information indicating that the machine ID is stored in the security chip 5 to the Web server 1 (step S487). The CPU 21D executes the decrypted software information acquiring program 256D (step S488) to acquire the versions of OS 251D and browser 252D. The main control unit 51 executes the decryption program stored in the decryption processing unit 516 to decrypt the software information file 257D using the decryption key (step S489).

The CPU 21D judges whether or not the versions of OS 251D and browser 252D in the decrypted software information file 257D match with the latest versions of OS 251D and browser 252D acquired by executing the software information acquiring program 256D at the step S488 (step S491). If the CPU 21D judges that there is no matching (NO at step S491), it stores the acquired versions of OS 251D and browser 252D in the software information file 257 so as to update the information to be the latest (step S492). If, on the other hand, the CPU 21D judges that they match with each other (YES at step S491), no updating is required and thus the process at step S492 is skipped.

The CPU 21D reads out the versions of OS 251D and browser 252D from the software information file 257D (step S493) and transmits them to the Web server 1 as information related to software (step S494). Next, the main control unit 51 reads out the encryption program stored in the encryption processing unit 510 to encrypt the software information file 257D using the encryption key (step S495).

The CPU 11 of the Web server 1 receives the information related to biometric authentication transmitted at step S485, the information related to identification information transmitted at step S487 and the information related to software transmitted at step S494 (step S501). The CPU 11 refers to the result of fingerprint authentication in the received information related to biometric authentication to judge whether or not the result of fingerprint authentication is positive (step S502). If the CPU 11 judges that the result of fingerprint authentication is not positive (NO at step S502), the process is regarded as unauthorized and terminated. If, on the other hand, the CPU 11 judges that the result of fingerprint authentication is positive (YES at step S502), it refers to the policy table 154 illustrated in FIG. 29 and the information indicating that the fingerprint information is encrypted and stored in the hard disk among the information related to biometric authentication, to determine a biometric level (step S503). In the present example, the biometric level is determined as 2.5.

The CPU 11 reads out a machine ID corresponding to the ID received at step S473 from the user DB 155. The CPU 11 judges whether or not the machine ID received at step S487 matches with the machine ID read out from the user DB 155 (step S504). If the CPU 11 judges that there is no matching (NO at step S504), it judges whether or not the information indicating that the process is to be continued even if the machine IDs do not match is stored in the storage unit 15 (step S505). This is to allow a plurality of users in a large enterprise or the like who access different computers 2 having different machine IDs to be able to make transactions even if the machine IDs do not match. In such a case, an operator stores in advance the information indicating that the process is to be continued even if the machine IDs do not match in the storage unit 15 through the input unit 13. When, on the other hand, machine IDs need to match, the information indicating that the process is to be continued even if the machine IDs do not match is erased from the storage unit 15.

If the CPU 11 judges that the information indicating that the process is to be continued even if the machine IDs do not match is not stored in the storage unit 15 (NO at step S505), the access is regarded as unauthorized and the process is terminated. If, on the other hand, the CPU 11 judges that the information indicating that the process is to be continued even if the machine IDs do not match is stored in the storage unit 15 (YES at step S505), the process is moved to the step S506 so as to allow the computer 2 to execute the process. If the CPU 11 judges that the received machine ID matches with the read-out machine ID at the step S504 (YES at step S504), the process is moved to the step S506 as well. It is understood that the processes described at the steps S504, S505 and S506 may also be applied to Embodiments 1 to 3.

The CPU 11 refers to the policy table 154 and the information indicating that the machine ID is stored in the security chip 5 among the information related to identification information, to determine a machine level (step S506). In the present example, the machine level is determined as 3. Note that the CPU 11 may execute a correcting process to lower the machine level when YES is selected at the step S505. In the present example, the machine level of 3 is multiplied by a coefficient of 0.9 which is pre-stored in the storage unit 15 to determine a corrected machine level of 2.7. The CPU 11 transmits the versions of OS 251D and browser 252D among the information related to software to the DB server 4 via the communication unit 16 (step S507). The CPU 41 of the DB server 4 refers to the software DB 451 to transmit the information related to versions indicating whether each of the transmitted versions of OS 251D and browser 252D is the latest, one version older, two versions older or the like to the Web server 1. The CPU 11 receives the information related to the transmitted versions of OS 251D and browser 252D from the DB server 4 (step S508).

The CPU 11 refers to the software evaluation table 153 and the information related to versions of OS 251D and browser 252D, to determine a software level (step S509). The CPU 11 reads out positive or negative from the policy table 154 based on the software level determined at step S509, the biometric level determined at step S503 and the machine level determined at step S506 (step S511). The CPU 11 judges whether or not a positive mark is stored in the policy table 154 (step S512). If the CPU 11 judges that no positive mark is stored (NO at step S512), the computer 2D is regarded as not satisfying the reference level and the subsequent processes are terminated.

If, on the other hand, a positive mark is stored (YES at step S512), the CPU 11 determines that the level of the computer 2D is equal to or more than the reference level and reads out a screen for money transfer process from the HTML file 151 (step S513). The CPU 11 transmits the screen for money transfer process to the computer 2D (step S514). The CPU 21D of the computer 2D receives the screen for money transfer process and displays it on the browser 252D (step S515). Thereafter, the CPU 21D judges whether or not a termination command such as log-out of the OS 251D or shut-down of the computer 2D is received from the input unit 23D (step S516). If the CPU 21D judges that no termination command is received (NO at step S516), it repeats the process until the command is received. If, on the other hand, the CPU 21 judges that the termination command is received (YES at step S516), it reads out an encryption program stored in the encryption processing unit 510 and encrypts the control program 25PD, fingerprint recognition program 255D and software information acquiring program 256D using the encryption key (step S517). Thereafter, the CPU 21D performs a process such as power-off or log-out in accordance with the termination command.

Embodiment 4 is configured as described above, while the other configurations and functions are similar to those in Embodiments 1 to 3. Thus, corresponding parts are denoted by the same reference numbers and will not be described in detail.

Embodiment 5

Figure 31:
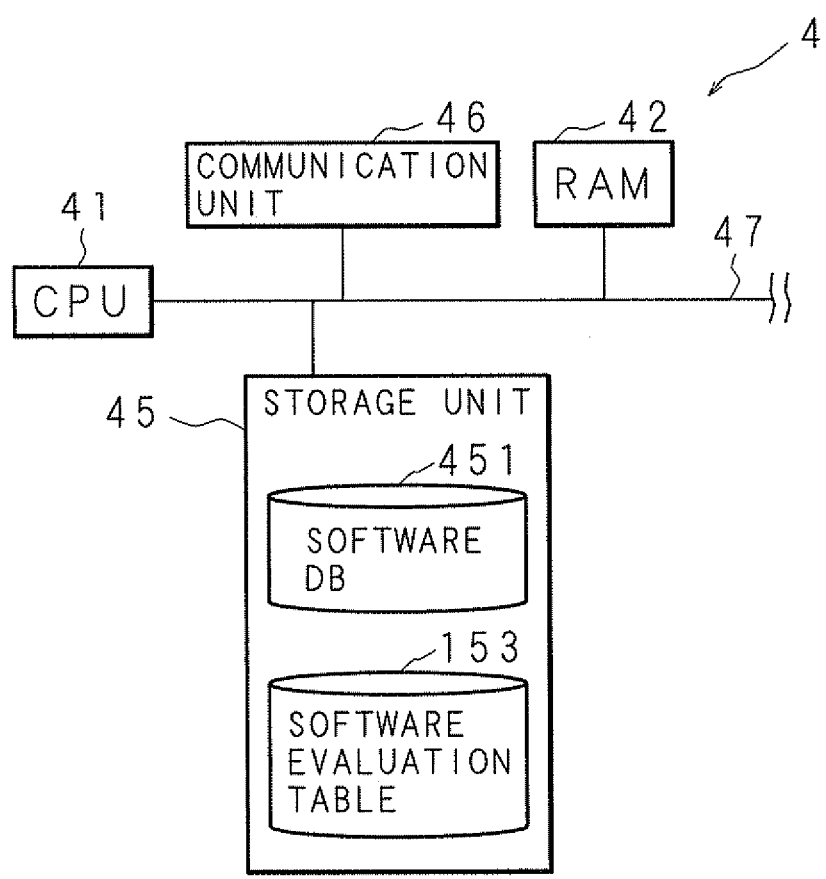
FIG. 31 is a block diagram illustrating hardware of a DB server according to Embodiment 5.

Embodiment 5 relates to an example where the DB server 4 of a software company determines a software level and transmits it to the Web server 1. FIG. 31 is a block diagram illustrating hardware of the DB server 4 according to Embodiment 5. In the storage unit 45, the software evaluation table 153 described in Embodiments 1 to 4 is stored. Note that the software evaluation table 153 is not stored in the Web server 1. When the versions of OS 251 and browser 252 are received from the Web server 1, the CPU 41 of the DB server 4 refers to the software DB 451 and software evaluation table 153 to determine a software level. The software level becomes higher as software is newer. The CPU 41 of the DB server 4 then transmits the determined software level to the Web server 1. The CPU 11 of the Web server 1 determines the transmitted software level as the software level used in judging in the policy table 154.

Figure 32:
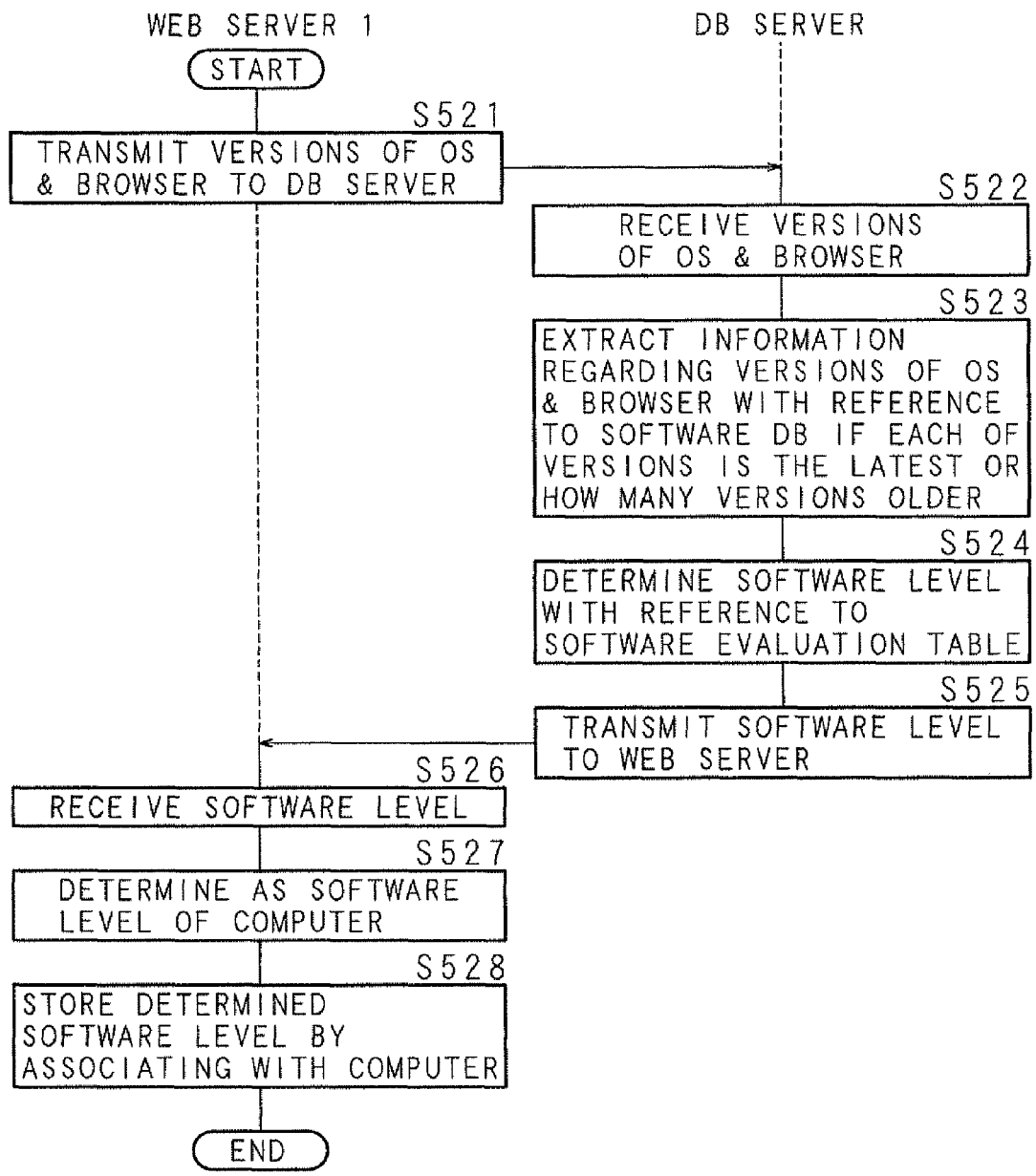
FIG. 32 is a flowchart illustrating a procedure of a software level determining process.

FIG. 32 is a flowchart illustrating a procedure of a software level determining process. The CPU 11 of the Web server 1 transmits the versions of OS 251 and browser 252, which are transmitted from the computer 2, to the DB server 4 via the communication unit 16 (step S521). The CPU 41 of the DB server 4 receives the versions of OS 251 and browser 252 via the communication unit 46 (step S522). The CPU 41 refers to the software DB 451 illustrated in FIG. 6 to extract information indicating whether each of the transmitted versions of OS 251 and browser 252 is the latest or how many versions older (step S523). For example, when the version of OS 251 is W06, the CPU 41 extracts the information indicating the latest version by referring to the update time field, while it extracts the information indicating that the version is two versions older when the version is W04.

The CPU 41 refers to the software evaluation table 153 to determine the software level based on the information indicating that each of the versions of OS 251D and browser 252D extracted at step S523 is the latest or how many versions older (step S524). The CPU 41 transmits the determined software level to the Web server 1 (step S525). The CPU 11 of the Web server 1 receives the transmitted software level (step S526). The CPU 11 determines the received software level as the software level of the computer 2 which transmitted the versions of OS 251D and browser 252D (step S527). Finally, the CPU 11 stores the determined software level in the storage unit 15 by associating it with the computer 2 (step S528). The CPU 11 refers to the biometric level and machine level described in Embodiment 1 as well as the policy table 154 and the stored software level, to judge whether the computer 2 is positive or negative.

Embodiment 5 is configured as described above, while the other configurations and functions are similar to those in Embodiments 1 to 4. Thus, corresponding parts are denoted by the same reference numbers and will not be described in detail.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication method of performing authentication for an information processing device connected via a communication network by an authentication device, comprising:
  receiving information related to biometric authentication concerning the information processing device;
  receiving information related to identification information for identifying the information processing device;
  receiving information related to environment of the information processing device;
  receiving an electronic signature by a secret key which is paired with an electronic certification transmitted from the information processing device;
  determining, by a control unit, a biometric level based on the received information related to biometric authentication, a device level based on the received information related to identification information and an environment level based on the received information related to environment;
  correcting, by said control unit, the determined biometric level, device level and environment level to be a higher level, when the electronic signature is valid; and
  judging as positive, by said control unit, based on a reference level stored in advance and a level determined by all of the corrected biometric level, device level and environment level, when the electronic signature is valid; and
  judging as positive, by the control unit, without altering a level determined by all of the biometric level, device level and environment level, respectively before amendment, and the reference level stored in advance, when the electronic signature is not valid,
  wherein said correcting unit includes
  a first reception judging unit judging whether or not an electronic signature is received by said electronic signature receiving unit,
  a second reception judging unit judging, when said first reception judging unit judges that the electronic signature is received, whether or not information related to biometric authentication, information related to identification information and information related to environment encrypted by an encryption key arranged in advance between said information processing device and the authentication device by said biometric receiving unit, said device receiving unit and said environment receiving unit together with the reception of the electronic signature, a decrypting unit decrypting, when said second reception judging unit judges that said encrypted information related to biometric authentication, information related to identification information and information related to environment are received together with the electronic signature, said encrypted information related to biometric authentication, information related to identification information and information related to environment using said encryption key, an examining unit examining whether or not the information related to biometric authentication, information related to identification information and information related to environment decrypted by said decrypting unit have been altered, and a level correcting unit correcting, when said examining unit judges that no alteration has been made, the biometric level, device level and environment level, determined by said level determining unit, to be higher levels.

2. An authentication device performing authentication for an information processing device connected via a communication network, comprising:

a biometric receiving unit receiving information related to biometric authentication concerning the information processing device;

a device receiving unit receiving information related to identification information for identifying the information processing device;

an environment receiving unit receiving information related to environment of the information processing device;

an electronic signature receiving unit receiving an electronic signature by a secret key which is paired with an electronic certification transmitted from the information processing device;

a level determining unit determining a biometric level based on the information related to biometric authentication received by said biometric receiving unit, a device level based on the information related to the identification information received by said device receiving unit and an environment level based on the information related to environment received by said environment receiving unit;

a correcting unit correcting a biometric level, device level and environment level to be a higher level when the electronic signature is valid; and a judging unit judging as positive based on a reference level stored in advance and a level determined by all of the biometric level, device level and environment level corrected by the correcting unit when the electronic signature is valid, and judging as positive without altering a level determined by all of the biometric level, device level and environment level, respectively before amendment, and the reference level stored in advance, when the electronic signature is not valid wherein said correcting unit includes a first reception judging unit judging whether or not an electronic signature is received by said electronic signature receiving unit, a second reception judging unit judging, when said first reception judging unit judges that the electronic signature is received, whether or not information related to biometric authentication, information related to identification information and information related to environment encrypted by an encryption key arranged in advance between said information processing device and the authentication device by said biometric receiving unit, said device receiving unit and said environment receiving unit together with the reception of the electronic signature, a decrypting unit decrypting, when said second reception judging unit judges that said encrypted information related to biometric authentication, information related to identification information and information related to environment are received together with the electronic signature, said encrypted information related to biometric authentication, information related to identification information and information related to environment using said encryption key, an examining unit examining whether or not the information related to biometric authentication, information related to identification information and information related to environment decrypted by said decrypting unit have been altered, and a level correcting unit correcting, when said examining unit judges that no alteration has been made, the biometric level, device level and environment level, determined by said level determining unit, to be higher levels.

3. The authentication device according to claim 2, wherein said biometric receiving unit receives information related to biometric authentication including information regarding a type of biometric authentication executed at said information processing device or information regarding a storing status of biometric information required for biometric authentication in said information processing device, and said level determining unit determines a biometric level based on the information related to biometric authentication received by said biometric receiving unit with reference to a policy table in which a biometric level is stored by associating the biometric level with the type of biometric authentication or the storing status of biometric information.

4. The authentication device according to claim 2, wherein said device receiving unit receives information related to identification information including information regarding the storing status in said information processing device of identification information for identifying the information processing device, and said level determining unit determines a device level based on the information related to identification information received by said device receiving unit with reference to a policy table in which a device level is stored in accordance with the information regarding the storing status.

5. The authentication device according to claim 2, wherein said environment receiving unit receives information related to environment including information regarding a type of software operating said information processing device, and said level determining unit determines an environment level based on the information related to environment received by said environment receiving unit depending on the type of software.

6. The authentication device according to claim 2, wherein said correcting unit includes a first reception judging unit judging whether or not an electronic signature is received by said electronic signature receiving unit, a second reception judging unit judging, when said first reception judging unit judges that the electronic signature is received, whether or not information related to biometric authentication encrypted by an encryption key arranged in advance between said information processing device and the authentication device is received by said biometric receiving unit together with reception of the electronic signature, a decrypting unit decrypting, when said second reception judging unit judges that said encrypted information related to biometric authentication is received together with the electronic signature, said encrypted information related to biometric authentication using said encryption key, an examining unit examining whether or not the information related to biometric authentication decrypted by said decrypting unit has been altered, and a level correcting unit correcting, when said examining unit judges that no alteration has been made, the biometric level determined by said level determining unit to a higher level.

7. The authentication device according to claim 2, wherein said correcting unit includes a first reception judging unit judging whether or not the electronic signature is received by said electronic signature receiving unit, a second reception judging unit judging, when said first reception judging unit judges that the electronic signature is received, whether or not information related to identification information encrypted by an encryption key arranged in advance between said information processing device and the authentication device is received by said device receiving unit together with reception of the electronic signature, a decrypting unit decrypting, when said second reception judging unit judges that said encrypted information related to identification information is received together with the electronic signature, said encrypted information related to identification information using said encryption key, an examining unit examining whether or not the information related to identification information decrypted by said decrypting unit has been altered, and a level correcting unit correcting, when said examining unit judges that no alteration has been made, the device level determined by said level determining unit to a higher level.

8. The authentication device according to claim 2, wherein said correcting unit includes a first reception judging unit judging whether or not an electronic signature is received by said electronic signature receiving unit, a second reception judging unit judging, when said first reception judging unit judges that the electronic signature is received, whether or not information related to environment encrypted by an encryption key arranged in advance between said information processing device and the authentication device is received by said environment receiving unit together with reception of the electronic signature, a decrypting unit decrypting, when said second reception judging unit judges that said encrypted information related to environment is received together with the electronic signature, said encrypted information related to environment using said encryption key, an examining unit examining whether or not the information related to environment decrypted by said decrypting unit has been altered, and a level correcting unit correcting, when said examining unit judges that no alteration has been made, the environment level determined by said level determining unit to a higher level.

9. The authentication device according to claim 2, wherein said judging unit judges that a level determined by all of the biometric level, device level and environment level corrected by said correcting unit is positive with reference to a policy table in which positive or negative is stored concerning a reference level for each of all combinations of the biometric level, device level and environment level.

10. The authentication device according to claim 9, comprising:

an executing unit executing a plurality of processes in response to a request from said information processing device;

a determining unit determining an importance of each process executed by the executing unit; and a selecting unit selecting one policy table from a plurality of policy tables with different information on positive or negative stored for each of all combinations of the biometric level, device level and environment level depending on the importance of process determined by the determining unit, wherein said judging unit judges that a level determined by all of the biometric level, device level and environment level corrected by said correcting unit is positive with reference to the policy table selected by said selecting unit.

11. The authentication device according to claim 5, wherein said level determining unit includes a transmitting unit transmitting the information related to the type of software received by said environment receiving unit to the outside, an environment level receiving unit receiving an environment level determined based on the type of software transmitted from the outside in response to said transmitting unit, and an environment level determining unit determining the environment level received by the environment level receiving unit as an environment level based on the information related to environment received by said environment receiving unit.

12. A non-transitory computer-readable recording medium storing a program that causes a computer to execute a procedure for authentication of an information processing device connected via a communication network is recorded, said procedure comprising:

receiving information related to biometric authentication concerning the information processing device, receiving information related to identification information for identifying the information processing device, receiving information related to environment of the information processing device, receiving an electronic signature by a secret key which is paired with an electronic certification transmitted from the information processing device, determining a biometric level based on the received information related to biometric authentication, a device level based on the received information related to identification information and an environment level based on the received information related to environment, correcting the determined biometric level, device level and environment level to be a higher level when the electronic signature is valid, judging as positive based on a reference level stored in advance and a level determined by all of the corrected biometric level, device level and environment level, when the electronic signature is valid; and judging as positive without altering a level determined by all of the biometric level, device level and environment level, respectively before amendment, and the reference level stored in advance, when the electronic signature is not valid, wherein said correcting unit includes a first reception judging unit judging whether or not an electronic signature is received by said electronic signature receiving unit, a second reception judging unit judging, when said first reception judging unit judges that the electronic signature is received, whether or not information related to biometric authentication, information related to identification information and information related to environment encrypted by an encryption key arranged in advance between said information processing device and the authentication device by said biometric receiving unit, said device receiving unit and said environment receiving unit together with the reception of the electronic signature, a decrypting unit decrypting, when said second reception judging unit judges that said encrypted information related to biometric authentication, information related to identification information and information related to environment are received together with the electronic signature, said encrypted information related to biometric authentication, information related to identification information and information related to environment using said encryption key, an examining unit examining whether or not the information related to biometric authentication, information related to identification information and information related to environment decrypted by said decrypting unit have been altered, and a level correcting unit correcting, when said examining unit judges that no alteration has been made, the biometric level, device level and environment level, determined by said level determining unit, to be higher levels.

* * * * *